(12) United States Patent
Ellenbogen et al.

(10) Patent No.: US 10,382,300 B2
(45) Date of Patent: Aug. 13, 2019

(54) PLATFORM FOR GATHERING REAL-TIME ANALYSIS

(71) Applicant: Evolv Technologies, Inc., Waltham, MA (US)

(72) Inventors: Michael Ellenbogen, Wayland, MA (US); M. Brendan McCord, Boston, MA (US); Brian Knoth, East Walpole, MA (US); Brandon Wolfe, Tyngsboro, MA (US)

(73) Assignee: EVOLV TECHNOLOGIES, INC., Waltham, MA (US)

( * ) Notice: Subject to any disclaimer, the term of this patent is extended or adjusted under 35 U.S.C. 154(b) by 228 days.

(21) Appl. No.: 15/287,604

(22) Filed: Oct. 6, 2016

(65) Prior Publication Data

US 2017/0099200 A1  Apr. 6, 2017

Related U.S. Application Data

(60) Provisional application No. 62/237,733, filed on Oct. 6, 2015.

(51) Int. Cl.
| | | |
|---|---|---|
| *G06N 3/08* | (2006.01) | |
| *H04L 12/26* | (2006.01) | |
| *G06N 20/00* | (2019.01) | |
| *H04L 29/08* | (2006.01) | |
| *G06N 5/02* | (2006.01) | |
| *G06N 7/00* | (2006.01) | |
| *G06N 3/10* | (2006.01) | |

(Continued)

(52) U.S. Cl.
CPC .......... *H04L 43/08* (2013.01); *G06K 9/00771* (2013.01); *G06K 9/4628* (2013.01); *G06K 9/6273* (2013.01); *G06N 3/10* (2013.01); *G06N 5/022* (2013.01); *G06N 5/025* (2013.01); *G06N 7/005* (2013.01); *G06N 7/06* (2013.01); *G06N 20/00* (2019.01); *H04L 43/04* (2013.01); *H04L 67/10* (2013.01); *G06N 3/08* (2013.01)

(58) Field of Classification Search
CPC ........ H04L 43/08; H04L 43/04; H04L 67/10; G06N 3/10; G06N 5/022; G06N 5/025; G06N 7/06; G06N 7/005; G06N 99/005; G06N 3/08; G06K 9/6254
USPC ......................................................... 709/224
See application file for complete search history.

(56) References Cited

U.S. PATENT DOCUMENTS

| | | | |
|---|---|---|---|
| 6,049,819 A | * | 4/2000 | Buckle .................... G06F 9/465 |
| | | | 707/999.01 |
| 7,197,459 B1 | | 3/2007 | Harinarayan et al. |

(Continued)

OTHER PUBLICATIONS

"CrowdTruth: Machine-Human Computation Framework" by Inel Oana et al. (Year: 2014).*

(Continued)

*Primary Examiner* — S M A Rahman
(74) *Attorney, Agent, or Firm* — Mintz Levin Cohn Ferris Glovsky and Popeo, P.C.

(57) ABSTRACT

Data is received characterizing a request for agent computation of sensor data. The request includes a required confidence and required latency for completion of the agent computation. Agents to query are determined based on the required confidence. Data is transmitted to query the determined agents to provide analysis of the sensor data. Related apparatus, systems, techniques, and articles are also described.

23 Claims, 36 Drawing Sheets

(51) Int. Cl.
    G06N 7/06    (2006.01)
    G06K 9/00    (2006.01)
    G06K 9/46    (2006.01)
    G06K 9/62    (2006.01)

(56) References Cited

U.S. PATENT DOCUMENTS

| | | | |
|---|---|---|---|
| 7,587,064 | B2 | 9/2009 | Owechko et al. |
| 9,037,600 | B1 | 5/2015 | Garrigues et al. |
| 9,218,364 | B1 | 12/2015 | Garrigues et al. |
| 2006/0200253 | A1* | 9/2006 | Hoffberg ........ G05B 15/02 700/19 |
| 2010/0106671 | A1 | 4/2010 | Li et al. |
| 2010/0317444 | A1 | 12/2010 | Chandrasekar et al. |
| 2012/0005131 | A1 | 1/2012 | Horvitz et al. |
| 2012/0148105 | A1 | 6/2012 | Burry et al. |
| 2012/0158620 | A1 | 6/2012 | Paquet et al. |
| 2013/0051672 | A1 | 2/2013 | Robinson et al. |
| 2013/0307682 | A1 | 11/2013 | Jerhotova et al. |
| 2014/0019435 | A1 | 1/2014 | Ceri et al. |
| 2014/0337257 | A1 | 11/2014 | Chatterjee et al. |
| 2015/0213360 | A1 | 7/2015 | Venanzi et al. |
| 2015/0248457 | A1 | 9/2015 | Sawaf |
| 2016/0162458 | A1 | 6/2016 | Munro et al. |
| 2016/0275411 | A1 | 9/2016 | Kim et al. |
| 2017/0262723 | A1 | 9/2017 | Kozitsky et al. |

OTHER PUBLICATIONS

Branson, Steve, et al. "Visual recognition with humans in the loop." European Conference on Computer Vision. Springer Berlin Heidelberg, 2010.

Cheng, Justin, and Michael S. Bernstein. "Flock: Hybrid crowd-machine learning classifiers." Proceedings of the 18th ACM Conference on Computer Supported Cooperative Work & Social Computing. ACM, 2015.

Chien-Ju Ho, et al. "Adaptive Task Assignment for Crowdsourced Classification," Proceedings of the 30th International Conference on Machine Learning, 2013. JMLR: W&CP vol. 28, Jun. 16, 2013.

Costa, Joana, et al. "On using crowdsourcing and active learning to improve classification performance." Intelligent Systems Design and Applications (ISDA), 2011 11th International Conference on. IEEE, 2011.

Inel, Oana, et al. "Crowdtruth: Machine-human computation framework for harnessing disagreement in gathering annotated data." International Semantic Web Conference. Springer International Publishing, 2014.

Joshi, Ajay J., Fatih Porikli, and Nikolaos Papanikolopoulos. "Multi-class active learning for image classification." Computer Vision and Pattern Recognition, 2009. CVPR 2009. IEEE Conference on. IEEE, 2009.

Vijayanarasimhan, Sudheendra, and Kristen Grauman. "Large-scale live active learning: Training object detectors with crawled data and crowds." International Journal of Computer Vision 108.1-2 (2014): 97-114.

Yu, Fisher, et al. "Lsun: Construction of a large-scale image dataset using deep learning with humans in the loop." arXiv preprint arXiv:1506.03365 (2015).

Zhao, Liyue, Gita Sukthankar, and Rahul Sukthankar. "Robust Active Learning Using Crowdsourced Annotations for Activity Recognition." Human Computation 32 (2011).

Zhao, Liyue, Yu Zhang, and Gita Sukthankar. "An active learning approach for jointly estimating worker performance and annotation reliability with crowdsourced data." arXiv preprint arXiv:1401.3836 (2014).

* cited by examiner

| Mission | Description | Particulars | Examples |
|---|---|---|---|
| Intrusions | Here is a physical space, region, or boundary. I'm concerned about intrusion into that space. | • Tripwire specification<br>• Person/vehicle/object description<br>• Person/vehicle/object particulars<br>• Human questions | • Perimeter security<br>• Asset protection<br>• Door monitoring<br>• Animals intruding<br>• People where they shouldn't be |
| Access | I'm trying to identify people or classes of people that should either be allowed in or prevented from entering. It's a space, region, or boundary where it is normal for people to go in and out, but only certain people should be allowed access. | • Tripwire specification<br>• Person/vehicle/object description<br>• Person/vehicle/object particulars<br>• Watchlist<br>• Human questions | • Watch list<br>• VIP list<br>• Particular delivery vehicle/driver |
| Loiter/Dwell | People, vehicles, or objects can be there, but if they loiter/dwell that is something I want to know. | • Areas of interest<br>• Person/vehicle/object description<br>• Person/vehicle/object particulars<br>• Time thresholds<br>• Human questions | • Person dwell<br>• Vehicle dwell<br>• Object dwell (bag left behind) |
| Behavior | I want to know if people exhibit certain behaviors. | • Behavior of interest<br>• Region of interest<br>• Human questions | • Suspicious behavior<br>• Behavior of people on bus<br>• Vehicle behavior (tailgating, wrong direction)<br>• Activity recognition (e.g., person used phone)<br>• Interactions with retail products/end cap |
| Tracking | Once I've identified someone or some vehicle, I want to be able to track it from one camera to the next. | • Region of interest<br>• Last location, time, and trajectory<br>• Person/vehicle/object description<br>• Person/vehicle/object particulars<br>• Human questions | • Person tracking<br>• Vehicle tracking |

| Module | Description | Requirements | Examples |
|---|---|---|---|
| Scene Summary | I want to understand scene properties over time at a high level, such as how people and vehicles move through physical space. | • Region of interest<br>• Persons/vehicles/object description<br>• Persons/vehicles/object particulars<br>• Human questions | • People heatmap<br>• Traffic heatmap<br>• Traversal paths |
| Normal vs. Abnormal | When something out of the ordinary happens, I want to know about it. | • Footage from which normal can be ascertained<br>• Abnormal event descriptions | • Deviant event detection |
| Video Escort | When I need a "video escort" (e.g., to walk through the parking lot), I want a person to escort me too. | • Person being escorted<br>• Human questions | • Video escort |
| License Plate | Keep track of license plates and/or let me know when a car that shouldn't enter is trying to. | • Region of interest<br>• List of license plates<br>• Human questions | • License plate recognition |
| Annotation | A special modality which simply annotates the multimedia presented by the assets. Most useful for training AI components. | • Region of interest<br>• Annotation options | • Training an AI system |

*FIG. 11*

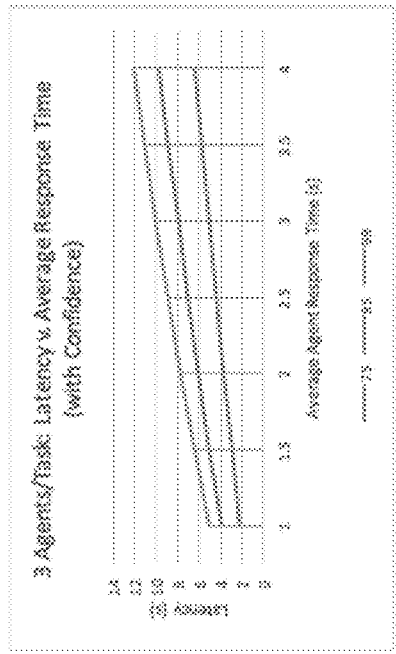
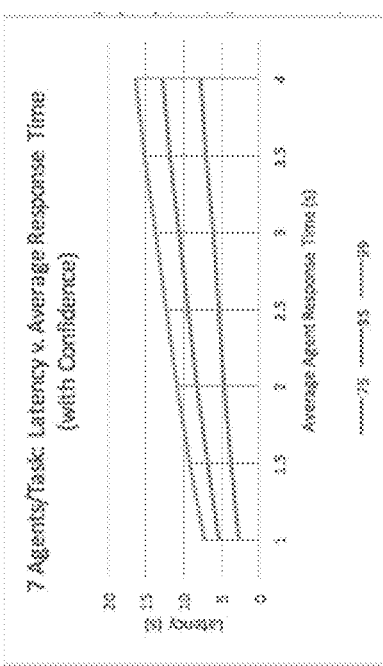
FIG. 27

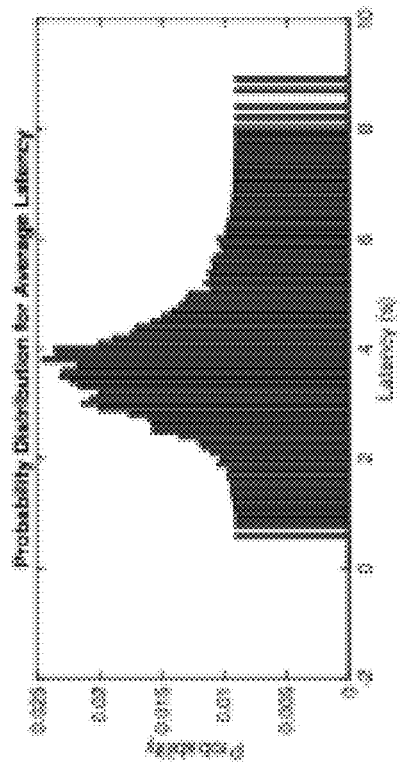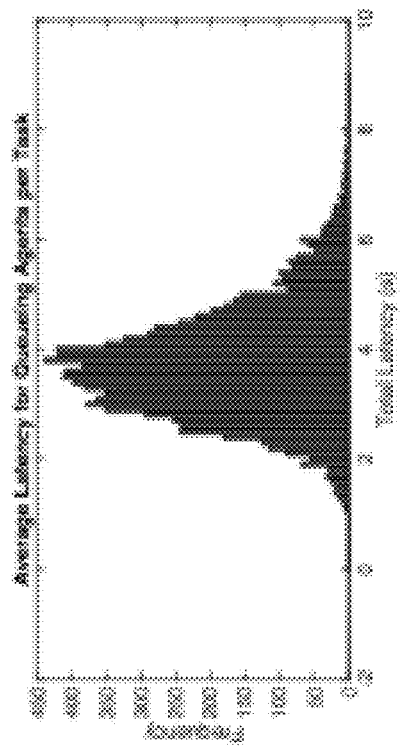
FIG. 35

PLATFORM FOR GATHERING REAL-TIME ANALYSIS

RELATED APPLICATION

This application claims priority under 35 U.S.C. § 119(e) to U.S. provisional application No. 62/237,733 filed Oct. 6, 2015, the entire contents of which are hereby expressly incorporated by reference herein.

TECHNICAL FIELD

The subject matter described herein relates to improving machine decision making.

BACKGROUND

In artificial intelligence (AI), difficult problems are informally known as AI-complete or AI-hard, implying that the difficulty of these computational problems is equivalent to that of solving the central artificial intelligence problem, which is making computers as intelligent as people, also referred to as strong AI. An AI-complete problem is one not solved by a simple specific algorithm. AI-complete problems include computer vision, natural language understanding, dealing with unexpected circumstances while solving any real world problem, and the like. Currently, AI-complete problems cannot be solved with modern computer technology alone.

Current AI systems can solve very simple restricted versions of AI-complete problems, but never in their full generality. When AI researchers attempt to "scale up" their systems to handle more complicated, real world situations, the programs tend to become excessively brittle without commonsense knowledge or a rudimentary understanding of the situation. In other words, they fail as unexpected circumstances outside of its original problem context begin to appear. When human beings are dealing with new situations in the world, they know what to expect: they know what all things around them are, why they are there, what they are likely to do and so on. Humans can use context and experience to guide them in recognizing unusual situations and adjusting accordingly. A machine without strong AI has no other skills to fall back on so some machine decision-making applications are intractable.

SUMMARY

In an aspect, data is received characterizing a request for agent computation of sensor data. The request includes a required confidence and required latency for completion of the agent computation. Agents to query are determined based on the required confidence. Data is transmitted to query the determined agents to provide analysis of the sensor data.

In another aspect, sensor data is received. The sensor data is classified into one of two or more classes by at least a machine computation component including a predictive model trained on data labeled by at least an agent computation component. The agent computation component includes a platform to query an agent. The classification is provided.

In yet another aspect, sensor data is received. Processing by an agent computation component is requested and a result and a confidence measure of the result is received from the agent computation component. The confidence measure of the result exceeds a predefined threshold. The sensor data provided to a machine computation component as an input and the result from the agent computation component is provided to the machine computation component as supervisory data to train a predictive model of the machine computation component.

One or more of the following features can be included in any feasible combination. For example, determining agents can be further based on at least one of a measure of agent quality, a measure of expected agent latency, and proximity to average completion time for a current task. Data characterizing query results from a plurality of the determined agents can be received. Data to query additional agents to achieve the required confidence can be transmitted when two or more of the received query results are inconsistent. A number of additional agents to query to achieve the required confidence can be determined. Quality of available agents in a pool of agents can be determined. A minimum quality required of a to-be-queried agent to achieve the required confidence can be determined.

The measure of agent quality for agents in a pool of agents can be determined. The measure of agent quality can be determined as a ratio of a number of query responses deemed correct to a number of total queries. A measure of expected agent latency for agents in a pool of agents can be determined. The measure of expected agent latency can be determined as a Poisson process. The expected latency can be less than 30 seconds. The agent computation can be defined by a question with at least two predefined answers. At least one of the receiving, determining, and transmitting is performed by at least one data processor forming part of at least one computing system.

The sensor data can be of a security system asset that is an imaging device, a video camera, a still camera, a radar imaging device, a microphone, a chemical sensor, an acoustic sensor, a radiation sensor, a thermal sensor, a pressure sensor, a force sensor, or a proximity sensor.

The sensor data can include an image including a single image, a series of images, or a video. The computational task can include: detecting a pattern in the image; detecting a presence of an object within the image; detecting a presence of a person within the image; detecting intrusion of the object or person within a region of the image; detecting suspicious behavior of the person within the image; detecting an activity of the person within the image; detecting an object carried by the person, detecting a trajectory of the object or the person in the image; a status of the object or person in the image; identifying whether a person who is detected is on a watch list; determining whether a person or object has loitered for a certain amount of time; detecting interaction among person or objects; tracking a person or object; determining status of a scene or environment; determining the sentiment of one or more people; counting the number of objects or people; determining whether a person appears to be lost; determining whether an event is normal or abnormal; and/or determining whether text matches that in a database.

Processing by the agent computation component can be requested and a result and a confidence measure of the result from the agent computation component can be received. The confidence measure of the result can exceed a predefined threshold. The sensor data can be provided to the machine computation component as an input and the result from the agent computation component can be provided to the machine computation component as supervisory data to train a predictive model of the machine computation component.

The agent computation component processes the sensor data by at least: receiving data characterizing a request for agent computation of the sensor data, the request including a required confidence and required latency for completion of the agent computation; determining agents to query based on at least one of: the required confidence, a measure of agent quality, a measure of expected agent latency, and proximity to average completion time for a current task; and transmitting data to query the determined agents to provide analysis of the sensor data.

The machine computation component can include a deep learning artificial intelligence classifier, a deep neural network, and/or a convolutional neural network. The machine computation component can detect objects and classify objects in the sensor data. At least one of the receiving, classifying, and providing can be performed by at least one data processor forming part of at least one computing system.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIGS. 9-11 are tables illustrating example modalities and example security scenarios to which the modality can apply;

FIG. 27 illustrates four plots of latency versus average agent response time;

FIG. 35 is a histogram illustrating average latency for queueing agents per task and a probability distribution for average latency for an example use case.

DETAILED DESCRIPTION

Figure 1:
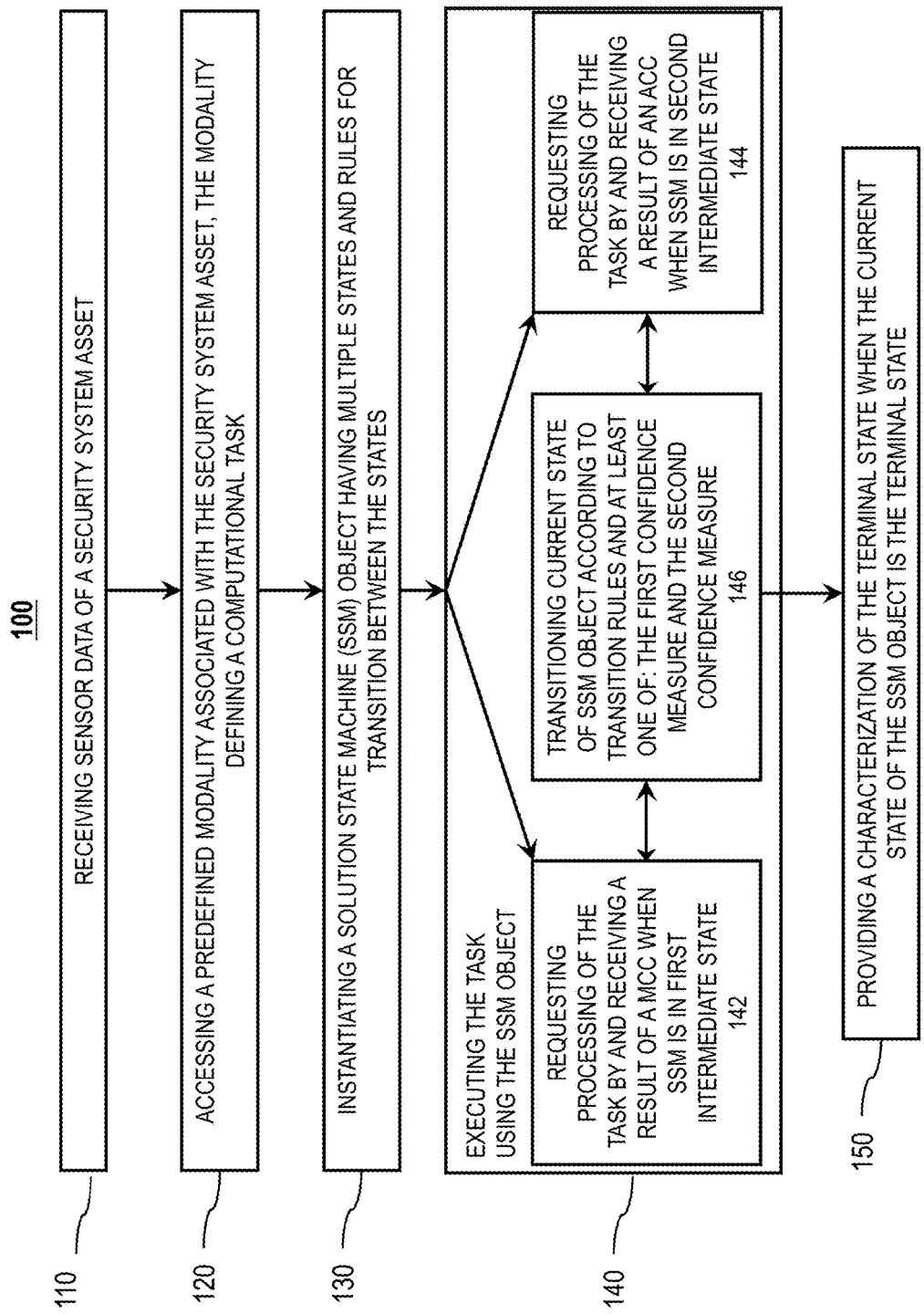
FIG. 1 is a process flow diagram illustrating a method of augmenting artificial intelligence with human intelligence tasks.

The current subject matter relates to utilizing a "human-in-the-loop" (symbiotic human-machine) approach to facilitated decision making. Humans can contribute entirely new decisions/answers or assist when AI is not highly confident, and in that way are augmenting/assisting the machine process in solving a particular task, not merely verifying the computer decision making. The current subject matter can expand the range of use cases to which a machine decision making system or a given sensor and/or analytic may effectively apply. The current subject matter can provide for injection of a human-computation element into a machine decision-making algorithm, allowing for a human to perform (or solve) specific and narrow decisions that the machine decision making system would otherwise be unable to perform (or would perform poorly). The subject matter can be used with applications that do not currently include machine decision-making algorithms or use algorithms that do not adequately meet user needs, for example a closed circuit television system that currently does not have a machine decision-making algorithm or has limited machine decision-making capability. The current subject matter can enable new capabilities and improve machine decision making, for example, by reducing false alarms, increasing hits, reducing misses, and increasing correct rejections.

While great advances have been made in the area of artificial intelligence, the performance of software-only systems often falls short of that which is needed for applications involving analysis of physical world imagery, video, language processing, and the like. Key challenges for end users are the prevalence of false positives ("false alarms"), the variation in system performance caused by changes in circumstances or scene type ("brittleness"), and the inability for these systems to produce human-like outputs in scenarios that are highly subjective or contextual (as is frequently the case in the physical security domain). The current subject matter includes data analysis and handling that uses human-in-the-loop processing (also referred to as human intelligence tasks) alongside artificial intelligence to address the aforementioned challenges, by combining the respective strengths of computer and human processing, while minimizing the amount of human involvement required.

The current subject matter can include an analysis platform for augmenting machine processing with human intelligence tasks to improve performance and reduce false alarms. The analysis platform can include a machine computation component, described more fully below, that can include predictive models built using a machine learning algorithm, for example, a deep learning neural network. The machine computation component can classify input data into two or more classes.

The analysis platform can include an agent computation component, described more fully below, that can include a system for querying a pool of humans to perform a task, such as detecting a presence of a person or object in an image, answering a question regarding a characteristic of the image, and the like. In some implementations, the agent computation component can provide a query result in substantially real-time, such as within 5, 10, or 30 seconds of receiving a query request. In some implementations, the analysis platform can be applied to a security deployment, which is highly subjective and contextual. In some implementations, the analysis platform can be applied to a number of deployment types including closed circuit television, surveillance camera, retail camera, mobile device, body cameras, drone footage, personnel inspection systems, object inspection systems, and the like. Other deployment types are possible.

The current subject matter can include dynamically retrieving additional agent input for false alarm reduction. The current subject matter can programmatically query human agents to achieve a confidence objective, which can relate to a false alarm objective. For example, the platform can start with querying an initial set of agents (e.g., 2), and if there is disagreement between them, the platform can query additional agents to provide feedback, so that the network can grow until a high-confidence result is determined. If the aggregate answer will trigger a false alarm, the platform can obtain additional queries.

The current subject matter can coordinate use and gathering of human intelligence, including performing quality, efficiency, latency, confidence measures in real-time of the agents. To minimize response time, alert queries can have a ceiling for latency. The platform can monitor agent efficiency by analyzing the time each agent takes to complete a task. Algorithms can search for irregularities such as agents taking too long, responding too quickly, and not having an expected amount variation in response time. Confidence in alert judgments can be updated in real time and based on prior agent accuracy and levels of agent consensus. The platform can queue tasks to agents in order to satisfy latency and accuracy requirements for all judgments. When the flux of incoming tasks to the agents is low, the platform can ensure its quality standards among agents by asking questions for which a high confidence correct answer has already been obtained. By combining how often an agent is correct and utilizing real time Bayesian classification based on agent consensus, each agent can be given a score. Measuring agent quality and efficiency enables the platform to reach accurate, real time decisions and to reduce or eliminate false-negative or false-positive alerts.

The current subject matter's pairing of artificial intelligence and human intelligence allows it to answer questions about media that are subjective in nature in a way that is consistent with human experience and judgment and is not solely driven by a computer algorithm. For instance, the platform can determine whether a person who is in an area in which they should not be is behaving in a suspicious manner. The platform can use its artificial intelligence component to detect the person and then use the human agent to determine whether that person is behaving suspiciously, and then progressively train the artificial intelligence to begin to recognize suspicious behavior in that environment on its own.

The current subject matter can capture agent input to augment artificial intelligence. The platform incorporates a user interface for agents that enable them to serve as artificial trainers in real-time. For example, when an agent answers simple questions (e.g., Yes/No or multiple choice) and clicks on regions of an image, they can be simultaneously answering a task that has security value and also training an artificial intelligence component. There can be a layer between the user interface and the artificial intelligence ground truth dataset that captures user inputs and converts them (alongside media) into ground truth data, while adjusting the importance of that ground truth data based on an automatic determination of agent confidence when providing it.

The current subject matter can include use of modalities, which enables any given problem to be broken or segmented into computational tasks. Some tasks may be better performed by an existing artificial intelligence predictive model while other tasks may be better performed by a human. The current subject matter can route a given task for processing by either an artificial intelligence processing component or an agent (e.g., human) processing component. The concept of modalities can be extended to composite modalities, whereby multiple modalities are combined (e.g., strung together) to solve more difficult and even subjective tasks. Composite modalities can be accurate because the confidence of the result of each underlying modality can be high (e.g., treated as truth).

The current subject matter can use machine confidence as a routing mechanism. A metric can be computed for task confidence for each task in real-time by first taking the artificial intelligence component's confidence for that task (as reported by that algorithm) and then modifying it according to a learned function that accounts for circumstances that have empirically shown to cause unreliable confidence indications. When a confidence metric is low enough, the task is sent to human agents, who further evaluate it, and whose judgments can be gathered in such a way that they can result in a confidence threshold being attained. Modalities may be configured such that agent feedback can again be used as input into an artificial intelligence component to further refine the answer or result of the task.

Because some artificial intelligence systems can be continually trained, their performance can improve over time. Thus, the current subject matter can route tasks based on machine performance, which can be represented by a confidence metric produced by the artificial intelligence system. As the artificial intelligence component is trained on more real-world data, the artificial intelligence component becomes more accurate and less agent input is required. Thus, the relative processing burdens between the artificial intelligence component and the human intelligence component is dynamic and can vary over time.

Figure 23:
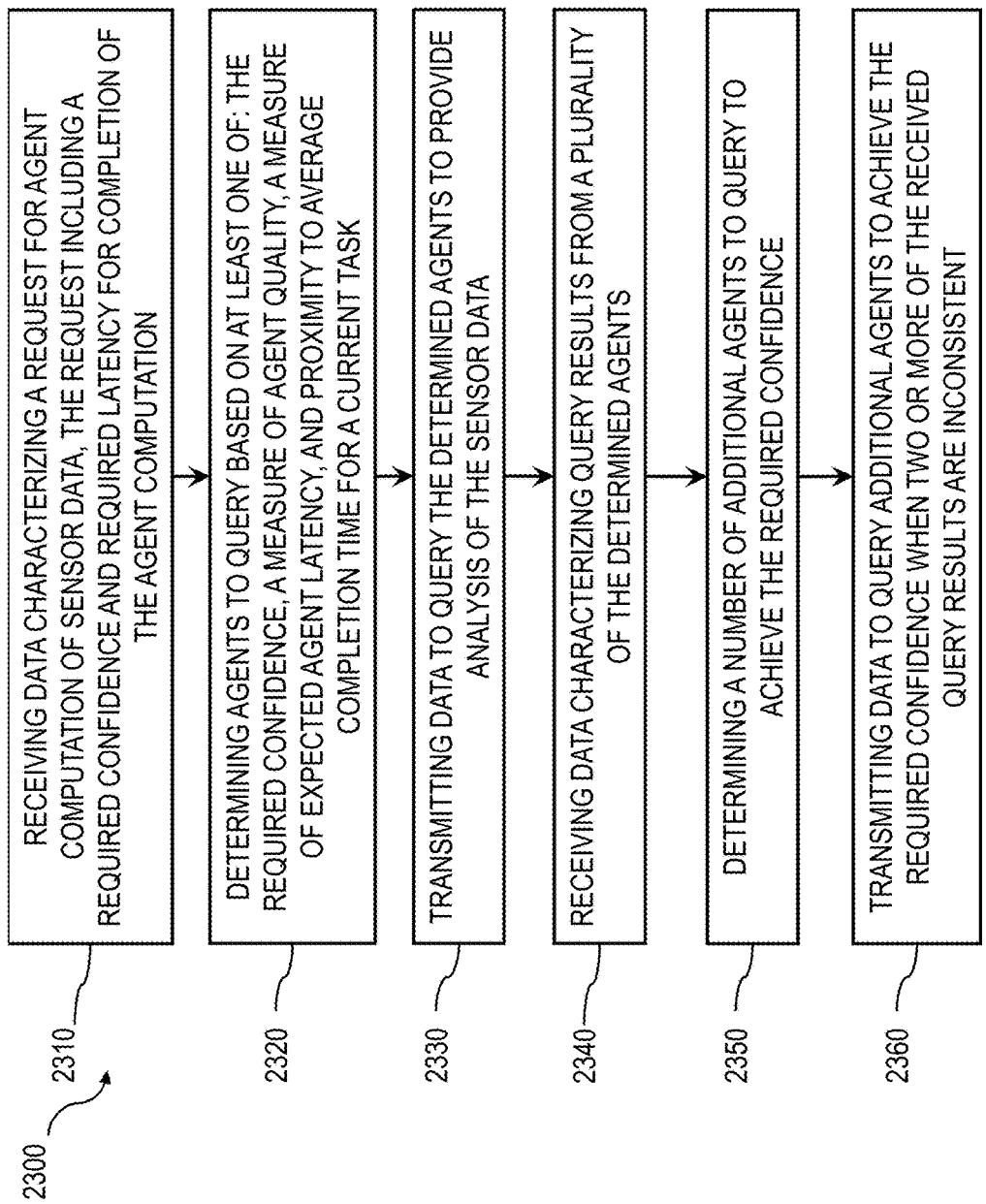
FIG. 23 is a process flow diagram illustrating an example method for managing agent queries to ensure confidence in a result provided by an agent computation component.

FIG. 23 is a process flow diagram illustrating an example method 2300 for managing agent queries to ensure confidence in a result provided by an agent computation component. The method 2300 may be performed, for example, by an agent computation component such as agent management services 555. In some implementations, an agent computation component can return agent queries and provide a confidence in the result. Further, in some implementations, an agent computation component can return agent queries within a requested amount of time. But agents are not infallible and therefore the quality (e.g., accuracy) of their query results can vary. In addition, agent query response time can vary (both inter-agent for the same query and inter-query for the same agent). Thus, it can be challenging to ensure both quality and the amount of time an agent will return a result.

At 2310, data is received characterizing a request for agent computation of sensor data. The request can include a required confidence of the agents for returning a result. For example, the request can specify that agent computation should return a result having 0.9 confidence that the result is correct. The request can include a required latency for completion. For example, the request can specify that the result of agent computation should take no longer than 30 seconds to return. These requirements enable an augmented artificial intelligence security system to react to conditions in substantially real time so that it can provide meaningful response. For example, if the security system is intended to monitor the physical security of a building, and a break-in occurs, the system should respond within sufficient time to mitigate any risk or damage that is occurring.

At 2320, agents to query or how many agents in a pool of agents to query can be determined. The determination may be made in an attempt to achieve the required confidence and required latency. For example, for a given required confidence, the number of agents to query can be determined by:

$$\text{Confidence} = 1 - \sum_{k=0}^{\lfloor n/2+1 \rfloor} \binom{n}{k}(1-p)^{n-k}(p)^k q_k$$

Where p is a known probability that an individual agent responds correctly, n is the number of agents responding to a single task, and q is the probability that k agents disagree on a given task with $$\sum_{k=0}^{\lfloor n/2+1 \rfloor} q_k = 1$$

Figure 24:
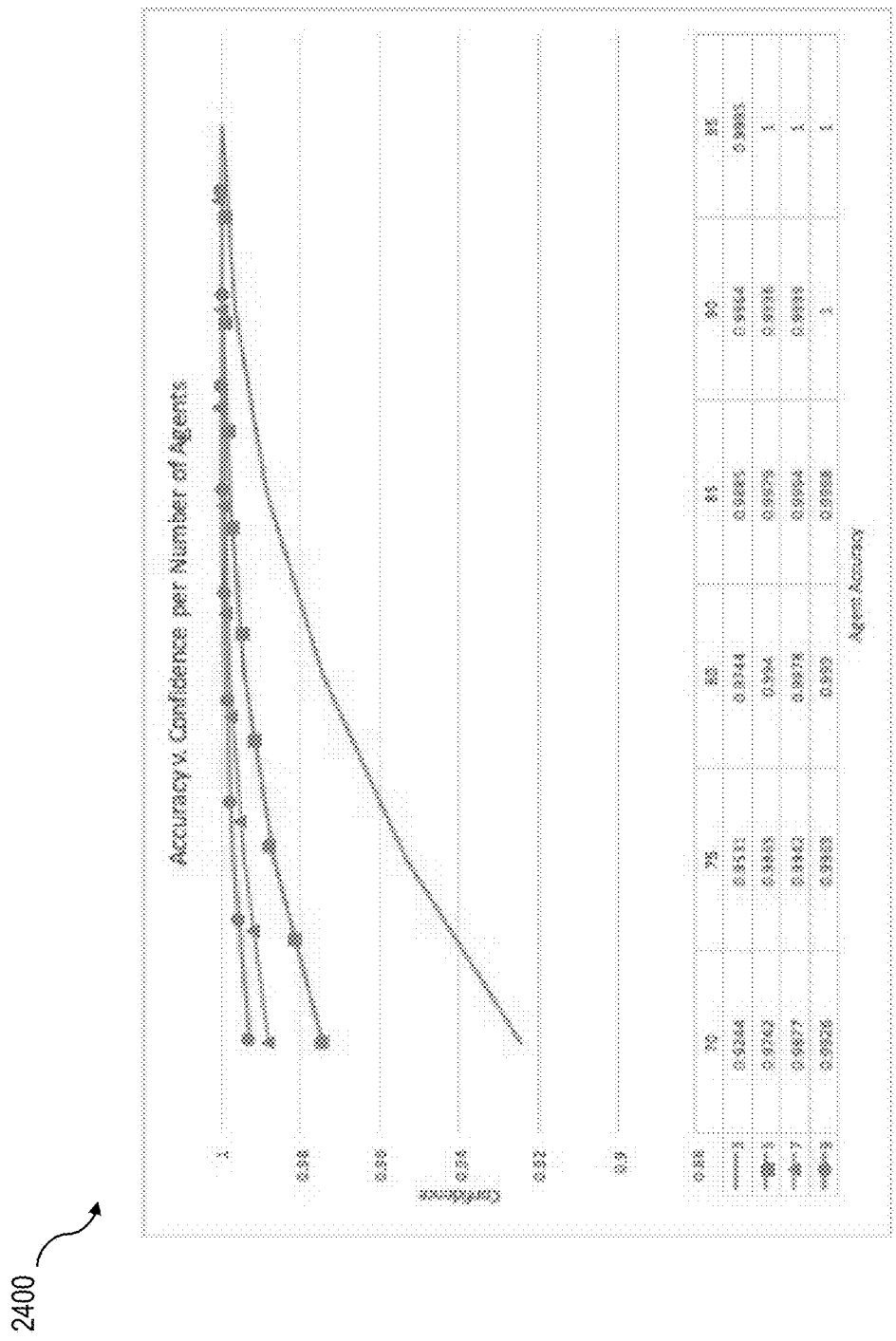
FIG. 24 is a graph of accuracy vs. confidence per number of agents using the above-described model.

FIG. 24 is a graph 2400 of accuracy vs. confidence per number of agents using the above-described model. The horizontal axis is the empirically determined historical accuracy of a given agent, which can be determined on an individual basis or by measuring the accuracy of that agent's cohort. The horizontal axis ranges from 70% to 95% (e.g., 0.7 to 0.95). The plot illustrates the number of agents who are in agreement on a given question. At the lower left corner of the graph: individual agent is 70% confident and there are 3 agents in agreement, resulting in an overall confidence from the agent computation piece is about 0.925. Accuracy increases based on raising the accuracy of the individual agent (if 3 agents who are each 90% accurate agree, the confidence is >0.99) or increasing the number of agents whose judgments are aggregated (if 5 agents agree and all are 70% accurate individually then confidence is about 0.975).

In addition, for a given required latency, the expected latency for agents can be considered as a Poisson process. Latency expectation can be based on the number of agents needed to exceed the required confidence. In some implementations, the expected latency can be computed as $$\text{Expected Latency} = (z + z/2)\sqrt{n}$$

Where z is the average individual agent response time and n is the number of agents required to meet the required confidence. If the latency is too high, the number of agents n can be lowered, and both confidence and expected latency can be reevaluated to determine whether the confidence and latency constraints can be met. If the constraints cannot be met, a best-effort can be made to achieve another confidence and/or expected latency.

Figure 25:
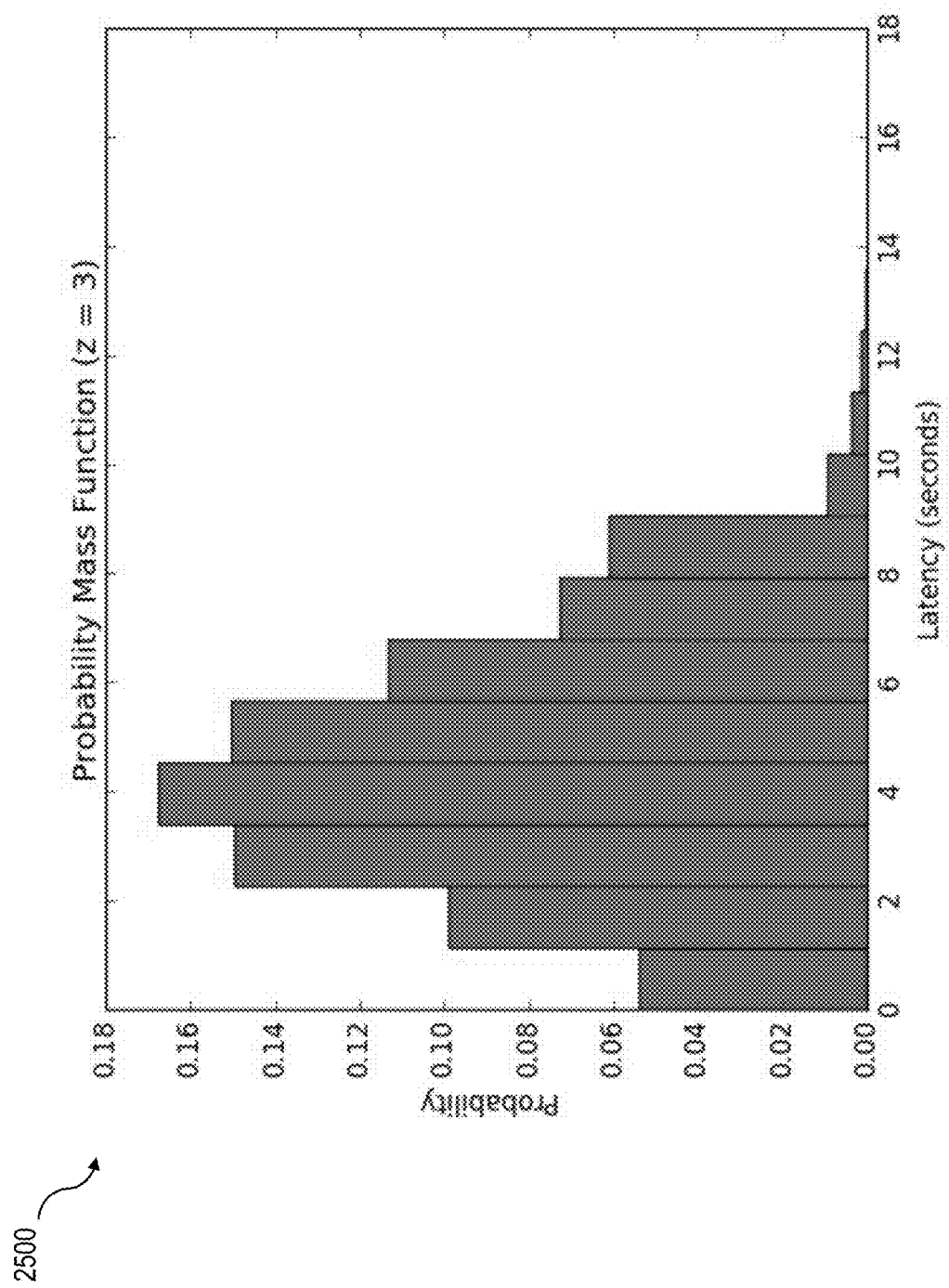
FIG. 25 is a bar graph illustrating an example probability mass function of expected latency when expected latency is modeled as a Poisson process.

FIG. 25 is a bar graph illustrating an example probability mass function 2500 of expected latency when expected latency is modeled as a Poisson process as described above. For n agents responding to the same query, the graph scales linearly to the right as a multiple of the square root of n.

Referring again to FIG. 23, at 2330, data can be transmitted to query the determined agents. The query can be to provide analysis of the sensor data according to the received request for agent computation. In some implementations, more agents can be queried than is needed to satisfy the latency and confidence requirements. An agent can receive queries, for example, using a client. Each of the agents can be presented with the sensor data and question with at least two predefined answers. For example, the question can include "is there a person in the image" and the predefined answers can include "yes", "no", or "unknown." The agent can provide a result by selecting one of the predefined answers and the agent's client can transmit the selection as the agent result.

At 2340, data can be received characterizing query results from the determined agents. The query result can include a selection of one of the predefined question answers (e.g., "yes" or "no"). In some implementations, the query result can also include a confidence provided by the agent (e.g., 0.9).

At 2350, a number of additional agents to query to achieve the required confidence can be determined. As the query results are returned, if multiple agents do not have the same responses and there is no way that the confidence threshold can be reached given the disagreement between agents, additional agents can be queried. For example, if three agents are queried with a required result confidence of 0.9 (and it is previously determined that all agents need to return a positive answer to result in a greater than 0.9 confident positive answer), yet two agents return a positive result and one agent returns a negative result, additional agents need to be queried in order to return a high-confidence answer. How to determine the number of additional agents to query can vary and some variations are described more fully below.

At 2360, additional agents can be queried to achieve the required confidence when two or more of the received query results are inconsistent. The query can be to provide analysis of the sensor data according to the received request for agent computation. The additional agents can receive the queries, for example, using a client. Each of the additional agents can be presented with the sensor data and question with at least two predefined answers. For example, the question can include "is there a person in the image" and the predefined answers can include "yes", "no", or "unknown." The additional agent can provide a result by selecting one of the predefined answers and the additional agent's client can transmit the selection as the additional agent result.

As noted above, the number of agents to initial query to achieve the required confidence and a number of additional agents to query to achieve the required confidence when the initially tasked agents disagree can be determined in a number of ways. For example, in some implementations, combinatorics can be used to determine how many more agents the task should be sent to. When an empirical value (e.g., agent confidence metric) is determined that estimates the probability an answer reported by an agent is correct, then to calculate for the aforementioned confidence is more accurate. The new probabilities establish an upper and lower bound on the confidence. These bounds which can be used to minimize latency by minimizing the amount of agents that need to complete each task while still maintaining a high confidence. In some implementations, an agent's answers can be compared to the crowd and each of them given a rating. The rating can be based on how like-crowd their answers are, and it can be used to call agents with top ratings more frequently or for higher paying tasks. Continuous update of each agent's probability of selecting the correct choice on a task is possible. Each agent's specific rating can be used to calculate their query result confidence. In addition, it can be determined whether an agent is simply selecting random answer in order to collect a completion reward. This can be done by using a probability of answering incorrectly by random chance as a comparator to establish a level of confidence in how the agent is responding.

In some implementations, the number of agents to task can be determined. The required confidence, number of options in multiple choice questions, and the agents' responses can be taken as input. The number of agents required to respond to the task in order to achieve the desired confidence can be determined. The agents can be queried and if the queried agents all have the same response the agent management services can return the result and confidence. If the queried agents do not have the same response, then the number of additional agents that the task should be sent to in order to reach the desired confidence can be determined, the additional agents can be queried, and whether the confidence has been reached can be determined. This can repeat until the required confidence is reached or a maximum latency is reached. In some implementations, in the event that agents cannot agree (e.g., there is a lot of confusion in an answer such as no agent consensus after 10 agents) the most selected response can be provided as the result with a measure of confidence that does not meet the required confidence (e.g., a best-effort result). In some implementations, high-quality or confident agents can be queried and their result can be taken as correct with high confidence.

In some implementations, questions are limited to multiple choice. "Select all that apply" questions can be used but it can be much harder to reach a consensus among agents (e.g., 2^{number of options} harder). In some implementations, responses from all agents can be equally or unequally weighed (e.g., based on an agent confidence metric). Equal weighting of agent response can save time while giving more weight to experienced agents can decrease disagreements that occur from simple agent inexperience, negligence, and the like.

In an example implementation, it is possible to determine the initial confidence by calculating the probability that all agents answered the same question by random chance and subtract from the entire probability space. Letting: n=number of agents; x=number of choice options in question;

$$\text{Confidence} = 1 - x\left(\frac{1}{x}\right)^n$$

this operation can be implemented in pseudocode: while (options*((1/options)**agents)>=(1−confidence)): agents+=1; return agents. The calculation can repeat for confidence by incrementing the number of agents. When the probability that all of the agents give the same response by random chance goes below 1-confidence, halt, and output smallest number of agents to reach desired confidence.

In the example implementation, it is possible to determine the number of additional agents to query to achieve the specified confidence by calculating the new confidence after adding an agent that gives the response with the maximum votes. The process can continue to do this, until the updated confidence is at least the old confidence. This can minimize the amount of agents that the task gets sent to. To calculate the updated confidence, the process can use the binomial theorem as follows (where: n is the number of total agents; k is the number of agents that agree; x is the number of choice options in question; and p is 1/x (does not use fraction of crowd errors)).

$$\text{Confidence} = 1 - x\binom{n}{k}(p)^k(1-p)^{n-k}$$

This can be implemented in pseudocode as

```
while ( updated_confidence > (1−confidence) ):
    agents += 1
    max += 1
    updated_confidence = options * combination(agents,max) *
(1/options)**(max) * (1−(1/options))**(agents−max)
```

The process can loop by incrementing the number of agents and the max number of votes until the desired confidence is reached. The process can test each loop whether the error is still greater than the error allowed by the desired confidence (e.g., 0.05 in the case of 0.95 confidence). The process can record the agents and the max and send the task to the amount of new agents needed (e.g., number of agents now needed minus number of agents who have already responded). The process can test whether the most voted response reaches max.

The following tables provide example confidence levels for four and three choice queries, respectively.

Four Choices:

| # Agents | # Agree | Confidence |
|---|---|---|
| 4 | 3 | 0.813 |
| 4 | 4 | 0.984 |
| 5 | 4 | 0.941 |
| 5 | 5 | 0.996 |
| 6 | 4 | 0.868 |
| 6 | 5 | 0.982 |

Three Choices

| # Agents | # Agree | Confidence |
|---|---|---|
| 4 | 3 | 0.704 |
| 4 | 4 | 0.963 |
| 5 | 4 | 0.877 |
| 5 | 5 | 0.988 |
| 6 | 4 | 0.753 |
| 6 | 5 | 0.951 |

Figure 26:
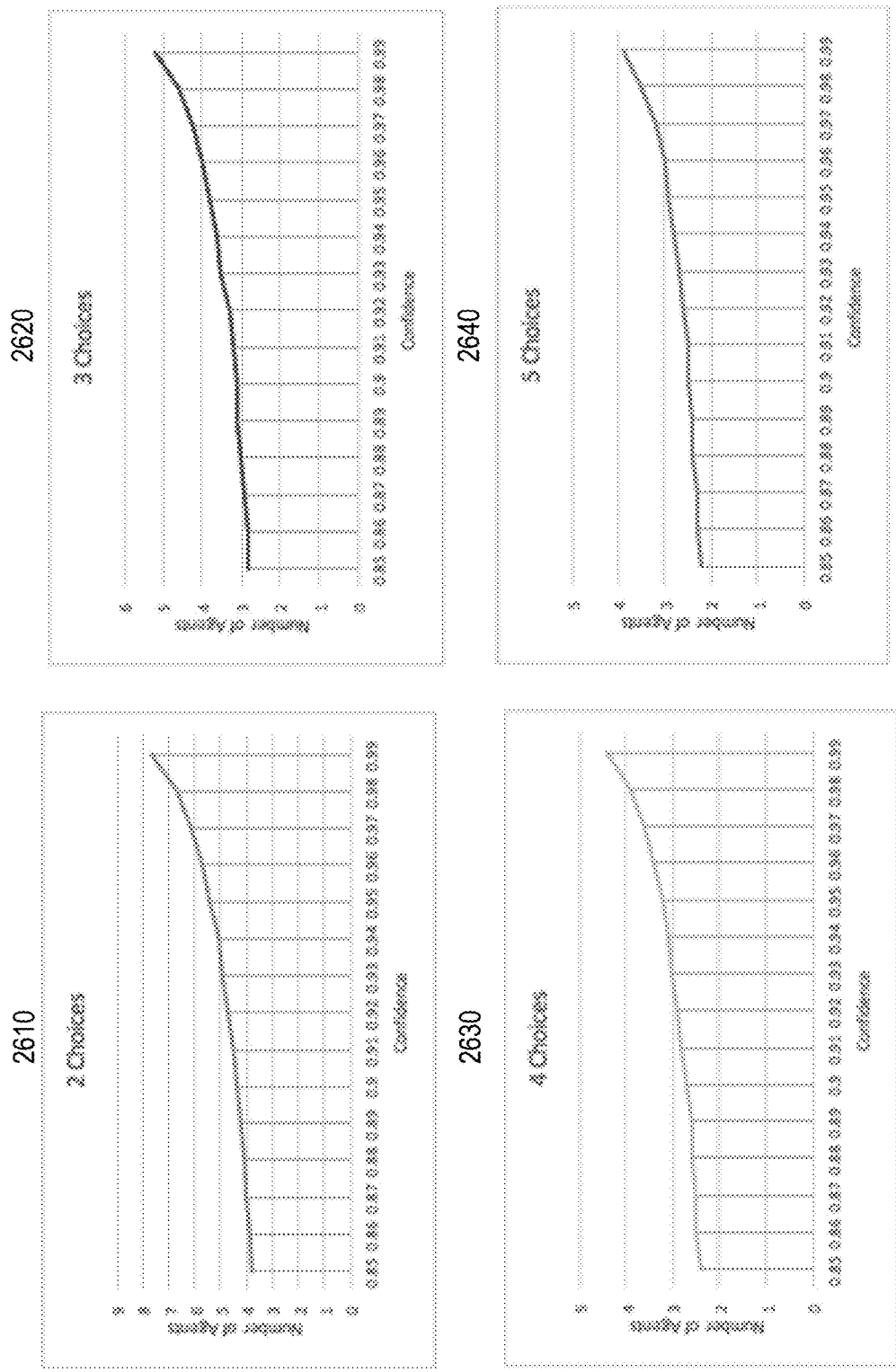
FIG. 26 includes four plots showing the number of agents required to meet a confidence value according to an example implementation.

FIG. 26 include four plots (2610, 2620, 2630, and 2640) showing, for the number of choice options in the query, the number of agents required to meet a confidence value according to the example implementation. The assumption for each plot is that agents respond with the same choice on an N choice question, where N is 2-5 (for N=3 would be choice A, B, and C, and assuming all agents choose the same result). The values in between the discrete agents correspond to a fractional number of agents (nonphysical) unless implementing a weighting system to include more than "1" vote for high-confidence agents. As an example, in the 3 choice graph (2620), 4 agents responding with the same choice will give 0.963 confidence and 3 agents responding with the same choice will yield 0.889 confidence. To obtain 0.90 confidence, for example, would require 3.1 agents. It can be optimal (e.g., minimizing agents while maximizing confidence) to choose the number of agents associated with the jump immediately following the longest pattern at one whole agent. For example, in the 3 choice graph (2620), the confidence value spends the most distance between 3 and 4 agents so the optimal decision would be to task 4 agents for 0.963 confidence. The less question options included, the more agents are required to all agree at first to reach the same confidence. For example, for 0.95 confidence, 2 choices-6 agents; 3 choices-4 agents; 4 choices-4 agents; 5 choices-3 agents. In the event of disagreement, the number of agents required to agree will vary based on the number of choices.

When a portion of the responses that a group of agents agrees on is incorrect, the confidence (or estimate of error) can be adjusted. Using the conditional probability will decrease bound put on the error, allowing more effective use of agents. This can be considered if the crowd of agents agrees on the wrong answer. If the initial crowd doesn't agree, then more agents can be called as previously mentioned. An assumption can be made that each agent has the same probability of selecting the correct answer. In addition, the number of options can be no longer a factor because it is included with the probability of correctness. It is possible to calculate the error given a constant that has been empirically determined to be the probability of a wrong responses among attentive agents by $$P(A \mid B) = \frac{P(AB)}{P(B)} = \frac{\binom{n}{k}(x)^k(1-x)^{n-k}}{\binom{n}{k}(1-x)^k(x)^{n-k} + \binom{n}{k}(x)^k(1-x)^{n-k}}$$

$$\text{Error} = 1 - P(A \mid B)$$

This can be implemented in pseudocode as:

```
def combination( n, k, p):
    f = math.factorial
    comb = (f(n)/(f(k)*f(n−k))) * (p)**r * (1−p)**(n−k)
    return comb
def invcomb( n, k, p ):
    f = math.factorial
    icomb = (f(n)/(f(k)*f(n−k))) * (1−p)**r * (p)**(n−k)
    return icomb
confidence = combination(n,k,p) / (invcomb(n,k,p) +
combination(n,k,p))
error = 1 − confidence
``` where x is the probability of correct answer for crowd; A is the crowd of agents that was correct in response; B is the crowd of agents that agreed on an answer; AB is the crowd that agreed on correct answer; k is the number of agents needed to agree in order to meet confidence; n is the total number of agents that responded to question; and P(A|B) is the confidence. The method of calculating the conditional probability given an estimate of the wrong responses from the agents gives a smaller bound on the error and allows for utilizing fewer agents in some situations. Some intermediate estimate of error between considering the empirical error and estimating based on random chance can be used. For example, estimating the confidence naively (using random chance) for 4 choices with 4 of 5 agents in accord is 0.941 with a conditional error of 0.036, but if it's shown that 0.90 of crowd responses are correct, then the confidence of the same situation moves to 0.999 with an estimated error of 0.0014.

Assuming the pool of agents is determined to be correct 90% of the time, the following confidence values are provided. Further assumptions include that each individual agent has the same probability of answering with the pool.

| # Agents | # Agree | Confidence |
|---|---|---|
| 4 | 3 | 0.996 |
| 4 | 4 | 0.999 |

-continued

| # Agents | # Agree | Confidence |
|---|---|---|
| 5 | 4 | 0.999 |
| 5 | 5 | 0.999 |
| 6 | 4 | 0.998 |
| 6 | 5 | 0.999 |

The level of confidences is varied compared to the above where the probability of selecting correctly was assumed to be equal to random chance. For example, in the four choices per question case with three of four agents recording the same answer, there is a confidence difference of 0.183 between the two metrics.

In some implementations, result confidence is determined when each agent has an associated confidence measure. Where each agent is scored based on how frequently he/she responds with the pool, assuming agents have high confidences, this approach yields higher confidence in the pool answer, uses less agents, and decreases latency. Calculating the confidence in an answer where multiple agents have responded can be based on each of their respective error probabilities. For example, if the desired confidence of a response is 0.95, then having one agent with a 0.90 probability of correctly answering a question is not satisfactory. Therefore, another agent needs to be queried. If this second agent also has a 0.90 confidence is his/her response, and the two agents have the same answer, then the total error in their combined response is (1−0.90)*(1−0.90)=0.01 which corresponds to a 0.99 confidence (greater than the desired 0.95. If the agents do not answer with the same answer, then the question should be routed to another agent and the confidence of the answers can be similarly computed.

$$\text{Confidence} = 1 - \binom{3}{2}(confidence_{agent1})(1 - confidence_{agent2})(1 - confidence_{agent3})$$

In the event that three agents do not agree or the aforementioned confidence is beneath the threshold, then the task can be handled in another manner because adding another agent brings this model no advantage (e.g., not tracking the percentage of correctness and tracking is as a crowd and not per agent). As a result, to decrease latency, it is possible to accept the answer that was given by the agent with the highest individual confidence.

In some implementations, too many duplicate queries are submitted to the agent management services. It is possible to put a time cap on how frequently the event detector can detect and classify "different" events. Events can be searched for at five second intervals, and about three images are sent per duplicated event. This means that per duplicated event, there are two back-to-back events recorded. Therefore, some implementations only allow the event detector to classify events as different if they are 15 seconds apart, thereby only including the first of three duplicates for one event. Using conditional probability this is possible.

$$P(\text{duplicate} | \text{hits } 5s \text{ apart}) = \frac{P(\text{duplicate} \cap \text{hits } 5s \text{ apart})}{P(\text{hits } 5s \text{ apart})} = \frac{A*(2/3)}{P}$$

In other words, if the probability of getting a hit within five seconds of the last hit and it not being a duplicate is only 1% higher than that of getting a hit within five seconds of the previous hit and the two of them being duplicates, then the probability of a duplicate given back to back hits is 96%. Therefore, instructing the event detector to ignore back to back hits will have an error of 4%.

In some implements, agents only answer multiple choice questions because free form replies or annotations can be inconsistent. This approach can include providing that agents only have to answer yes/no questions. In order to get a high confidence with a low number of agents, a different method, rather than simply asking multiple agents the same question can be worthwhile. For example, if the machine computational component concludes there is a vehicle present, then assume that it is correct. This tree splits categories in half each time, to yield 8 possible choices at the end of the tree. This method will require $\Omega(\log_2(n))$ agents where n is the number of situations to account for (some models requires $\log_2(n)$ agents but the questions are not yes/no). At each step an agent can be given a "None of These" type of option that will then cause the system to pop back up to the previous layer to let the same agent reevaluate. In addition, beyond the tree could be an annotation question where an agent is prompted to write in information about a question such as: "describe the taxi in the image". This clarifies the previous agent's response and yields additional information. When an agent selects an option on the log(n) level, where n=8 in this case, the confidence in the answer will be:

$$\text{Confidence} = 1 - 2 * \prod_{m=1}^{\log(n)+2} \left(\frac{1}{2}\right)^m$$

In this case, with n=8, once the question reaches the bottom layer, the confidence in a vehicle being present is 0.938. This level of confidence is much higher than some other approaches, requires the same amount of agents, and requires no assumptions or data on the accuracy of agent responses. In an intrusion scenario when the goal is to identify if a person is in an area that he/she shouldn't be, then it is possible to simply ask two agents whether a person within the region of interest. If the two disagree, then call a third agent and take the answer with the majority vote. The confidence in this case won't be very high (0.50 or 0.25 if three agents are needed), but a max of three agents will be needed. Another approach for the intrusion scenario might be to gain more information about a person by utilizing a tree approach.

This approach (e.g., using tree diagrams) works because there is an implicit agreement between consecutive agents. For example, when an agent selects "taxi", he/she agrees with the machine computation component that a vehicle is present and with the agents before on the fact that the answer was contained in the previously selected categories. Using the machine computation component as an agent when calculating the confidence gives this approach extra confidence, which happens to be a factor of 2. To go through the first scenario, there is a confidence of 0.938 that a vehicle is present, a confidence of 0.875 that the vehicle belongs to a category such as "police, postal service, taxi, bus", a confidence of 0.75 that the vehicle is a "taxi or bus", and a confidence of 0.50 that the vehicle is a "taxi". However, the last agent, the fourth agent, providing the annotations, will clarify and his/her response will increase the confidence significantly. At any point if an agent does not see an option that relates to the photo, then he/she can select the "None of these" option, which will transition the question up a layer for more generality. In the non-tree model, if an agent gives a response that is not the same, then more agents can be called to reach a certain confidence. But this can take 6, 7, and even more agents depending on the desired confidence and the number of choices in each question. An advantage that the tree model has is that a "wrong" response does not penalize the latency as much, and selecting the "None of these" option only sets back 1 agent (not two or so for each dissimilar answer in the non-tree model).

In some implementations, it is possible to classify agents as "experts" or otherwise as reliable agents. The classification can utilize a Bayesian classifier combination approach. In some implementations, when determining which agents to query (either initially or additional agents where there is disagreement among query results), a minimum quality required of a to-be-queried agent can be determined to achieve the required confidence.

The sending of the determined amount of tasks to as many agents can be instantiated. In addition, if the number of choice options on a single question is high, a small number of agents can be utilized for verification. However, other factors can contribute to users answering different answers and requiring the calling of more agents. A zone between 3 and 5 choice options can require 3-4 agents to review the task. This allows for a considerable agent pool review of the task, but one that is small enough to be feasible in close to real time. This can work with multiple choice questions. To speed up the process and reduce the amount of disagreements, a weighting system for experienced agents can be implemented. This allows for certain agents to carry a vote that goes over +1. The objective can be to reach a conclusion of a certain confidence based on agent response, and if the first batch of agents can't get that confidence, this approach can send it to a calculated number of additional agents in order to meet the confidence.

In some models, agent performance can be tracked and in others performance can be tracked individually or as a group. This implies that the percentage of group answers that are correct is constantly updated and used to determine confidence. The second approach includes an assumption that agents answer just as correctly as the group. Another approach is to track the proportion of correct responses per agent. This gives a more accurate level of confidence in the answer received. In addition, this model inherently requires fewer agents than some previously describes models to complete each task. An issue with this model arises if all of the called agents give different responses. At that point, the answer given by the agent with the highest proportion of correct answers can be accepted or a special worker can be tasked. In addition, agents with high confidences can be given opportunities to be the sole agent on a task.

Different approaches can result in different levels of accuracy, latency, and required agent queries. In a first model where all agents are assumed to be equal and bad, yields the most accurate results; however, the tasks require a lot of agents. A balance between assuming agents are bad and trusting them is possible. In some implementations, at least two agents can answer each task. If on average when 2 agents agree, they yield a correct response 0.80 of the time, then the probability that they are both wrong is 0.04. In fact, given that two agents respond, their individual probabilities of correctness can be as low as 0.70 to have a collective confidence of greater than 0.90 and an individual probability of correctness of 0.78 for a collective greater than 0.95.

However, given that nothing is known (in this approach) about the agents, the confidence with two agents selecting the same response is between 0.50 and 0.80 depending on the number of question options (0.50 2 options, 0.80 5 options). Assuming agents take two seconds per response and it takes one second to both pass through the first round of AI and notify the right people after the agent computation component, then two to four agents can view each task while maintaining responses in substantially real time. Given that information, the questions can be designed in such a way that there are three choice options. Then, as soon as two agents respond with the same response, assume the answer is correct. This way, four agents is a maximum allowed agents, completing the task in nine seconds. In having three option choices and assuming the first two agents respond with the same answer, the confidence is 0.67 (assuming no knowledge about agent accuracy). If two of the first three agree, the confidence becomes 0.33 and if two of four agents agree, then the confidence is 0.11. However, if agents are assumed to be better than just guessing at random, for example, agents respond along with the pool answer just 60% of the time—the aforementioned confidences rise to 0.84, 0.712, and 0.654, respectively. For a five question prompt with public service, commercial, private, not a vehicle, and duplicate as the options, duplicate can be not utilized.

In some implementations, agents answer yes/no or very short (3-4 option) multiple choice questions. To get specifics, such as the type of vehicle, the tree model can be utilized. However, in answering simple questions such as: "is a vehicle present" or "is there a person there", then the model where it is assumed that each agent is of a certain caliber can be advantageous (e.g., collecting data on how often agents are correct and use that to generalize for all agents). This approach can provide low latency while maintaining a relatively high confidence. For example, if the agent pool answers with what is deemed to be 80% accuracy, then given that the first two agents respond with the same answer, there is a 0.96 confidence in the response. If the first two disagree, then there is a 0.904 confidence in the response (yes/no question, the third agent is tiebreaker). In addition, as mentioned above, it is possible to calculate the error associated with this type of agreement among the agent pool.

In some implementations, the quality of available agents in the pool of available agents can be determined. Agent performance can be evaluated on several individual characteristics such as quality, efficiency and fraud detection. In some implementations, a minimum quality required of to-be-queried agents can be determined to achieve the required confidence.

In order to assess agent quality, agents can be evaluated based on how often they respond correctly queries with known answers. For example, a database of images, questions, and correct answers to the questions can be maintained. Each agent can be queried on these known queries, for example, when they would otherwise be idle (e.g., not being queried by a live event). Accuracy can be determined as $$\text{Accuracy} = \left(\frac{\text{Number of correct responses}}{\text{Total number of tasks}}\right)^2$$

Agent efficiency can be assessed by measuring their response time to a query and comparing that response time to a metric, such as a target response time, or target response time variance. For example agent efficiency can be computed as $$\text{Latency Penalty} = \frac{|\text{Average agent response time} - \text{Target response time}|}{2\sigma_{target}}$$

Variance Penalty =

$$\left(\frac{|\text{Latency standard deviation} - \text{Target standard deviation}|}{2\sigma_{target}}\right)^2$$

Some agents may attempt to answer queries without fully considering the query (e.g., always selecting "yes"). This can be considered fraud by the agent. To detect an agent answering too quickly, an agent can be considered to be answering too quickly if he or she is under one standard deviation below the expected variance in latency and if the agent has responded to two questions in a row with a latency two standard deviations below the expected latency. Approximating the latency distribution as Gaussian over many tasks can be computed as $$\left(1 - \frac{1}{\sigma_{latency}\sqrt{2\pi}} \int_0^{2+2\sigma_{latency}} e^{\frac{-(x-2)^2}{2\sigma_{latency}^2}} dx\right)^2$$

$$\left(1 - \frac{1}{\sigma_{variance}\sqrt{2\pi}} \int_0^{2+\sigma_{variance}} e^{\frac{-(x-x)^2}{2\sigma_{variation}^2}} dx\right)$$

Where z is average agent latency, and v is average standard deviation among agent latency. As a result, an agent in this group is extremely unlikely to exhibit these results by chance, and an agent answering with such a pattern can be considered inaccurate.

Efficiency and quality metrics can be combined to provide a composite assessment of agents. Some agents may be highly accurate but slow while other agents may be inaccurate but fast. Thus, the combined score can be used to weigh the benefits of agents who answer questions more quickly but may make slightly more mistakes. The following is an example implementation for combining the quality and efficiency metrics.

```
target_mean =5.0   #median Time
target_std=2.8   #median STD
#Time is array of average latencies
#Correct is array of the number of correct responses for each agent
#Total is array of number of tasks handled by each agent
#STD and STDd contain standard deviations in latency for each agent
#Efficiency, Quality, and Score are the agents evaluation scores
for i in range(0,len(Agents)):
   q=(Correct[i]/Total[i])**2
   Quality.extend([q])
   if Time[i] > target_mean:
      L=-0.5*abs((target_mean-Time[i]))/(2*target_std)
   else:
      L=0.5
   if STDd[Agents[i]] > target_std:
      E=-0.5*(abs((target_std-STDd[Agents[i]]))/(2*target_std))**2
   else:
      E=0.5
   le=L+E
   Efficiency.extend([le])
   #weight quality and efficiency evenly
   s=.5*q+.5*le
   Score.extend([s])
```

In some implementations, it is possible to classify agents as experts or otherwise as reliable agents. The classification can utilize a Bayesian classifier combination approach. In some implementations, when determining which agents to query (either initially or additional agents where there is disagreement among query results), a minimum quality required of a to-be-queried agent can be determined to achieve the required confidence.

Classifying agents can be implemented as iterative algorithm using a randomized bipartite graph (tasks and agents) that can allow for no knowledge of prior parameters. Majority voting is less accurate and can require more agents. Utilizing an iterative learning approach, the probability of an error only significantly decreases after about 5-7 workers. A hybrid of majority voting for smart judgement aggregation and Bayesian classifier combination approach is possible for auto-quality control. Back propagation, expectation-maximization, and other machine learning type classifiers are possible. Features can include a back propagation like weighting system to rate agents, use of softmax to determine probabilities confidences; sequential probability (e.g., ratio test) where initial expected fraction of hits is known; generating an estimated Poisson distribution based on an artificial intelligence threshold (error=1−threshold) and update empirically; receiver operating characteristic (ROC) can be effective to see false positives and false negatives; model assumptions that a good worker should have the same false positive rate (FPR) and false negative rate (FNR) but a really bad worker could have a similar spread; can integrate curve numerically; confusion matrix mapping can record false negative rate and false positive rate; iterative algorithms that assumes no knowledge of a prior parameters, hybrid models can include sum of log(probability) to determine Gaussian approximation and then variance can be used to rate agents.

FIG. 27 illustrates three plots (2710, 2720, 2730, and 2740) of latency versus average agent response time for 3 agents per task (2710), 5 agents per task (2720), 7 agents per task (2730), and 9 agents per task (2740). Each plot relates to an example system where 10 alerts occur per day, 304 per month, with an average agent response time of 1.4 seconds. Each plot assumes that all agents answer with individual confidence of 0.70, 0.80, 0.95, cost and latency are the same across a given row because they do not depend on accuracy (only the input average response time). Further assumptions include: that all agents respond with the same answer as frequently as they answer correctly and that the options for majority voting when agents don't all answer the same are uniformly distributed; that rate at which agents respond is a Poisson process and that the number of alerts is large enough to assume a normal distribution; and that crowd will agree with probability equal to accuracy and split uniformly among types of disagreements always odd number of agents to ensure there is a majority vote. Accuracy of 3, 5, 7, and 9 agent crowd is based on varying probabilities of answering task correctly (as determined experimentally).

Example latency interpretation: 95% confident that if the average agent response time is 2.5 seconds, then the task latency for a company that chooses the 3 agent/task plan is under 7 seconds. An alternate interpretation: 95% of tasks in the 3 agents/task scenario with an average of 2.5 seconds per task will have latency under 7 seconds. These do not include the time it takes to load and send the images/information or the time for queueing the agents.

Latency is calculated by assuming that the rate of completed tasks is a Poisson process where dt is latency, lambda is the average response time for an individual agent and N is the number of agents assigned to a task. Matrix represents the number of standard deviations for a normalized distribution (n=304, therefore approximately normal) to get confidence thresholds of 75%, 95% and 99%.

In some implementations, an effective strategy can be to query 3, 5, 7, or 9 agents depending on desired confidence/error and take the majority voted answer. If the agents are 75% accurate and the customer wants answers with 95% confidence, then 3 agents should be queried per task results in about 15 false positives per month, an agent pool latency of about 5 seconds (not including information transmission and queueing). Assuming agents will be at 80% accurate, the 5 agents/task plan yields answers with 95.4% confidence with under 2 false positives per month, an agent pool latency of about 6 seconds. If a customer is getting about 10 alerts per day, the current subject matter can improve from getting 1 false positive every other per day to getting 1 false positive per week by increasing the number of agents from 3 to 5 per task (assuming agents are answering the tasks with 75% accuracy). Can go to 1 false positive per month by increasing the number of agents/task to 9. If the agents can be 95% accurate, then the false positive rate is effectively 0 false positives per month even with only 3 agents taking a majority vote. If agents are answering with 70% accuracy, then a customer can jump from 92% confidence with 3 agents per task to 97% confidence by utilizing 5 agents per task. The number of false positives would decrease by over 68% (from 22 to 7).

Figure 28:
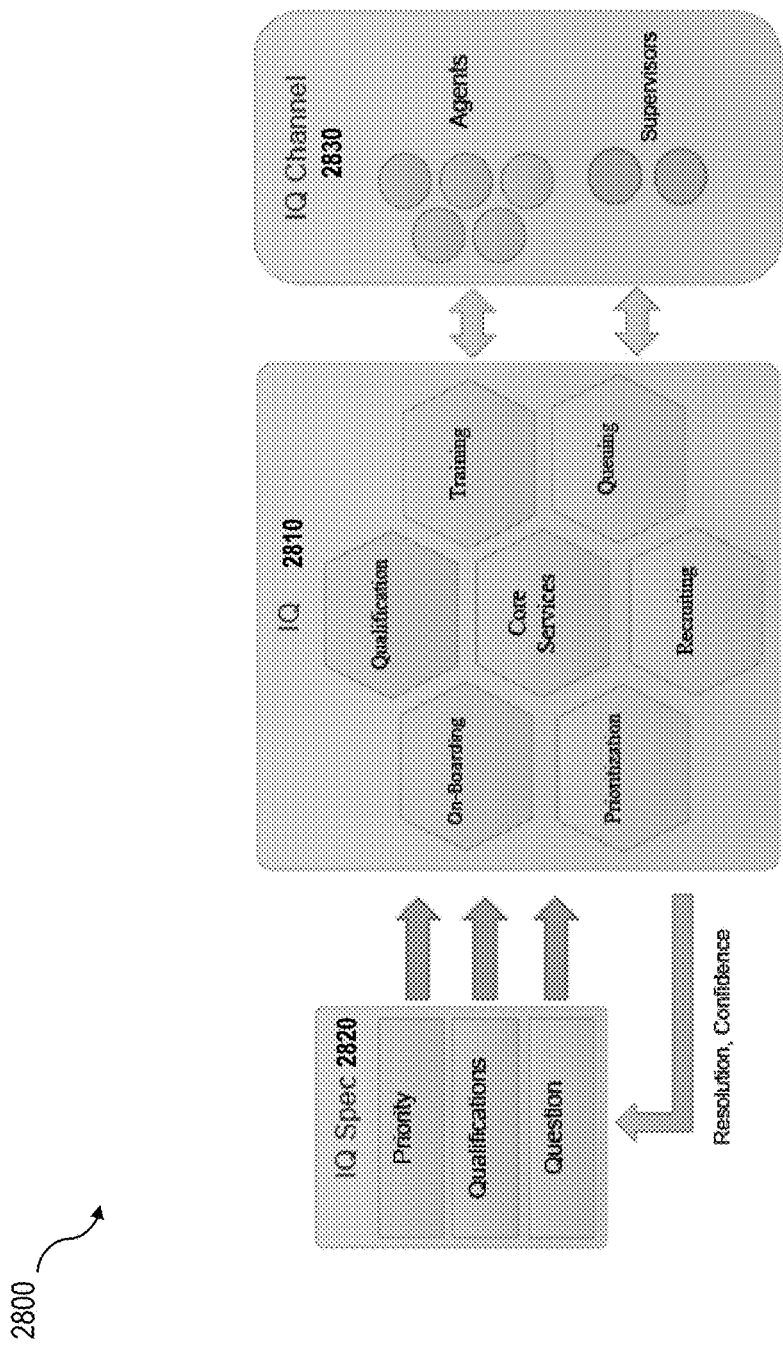
FIG. 28 is a system block diagram of an example agent management system.

FIG. 28 is a system block diagram of an example agent management system 2800. The agent management system 2800, also referred to as the IQ sub-system, can implement an agent management services 555 described below with respect to FIG. 5. In agent management system 2800, collaboration between components take place using event-driven (publish/subscribe) and service-oriented (REST web service) patterns. Agent management system 2800 includes an IQ core 2810 having multiple sub-modules includes qualifications, training, queuing, recruiting, prioritization, on-boarding, and core services. The agent management system 2800 includes a task specification 2820 (also referred to as an IQ specification) and IQ channels 2830. The task specification 2820 includes a definition of the queries to be performed. The IQ channels 2830 include one or more channels for accessing agents (e.g., human agents). The channels can correspond to different quality of agents.

By way of a brief overview of the workflow of agent management system 2800, a producer of an IQ request in the platform (e.g. the task director 535 described below) publishes a request containing the data necessary to create a task specification 2820. Task specification 2820 is persisted and maintains state throughout the resolution workflow. IQ core 2810 prioritizes the task specification 2820 based on agent qualifications, constraints and the platform 500 provided priority. A queue is adjusted dynamically as task specifications 2820 arrive and existing task specifications 2820 are concluded or escalated. When task specifications 2820 arrive that cannot be assigned to the current active agent pool (insufficient pool size or qualifications), campaigns are created to recruit agents through direct notifications and advertising on IQ channels 2830. Participating agent users accept task specifications 2820 and provide responses. IQ Core 2810 monitors agent responses and tracks progress towards satisfying task specification 2820 constraints such as the number of required judgments. Once all constraints are satisfied, a task specification 2820 can be concluded and results are published to interested platform 500 components.

Task specification 2820 represents a request for human intelligence as defined by the platform 500. Task specification 2820 provides reference information for the task that spawned it, user qualification requirements, priority and problem information. The associated task encompasses the scenario, modality, artifacts, assets and more. Qualifications can include a set of weighted agent qualifications that can be used when targeting users for participation. Each qualification can be inclusive and/or exclusive and weighted. Priority can include a numerical value representing a defined priority. Constraints can include attributes that externally constrain processing of the task specification 2820. Constraints can include cost, latency/time or number of required agent query responses. Constraints may provide an outcome to occur when reached or violated. The problem can define what is to be captured by an agent response (e.g., Boolean, 1-of-many, many-of-many) and options (e.g., multiple choice questions to be presented). Question "text" may be explicitly provided or programmatically generated based on the modality, artifacts and options. Questions may provide a known solution.

Constraints provide the general control structure for the task specification 2820 life-cycle. Limitations can be provided on resources consumed by the task specification 2820 (e.g., time, cost, judgments) and what actions should be taken when a constraint is reached. Task specification may provide a known solution used to evaluate agent accuracy. Solutions can be automatically assigned based on AI/agent confidence or manually through training modules.

Agents participating through an IQ channel 2830 are represented by identity and user components. Agent users interact with task specifications 2820 through the context of a work session. A work session begins when an agent accepts a task specification 2820 from the queue and ends when they conclude their session, terminate their client, or timeout. During the life-cycle of a work session, agents can enter and exit task specification sessions for each task specification they are assigned. The session begins when a task specification is displayed to the agent and ends when they submit a response, skip the task specification, navigate elsewhere or terminate their client. Every task specification session can conclude with a task specification query result from the agent. This response could indicate the agent skipped the task specification, could not come up with an answer (unknown) or provided a valid judgment. Task specification sessions that conclude with a timeout, closed or terminated do not contain a response. Agents that have configured a schedule for work sessions may participate during the life-cycle of a previously scheduled session. Agents may initiate a new work session directly in response to a notification about a schedule or organically arrive at the time of a session. The schedule associated with a created work session is captured in the session itself. In some implementations, the system can provide routines for training agents and evaluating agent accuracy.

Figure 29:
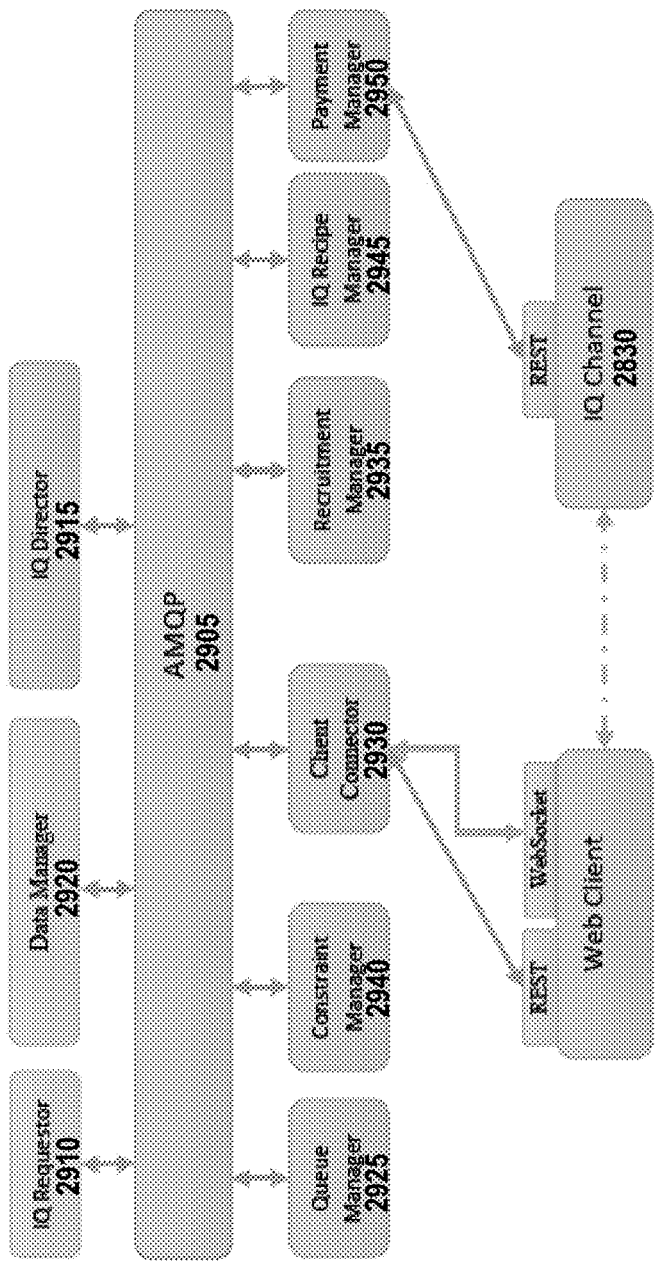
FIG. 29 is a system block diagram of an example agent management services.

FIG. 29 is a system block diagram illustrating the example agent management system 2800 in more detail. The agent management system 2800 can include an AMQP event messaging system 2905, IQ requestor 2910, IQ director 2915, data manager 2920, queue manager 2925, client connector 2930, recruitment manager 2935, constraint manager 2940, IQ recipe manager 2945, and payment manager 2950.

IQ requestor 2910 represents any participating platform component that publishes task specification requests (e.g., NEED_IQ). The task director creates a task specification 2820 with all required parameters such as priority, qualifications and constraints. The requestor 2910 may also subscribe to IQ events specific to the task specification 2820 provided.

IQ director 2915 provides overall workflow orchestration. The director provides status of task specifications 2820 to requestors and process the end state of all task specifications 2820. Once all constraints for a task specification 2820 are satisfied, the IQ director 2915 alerts the rest of the system 2900 in the form of a report.

Data manager 2920 manages all IQ related data. IQ specific implementations and listeners are a part of the shared data manager 2920.

Queue manager 2925 controls queueing and prioritization of task specifications 2820. Queue manager 2925 can queue references based on the priority provided in the request and a simple first in first out (FIFO) strategy for matching priorities. Queue 2925 manager provides the next available matching task specification 2820 to an active agent and an estimated count of available specs for an agent. Criteria for selecting the next task specification 2820 can be based on the following: highest priority first, then FIFO; task specification 2820 does not already have a response from this agent; task specification 2820 qualifications are satisfied by current agent; and task specifications 2820 that have partially completed constraints. Queue manager 2925 can also responsible for monitoring the queue and identifying task specifications 2820 that are not resolving within provided constraints (e.g., latency).

A shared queue can be used to reduce latency and unnecessary complexity of managing individual queues for every active agent. This approach provides more dynamic just-in-time tasking of agents. Anticipation-queues can also be utilized.

Client connector 2930 provides the REST API for all clients and the life cycle of task specification 2820 resolution. Management of the agent pool and work sessions is controlled by an agent manager, which manages the life cycle of agent work session and task specification session while providing standard services for work history and payment history.

Recruitment manager 2935 enables recruitment campaigns to solicit agents to participate in active work sessions. Recruitment manager 2935 manages the life-cycle of active campaigns including: launching new campaigns based on queuing need; close campaigns when task specifications 2820 are completed; and notify matching agents in the IQ channel 2830 that new work is available. Recruitment manager 2935 can launch new campaigns based on escalations or serviceability needs from queue manager 2925.

Constraint manager 2940 can monitor task specifications 2820 and determine when a task specification 2820 reaches a constraint (e.g., latency, confidence, and the like). Response count constraint can be tracked by monitoring task specification sessions that are closed with a conclusion of responded. Once the required number of unique responses have been captured, constraint manager 2940 can publish a constraint reached event.

IQ recipe manager 2945 provides a complete model for how a task specification will be represented to an agent. When a task specification session is created, the IQ recipe manager 2945 assigns an active IQ recipe 2820 to be used. The IQ recipe manager 2945 maintains a list of active IQ recipe campaigns and determines the most appropriate recipe to use for the current task specification 2820 based on campaign configuration. When no active recipe campaigns are running, a default recipe can be used.

As task specification sessions are completed by agents, the IQ recipe manager 2945 can aggregate completion towards the campaign constraints (e.g. apply the recipe against 250 task specifications or 500 task specification sessions).

Payment manager 2950 schedules, manages workflow and integrates payment services. Each support IQ channel 2830 can specify what payment services are provided. Payment adaptors for each IQ channel 2830 can abstract the specifics of communicating with the channel for basic payment operations. Based on a defined payment schedule, the payment manager 2950 can collect open payables, combine them into a payment and process them through their respective IQ channel 2830. Payment manager 2950 can support verification flows that can include administrative approval.

Figure 30:
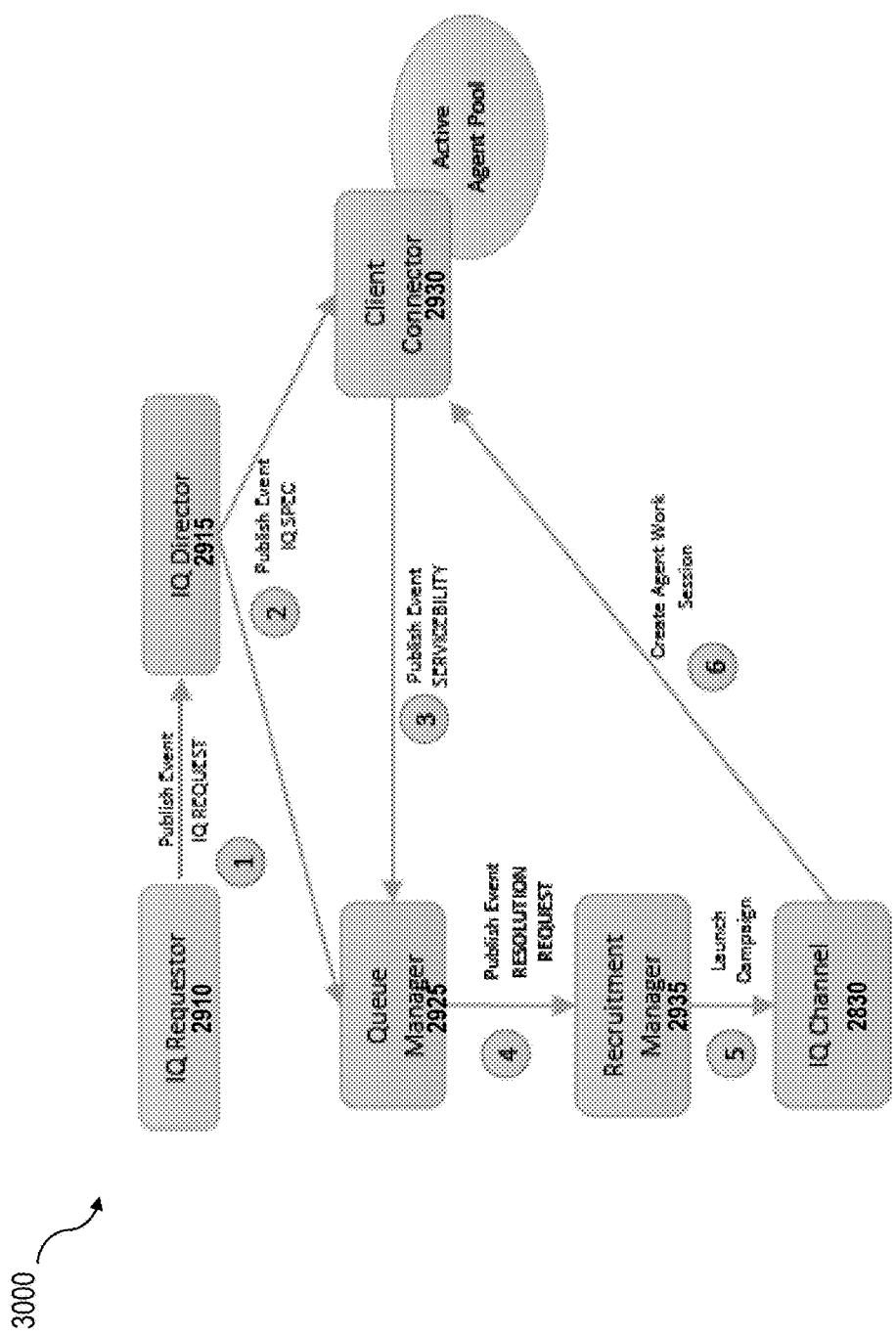
FIG. 30 is a data flow diagram illustrating data flow between components of the example system when a task specification is created.
Figure 31:
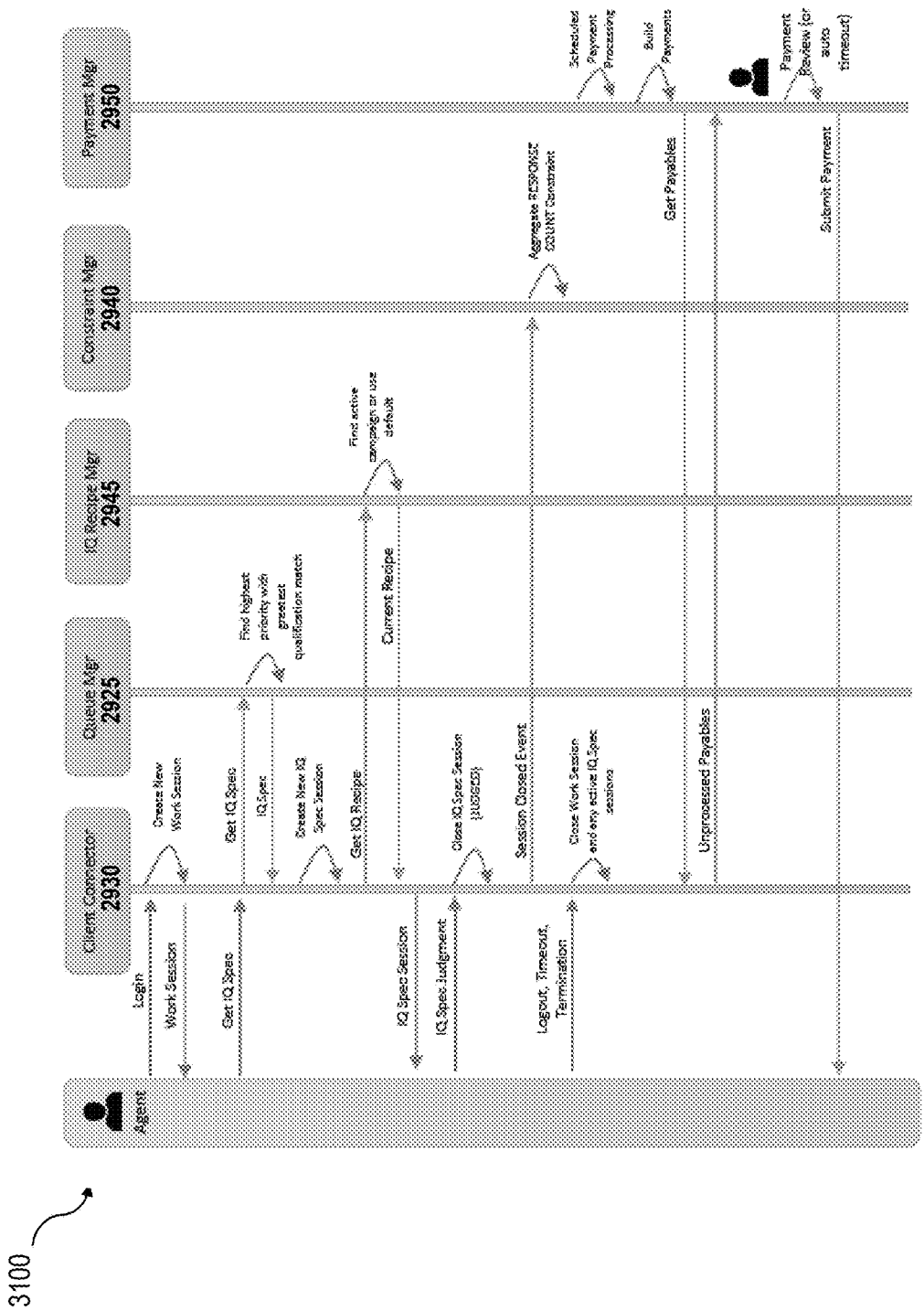
FIG. 31 is a data flow diagram illustrating data flow between components of the example system during a work session.

FIG. 30 is a data flow diagram illustrating data flow 3000 between components of system 2900 when a task specification 2820 is created. FIG. 31 is a data flow diagram illustrating data flow 3100 between components of system 2800 during a work session when an agent participates in a work session and receives payment (at a later time). Agents can participate in the workflow by invitation (on-boarding, notification and the like) or by direct recruitment campaign on an IQ channel 2830. Agents create a work session when entering the system and provide query results within the context of a task specification session.

Figure 32:
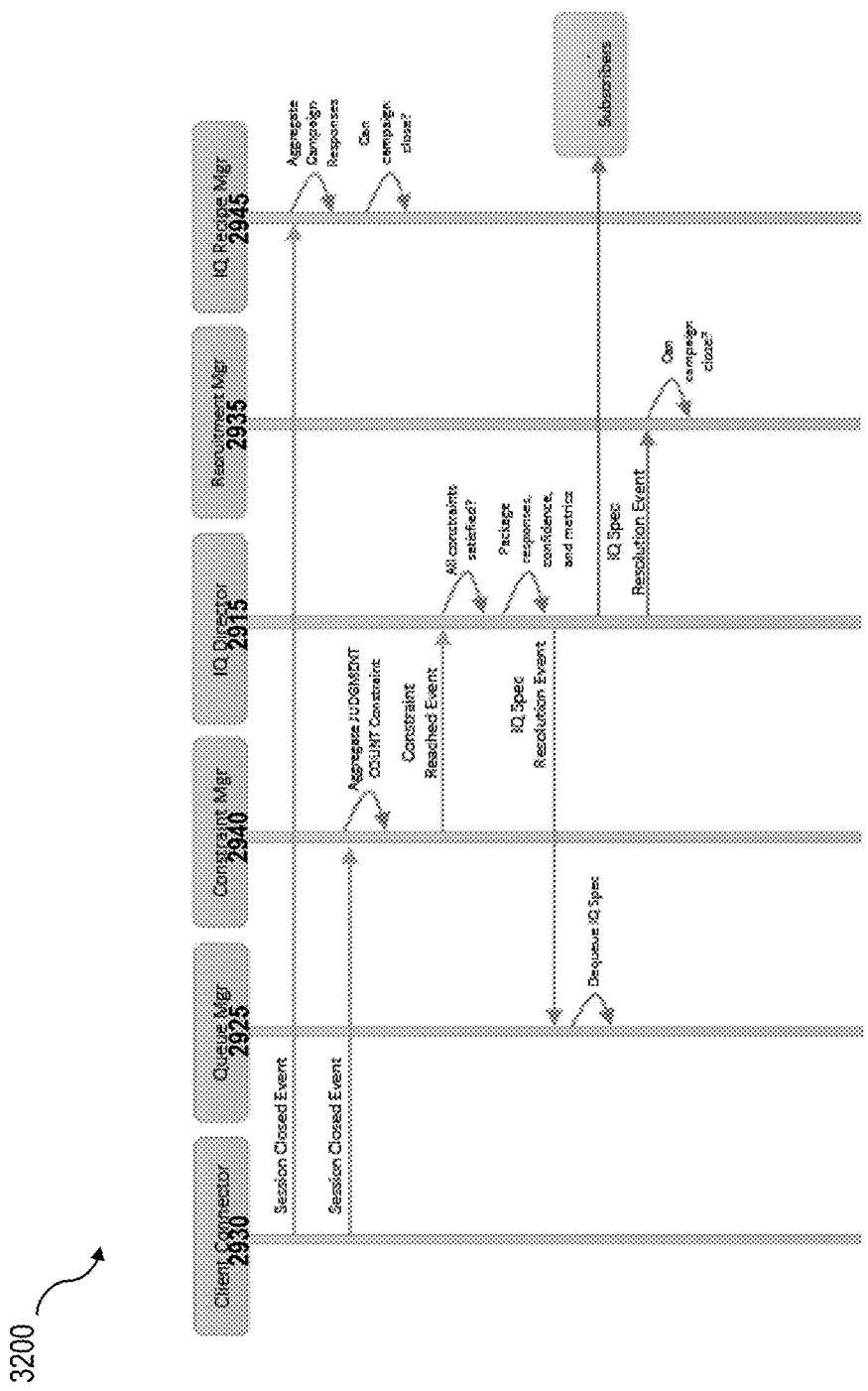
FIG. 32 is a data flow diagram illustrating data flow between components of the example system during task specification resolution.

FIG. 32 is a data flow diagram illustrating data flow 3200 between components of system 2800 during task specification 2820 resolution. Task specifications 2820 are resolved once all constraints have been satisfied. Task specification 2820 constraints such as minimum number of agent query results can be enforced via the constraint manager 2940. As task specification sessions are closed, constraint related data attributes can be collected. The sequence 3200 illustrated in FIG. 32 describes an agent submitting a query result (session closed) that results in the satisfaction of all remaining constraints.

In some implementations, when the agent pool is currently answering one or more queries, a pending task or pending query may be provided to a queue to wait until agents are available. The probability that a task will have to wait in the queue can be determined by an Erlang C model. The following is an example implementation for computing the likelihood that a task will wait in the queue.

```
%erlang
function C = erlang(h,m,t)
    %total number of agent sets (n=5 could mean 15 agents for
    3 agents/task)
    %m = total number of agents online
    %k = number of agents that are answering each task
    %n = number of combinations of different agents
    n = factorial(m)/(factorial(k)*factorial(m-k))
    %h = hits per day
    %average agent response time in days (assuming 2 second handle time)
    t = t/(3600*24);
    %period length = 1 day
    l = 1;
    %"erlangs"
    x = h*t/l;
    if n > x
    %Erlang B model
    b = 1;
    for i = 1:n
        b = b + x^i/factorial(i);
    end
```

```
B = (x^n/factorial(n))/b;
%Erlang C with Embedded B Model
%interpreted as the probability that when a task comes in it will have
to wait be queued
C = (n*B)/(n-x*(1-B));
end
```

In some implementations, queries can be routed to the n agents that are closest to the average completion time in their current task. The current subject matter can send a result based on the answer that a majority of the n agents voted for.

With respect to queue, the queue can be FIFO to minimize latency. Tasks can come in as a set of jobs that contains a number of jobs equal to the amount of agents to evaluate each task. For example, if 3 agents are required per task, then the set for that alert will contain 3 jobs. All of the jobs in the first agent's packet will be assigned to distinct agents, if no agents are available, then that packet will join the queue. Each job in a set is required to be sent to a different agent. Therefore, if the only agents available are ones that have seen a job in that packet, then the job will remain in the queue and a different packet's jobs will be called.

Expected queue latency can be determined using an Erlang C model. For example, there is a probability of 0.0002 that an alert will have to wait and join the queue if there are 10 alerts/day and 1 set of agents (3, 5, 7, or 9). The determination can be based on the rate of incoming tasks and the number of agents in online and offline states. Other factors can include the number of total agents that are logged in at any given time; number of agents answering "buffer" questions (e.g., artificial intelligence training questions or questions to assess agent quality) and whether he/she is close to completing task (close to average completion time).

A certain percentage of the entire agent pool will be online at any given moment. When online, agents complete hot tasks (meaning the agents is already engaged in the work) in order to make feedback as real-time as possible. An online agent can elect to complete tasks. The job can be a 1 minute commitment to answer yes/no, "is there a person in the photo or not"-type, or other simple questions. The agent can be routed a new task/photo after they complete the previous one. If there are no real-world events, then the agent can be fed images that can be used to train the artificial intelligence components of the machine computation component or the agent can be fed known images that can be used to test the accuracy of a specific agent. If an event is detected and it gets passed the machine computation component, then the task can be routed to the agents already in the 1 minute commitment. The real event can be the next image they are given to view. The real task can be routed to the agent that has been on his current task the longest (without going over the average response time by too much, tasks can be timed out at that point). At least three different agents can need to complete each task to reach the correct amount of confidence. If no agents are available, then the tasks can join the queue. If only agents that have seen one of the three tasks in the set are available, then a new set of tasks can be accessed and its tasks can be distributed. However, the first available agent that hasn't seen the previous set's tasks can be called for the previous set. A benefit of having agents commit to a 1 minute (or other length of time) job is the elimination of events such as the agent opening the task and subsequently leaving their computer with the task open.

In determining queue waiting times, factors can include total number of registered agents, percentage of agents that are online at any given time, number of agents per task, number of hits per day, average agent response time, and standard deviation for the agent response time. The model can employ a randomized algorithm that iterates once for each incoming task. An assumption is that there is a constant flow of tasks into and out of the model, and no task will be put in a situation where it has to wait on a third agent because all of the available agents have seen the task. In other words, the model adds tasks to a queue, but assumes the first available agent is able to take on the task.

The model can take agents and assign them the hot job where they are answering filler questions. It then assigns each agent an estimate on how much longer the task should take. The estimate is based on a pseudo-random number drawn from the uniform distribution that is assigned as a percentage of the average time each task is expected to take to complete. Then, whichever 3 agents have the least amount of expected time left in their respective filler tasks get routed the actual tasks. Then, total latency is calculated based on a randomized algorithm that assigns a z-score based on a pseudo-randomly generated number on the uniform distribution. The frequency of z-scores is based on a normal distribution and a simple numerical integration that estimates the distance between standard deviations on the curve. A task can enter the queue if the pseudo-randomly generated number assigned to the agent is below the probability that a task will enter the queue as determined by the Erlang C formula. The maximum latency between the 3 agents assigned to the task is taken as the total latency to complete the task. The frequency with which each latency (to the nearest tenth of a second) occurs is stored, the data is normalized, and then a Softmax algorithm can be used to assign each frequency a probability of occurrence. In the case of 10 agents, 50% of which are online, 3 agents/task, 10,000 tasks per day, an average response time of 2 seconds, and a standard deviation of 1 second, the output graphs are provided in FIG. 35.

Figure 36:
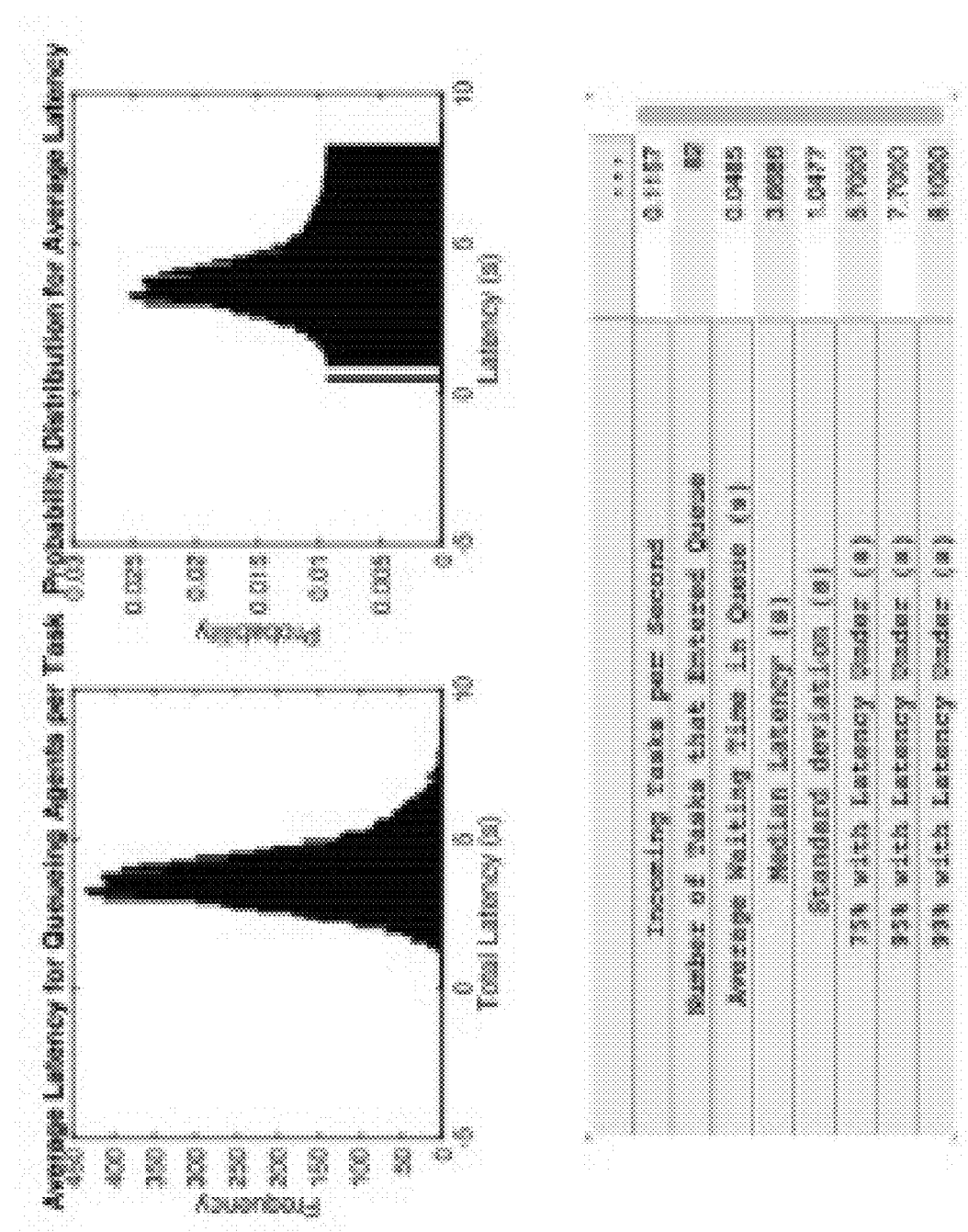
FIG. 36 is a histogram illustrating average latency for queueing agents per task and a probability distribution for average latency where confidence is determined based on a cumulative distribution function for the frequency of latency Like reference symbols in the various drawings indicate like elements.

Confidence can be determined based on a cumulative distribution function for the frequency of latency as determined by simulation. A final output for the situation described above are provided in FIG. 36.

Figure 33:
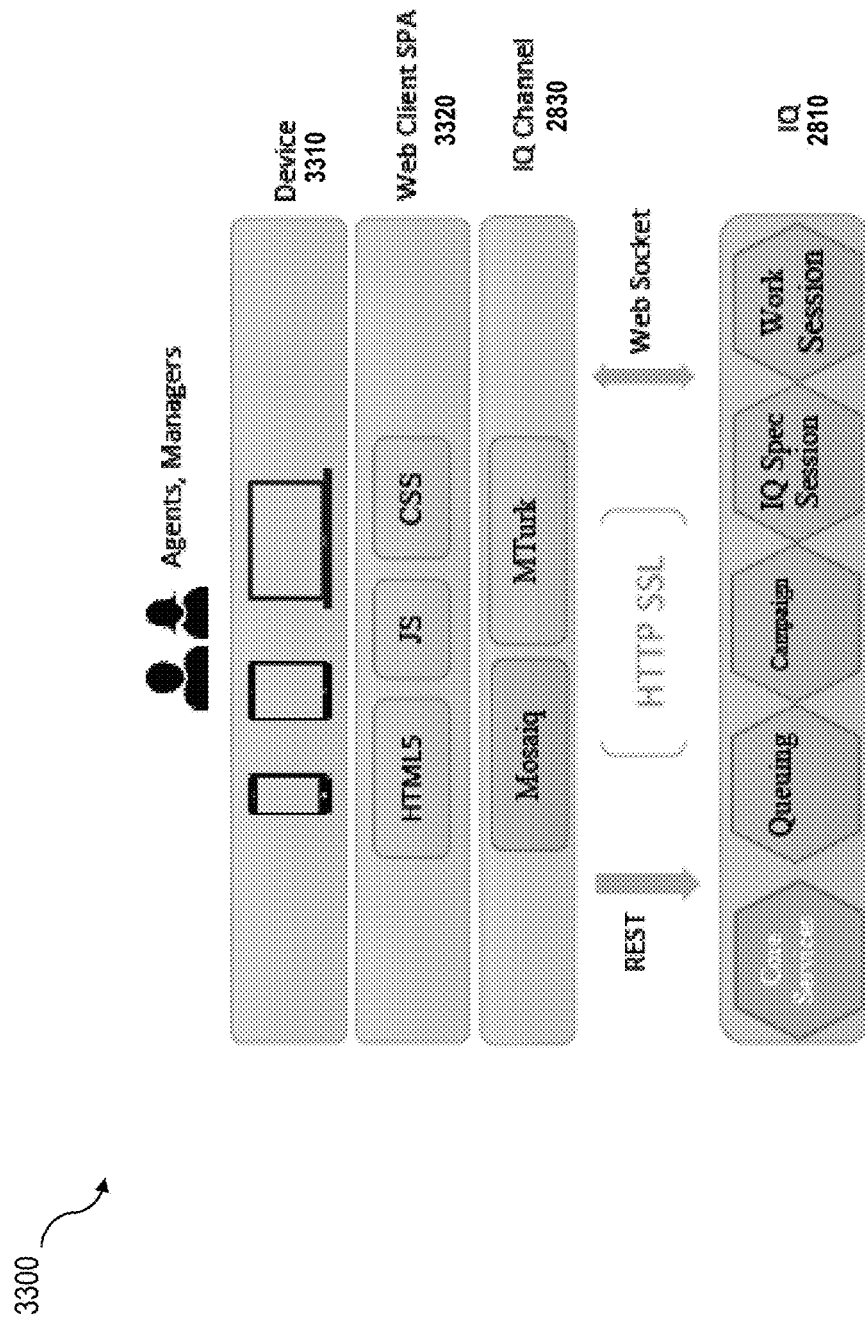
FIG. 33 is a system block diagram illustrating agent client architecture.

FIG. 33 is a system block diagram illustrating agent client architecture 3300. Agents can access system 2800 from a device 3310 (e.g., desktop, phone, tablet) with a client 3320 (e.g., web, mobile web, native app) through an IQ channel 2830 (e.g., Mosaiq Exchange, Mechanical Turk, and the like). Agents can be able to access the IQ core 2810 from the device 3310, client 3320, and channel 2830 that delivers them the most convenience and productivity.

Device 3310 can include any network-enabled device that can access IQ 2810 over HTTP(s). Client 3320 represents the core software executing within a remote browser or pure JavaScript environment. A single page application (SPA) is a general term applied to web applications that retrieve resources (HTML, JS, CSS) during the initial page load (or dynamically load them as necessary). Navigation within the application does not result in a reload of the browser and is instead processed asynchronously. Client 3320 can provide an interactive workspace for agents and can communicate with IQ 2810 asynchronously over traditional REST services and web socket messaging. Client 3320 can communicate with system 2900. This communication can take place using HTTP over SSL. Primary communication can take place via REST APIs. Native applications are possible.

Figure 34:
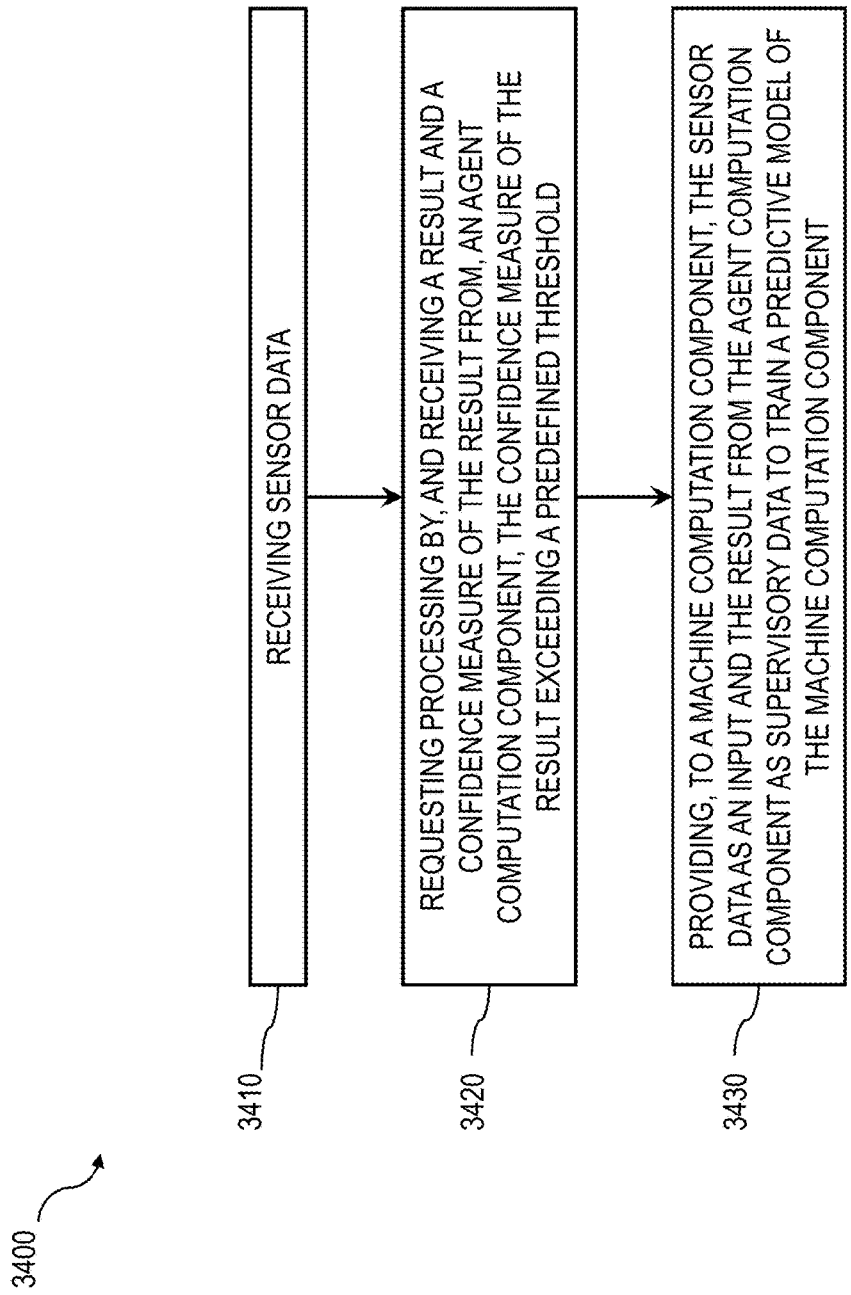
FIG. 34 is a process flow diagram illustrating a method of training a machine computation component on the result provided from an agent computation component.

FIG. 34 is a process flow diagram illustrating a method 3400 of training a machine computation component on the result provided from an agent computation component.

Because the currents subject matter enables run-time truth determination by querying human agents via the agent computation component, the current subject matter can train the artificial intelligence components (e.g., as implemented by the machine computation component) to improve their performance on real-world data.

At 3410, sensor data can be received. The sensor data can be received from and/or of a security system asset. An asset can include an imaging device, a video camera, a still camera, a radar imaging device, a microphone, a chemical sensor, an acoustic sensor, a radiation sensor, a thermal sensor, a pressure sensor, a force sensor, a proximity sensor or a number of other sensor types. "Sensor," as used herein may include information that did not originate specifically from physical hardware, such as a computer algorithm. The sensor data can include, for example, an image (e.g., optical, radar, and the like), video, audio recording, data generated by any of the above-enumerated assets, and the like. In some implementations, the sensor data can be from a system other than a security system.

At 3420, requesting processing by, and receiving a result and a confidence measure of the result from, an agent computation component. The confidence measure can exceed a predefined threshold (e.g., 0.9). As described more fully above, the agent computation can execute the task by querying one or more agents in a pool of agents to perform the task, such as an image recognition task, answering a question regarding a characteristic of the image, and the like. In some implementations, the agent computation component can provide a query result in substantially real-time, such as within 5, 10, or 30 seconds of receiving a query request. The agent computation component can also determine a confidence measure of its output. The confidence measure may be directly supplied by an agent or can be determined by the agent computation component using an algorithm that assesses the accuracy and reliability of the agent that provides a response. The agent computation component can query multiple agents and create a composite output and a composite confidence. The confidence measure can characterize a likelihood that the output of the agent computation component is correct.

At 3430, a predictive model of a machine computation component can be trained by providing the sensor data as input and the result from the agent computation component as a supervisory signal. As described above, the machine computation component can include an artificial intelligence (e.g., machine learning) system that develops and utilizes a predictive model. The machine computation component can include any number of algorithms. In some implementations, the machine computation component can include a deep neural network, a convolutional neural network (CNN), a Faster Region-based CNN (R-CNN), and the like.

In some implementations, a database of unlabeled data can be maintained and provided to agents who are available but not actively being queried based on an event (e.g., to analyze sensor data received from a security system). Thus, the agents can be utilized to train the machine computation component during down-time while maintaining their readiness to be queried for a live event.

FIG. 1 is a process flow diagram illustrating a method 100 of augmenting artificial intelligence with human intelligence tasks. The method 100 of augmenting artificial intelligence with human intelligence tasks is implemented using flow control, which can be represented as a state machine for solving a computational task.

At 110, sensor data is received. The sensor data can be received from and/or of a security system asset. An asset can include an imaging device, a video camera, a still camera, a radar imaging device, a microphone, a chemical sensor, an acoustic sensor, a radiation sensor, a thermal sensor, a pressure sensor, a force sensor, a proximity sensor or a number of other sensor types. "Sensor," as used herein may include information that did not originate specifically from physical hardware, such as a computer algorithm. The sensor data can include, for example, an image (e.g., optical, radar, and the like), video, audio recording, data generated by any of the above-enumerated assets, and the like. In some implementations, the sensor data can be from a system other than a security system, for example, the sensor data can be access control system data, weather system data, data about the risk posed by an individual or the risk of a security threat given a set of conditions. Other system types are possible.

The security system can include a number of deployment types including closed circuit television, surveillance camera, retail camera, mobile device, body cameras, drone footage, personnel inspection systems, object inspection systems, and the like.

The security system can be implemented in many ways. For example, the security system can include a system to detect for physical intrusion into a space (e.g., whether a person is trespassing in a restricted area); a system to determine whether an individual should or should not be allowed access (e.g., a security gate); a system to detect for objects, people, or vehicles loitering in a region; a system to detect for certain behavior exhibited by a person (e.g., suspicious behavior); a system to detect track a person or object viewed from one asset (e.g., camera) to another asset; a system to determine the status of an object in the asset field of view (e.g., whether there is snow on a walkway); a system to count people or objects (e.g., vehicles) in a scene; a system to detect for abnormal conditions (e.g., as compared to a baseline condition); a system to detect license plates over time; a system to detect for weapons, contraband, or dangerous materials on a person or within a container (e.g., a security checkpoint); and the like.

At 120, a predefined modality is accessed. The accessing can be from memory. The predefined modality can be associated with the security system asset. The modality can define a computational task for analyzing the received sensor data. For example, where the asset is a video monitoring the threshold of a building, the predefined modality can include a computational task that specifies that an image taken by the asset should be processed to detect for a presence of a person in the threshold (e.g., a region of the image). Associated with the asset can be a collection of configurable data that can be provided for each asset modality pairing. Asset details can include, for example, inclusion areas, exclusion areas, filtering parameters, region of interest requirements and the like. These are all specific to the asset scene for that modality.

A modality can be considered an architectural concept that, when used as building blocks, can capture a pattern of security objectives. An analysis platform can expose modalities as building blocks for clearly articulating the problem to be solved. An example modality can include an intrusion detection scenario, where the pattern represented is one of first detecting that a trigger has happened and that the trigger was caused by a human and that the human is intruding upon a defined area. A modality can guide and coordinate machine computation components and agent computation components of the platform. Modalities can provide direction to the analysis platform regarding what the security system is trying to detect or control.

In some implementations, the predefined modality can define a solution state machine or flow control that provides a framework for utilizing the processing components of the analytical platform to solve a problem (which could be a piece of a larger scenario). Each computation component can have access to the solution state machine and can advance the state.

Figure 2:
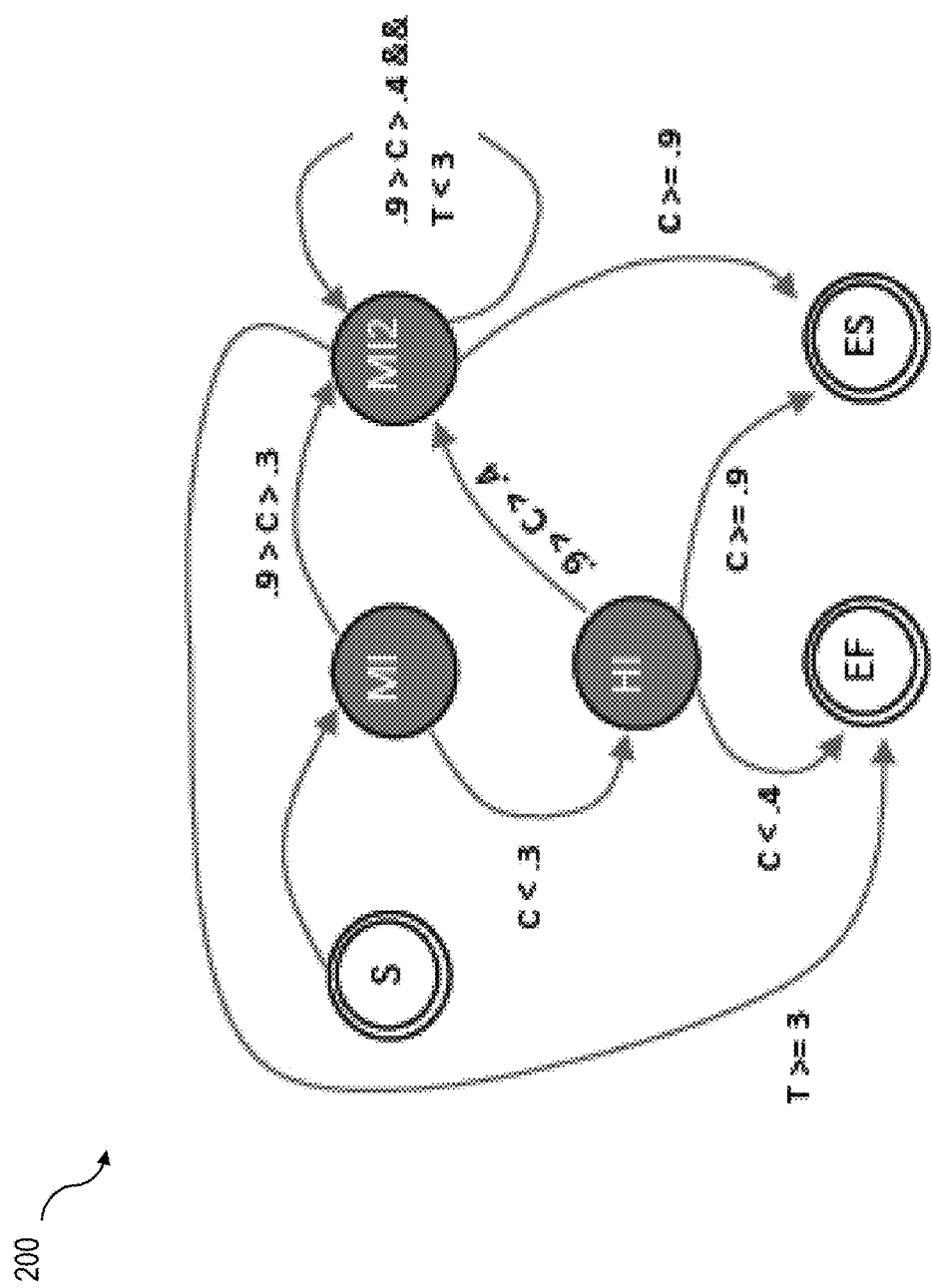
FIG. 2 is a state diagram of an example solution state machine as defined by a modality.

Concretely, FIG. 2 is a state diagram of an example solution state machine 200 as defined by a modality. "S" is a start state, "MI" is a first machine intelligence state, "MI2" is a second machine intelligence state, "HI" is a human intelligence state, "ES" is a terminal state corresponding to a successful match (e.g., pattern match, classification, detection, and the like), and "EF" is a terminal state corresponding to an unsuccessful match (e.g., pattern match, classification, detection, and the like). "C" relates to confidence of the processing at each state and "T" relates to the number of times the associated processing has been performed. Transition rules are Boolean operators of the confidence ("C") and processing times ("T").

Referring again to FIG. 1, at 130, a flow control, or solution state machine object can be instantiated. The instantiating creates a concrete occurrence of the solution state machine object that exists during runtime. The solution state machine object can have at least two intermediate states, one associated with machine computation component processing and one associated with agent computation component processing.

At 140, the computational task is executed using the solution state machine object. A solution state machine object can be represented in persistent data as a transition table and can be accessible for querying and changing state.

Execution of the computational task can include, at 142, requesting processing of the task by, and receiving a result of, a machine computation component when the current state of the solution state machine object is in a machine computation component state. The machine computation component can execute the task by applying a predictive model to the sensor data to determine an output (e.g., pattern match, classification, detection, and the like). The machine computation component can also determine a confidence measure of its output. The confidence measure can characterize a likelihood that the output of the machine computation component is correct. For example, in the implementation where the machine computation component is a convolutional neural net, the convolutional neural network's last layer can be a logistic regression layer, which classifies image patches into labels. During the training phase this value can be set to 1 for positive examples and to 0 for negative examples. During the operational phase (e.g., when applying new data to the convolutional neural network) this value can be the probability of an input image being the object of interest.

Execution of the computational task can include, at 144, requesting processing of the task by, and receiving a result of, an agent computation component when the current state of the solution state machine object is in an agent computation component state. The agent computation component can execute the task by querying one or more agents in a pool of agents to perform the task, such as an image recognition task, answering a question regarding a characteristic of the image, and the like. In some implementations, the agent computation component can provide a query result in substantially real-time, such as within 5, 10, or 30 seconds of receiving a query request. The agent computation component can also determine a confidence measure of its output. The confidence measure may be directly supplied by an agent or can be determined by the agent computation component using an algorithm that assesses the accuracy and reliability of the agent that provides a response. The agent computation component can query multiple agents and create a composite output and a composite confidence. The confidence measure can characterize a likelihood that the output of the agent computation component is correct.

Execution of the computational task can include, at 146, transitioning the current state of the solution state machine object according to the transition rules. For a given state, the transition rules can be applied when a result of a computation component is returned by a respective computation component. By applying the transition rules, the current state of the solution state machine can change (according to the transition rules) and, when a new state is entered, an associated processing step can be performed.

Once the current state of the solution state machine object is a terminal state, at 150, a characterization of the terminal state can be provided. The characterization may relate to a classification of the sensor data (according to the task). The characterization of the terminal state can be provided, for example, as an alert to a manager of the security system. For example, the security system manager may have an escalation policy that requires they be alerted regarding the outcome of the task if the task detects a certain condition (e.g., intrusion into the building is occurring). The escalation alert can be in any form, such as MMS, SMS text, email, and the like.

Figure 10:
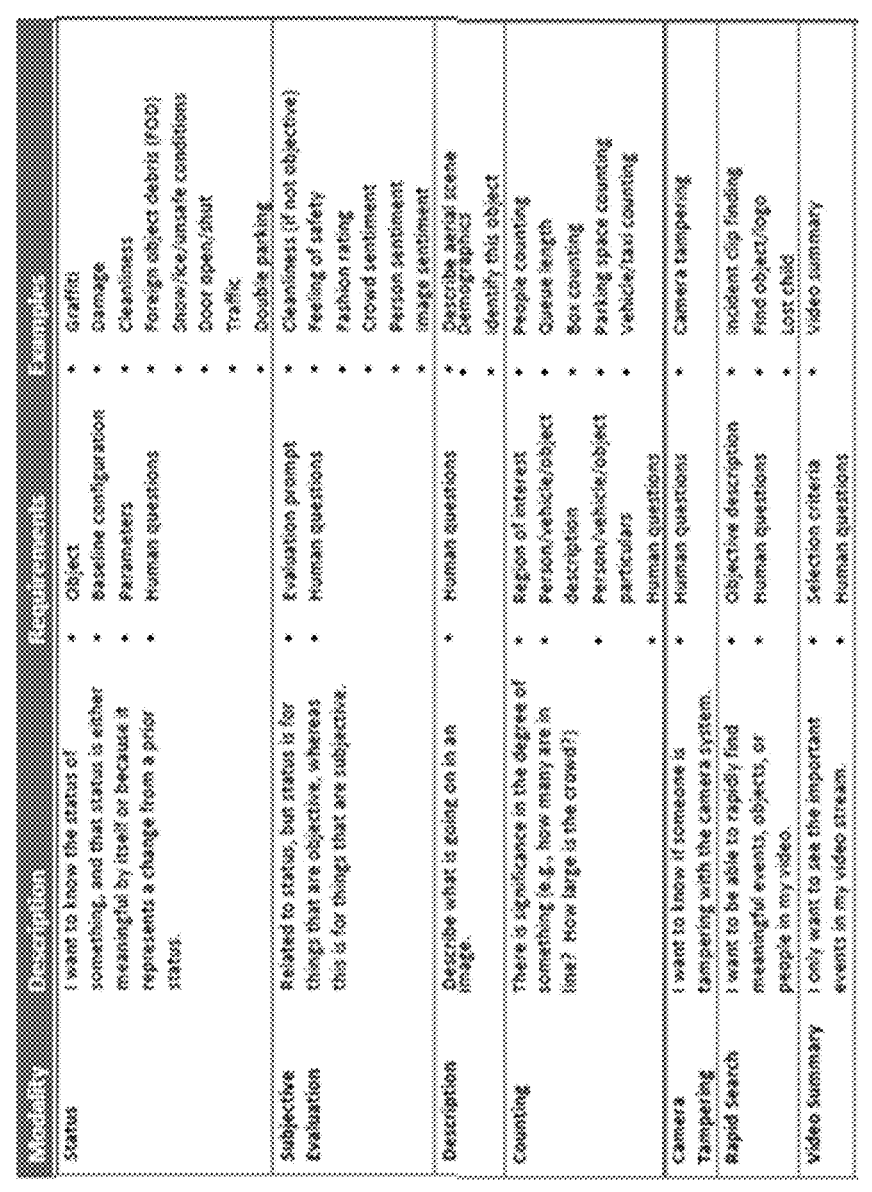

Modalities can be considered as processing building blocks that answer relatively basic tasks. For example, FIGS. 9-11 are tables illustrating example modalities and example security scenarios to which the modality could apply. Modalities are flexible and a powerful tool for problem solving within the context of a human augmented machine decision making system. Modalities may be combined (or strung together) for answering complex and subjective problems. Modality composition is the ability to express a hierarchy of modalities such that positive results from lower tasking are passed up to a composite modality which aggregates multiple modality results to answer a higher-order question. The power of composite modalities can include the fact that truth (or high-confidence determinations) is established at terminal modalities and that truth is passed up to make very informed aggregate decisions.

Figure 3:
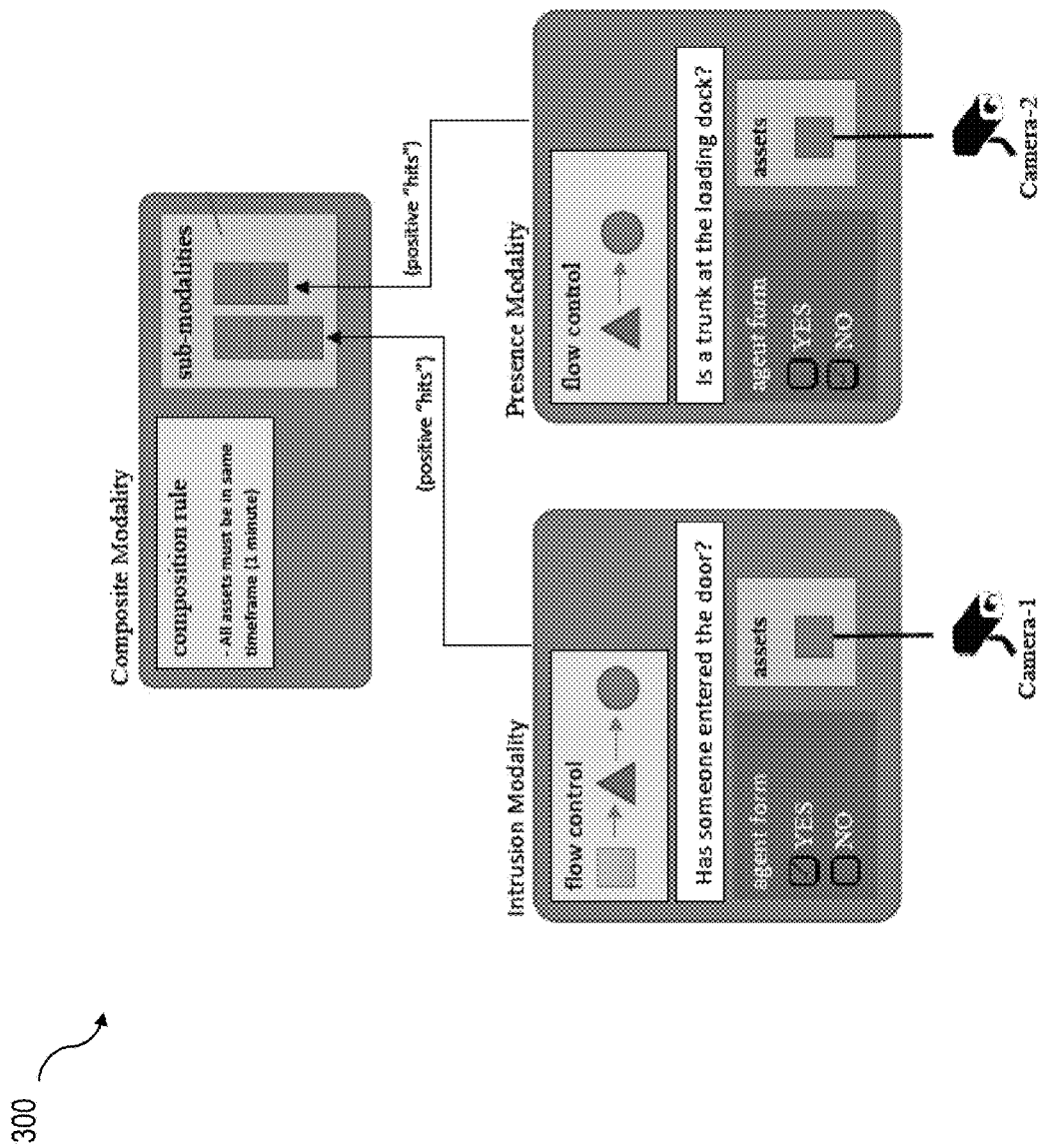
FIG. 3 is a diagram illustrating composite modalities to solve a higher-order problem.

For example, consider FIG. 3, which is a diagram illustrating composite modalities to solve a higher-order problem. A security system has 2 cameras with completely different fields of view; one (Camera-1) is inside the facility looking at a door and another (Camera-2) is outside the facility looking at a loading dock. The operator of the system should be alerted whenever someone enters the door and there is no truck in the loading dock. This problem (e.g., scenario) can be solved by composite modalities. Camera-1 can run an intrusion modality, while Camera-2 can run a presence modality. Each of these cameras can produce sensor data (e.g., artifacts) and provide the sensor data to the analysis platform. The analysis platform can initiate modality tasking for each of the two sensors independently. The security system operator can be alerted if there is an aggregate positive condition of both within the same time frame. Events across all sub-modalities can be recorded and correlation can be performed whenever a sub-modality triggers a match.

Modality composition can be defined by specific rules that match sub-modality results with each other to try and satisfy the composite modality. Composite rules can have specific logic for composing their sub-modalities. The logic can be augmented with customer input for rules (e.g., values) that should be used for a specific security system.

Figure 4:
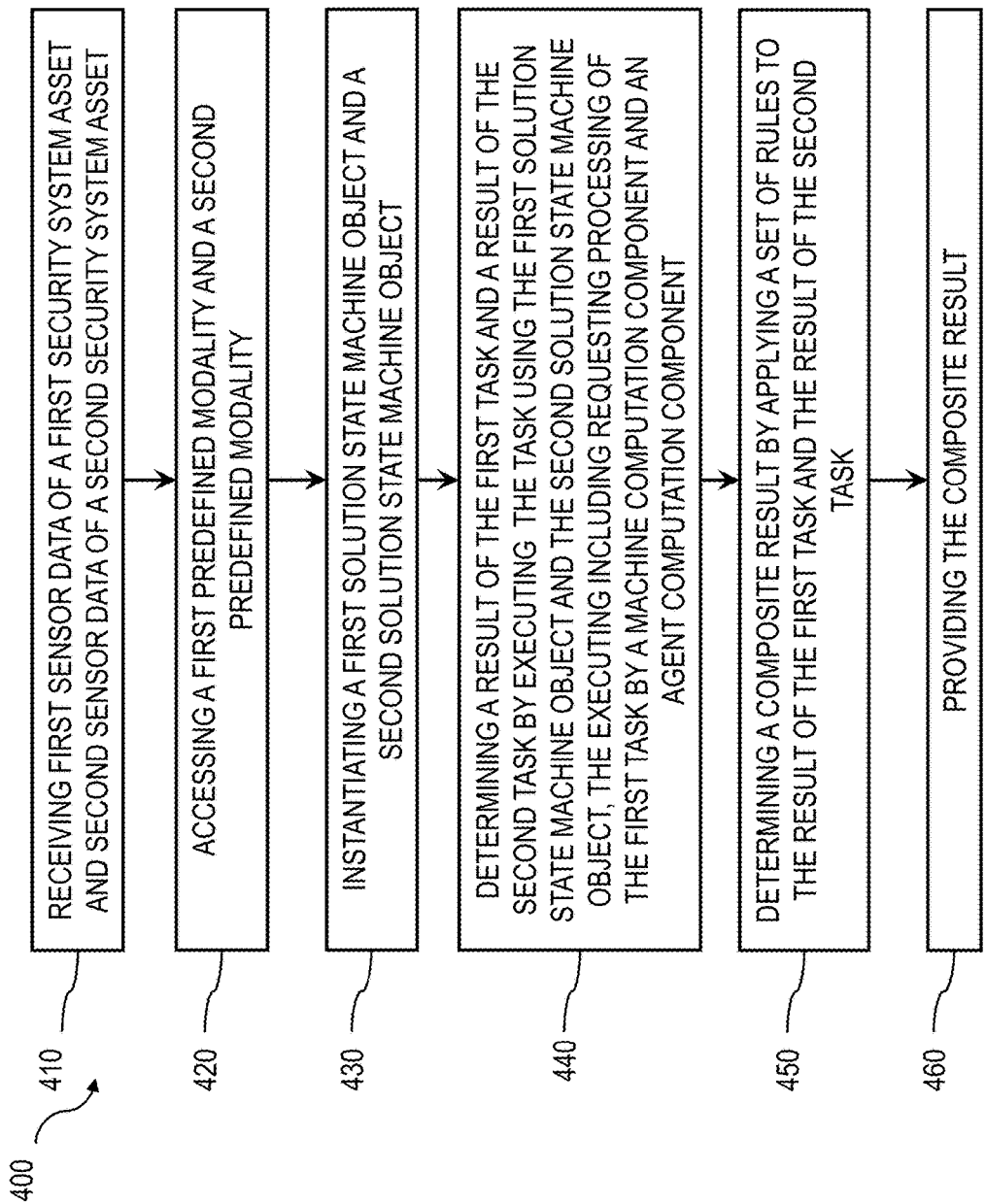
FIG. 4 is a process flow diagram illustrating a method of augmenting artificial intelligence using composite modalities.

FIG. 4 is a process flow diagram illustrating a method 400 of augmenting artificial intelligence using composite modalities. At 410, sensor data is received from a first security system asset and sensor data is received of a second security system asset. For example, the assets can include a first camera and a second camera. Each camera need not have overlapping field of views.

At 420, a first predefined modality associated with the first security system asset and a second predefined modality associated with the second security system asset can be accessed. The first modality can define a computational task for analyzing the received first sensor data. The second modality can define a second computational task for analyzing the received second sensor data. For example the first modality can be an intrusion modality and the second modality can be a presence modality.

At 430, a first solution state machine object and a second solution state machine object is instantiated. For example, each instating creates a concrete occurrence of the respective solution state machine object that exists during runtime. Each respective solution state machine object can have at least two intermediate states, one associated with machine computation component processing and one associated with agent computation component processing.

At 440, each task can be executed using their respective solution state machine objects such that the processing includes processing by a machine computation component and by an agent computation component. After execution, each task has a result (for example, presence of a person or intrusion is detected).

At 450, a composite result can be determined by applying a set of rules to the results of the tasks. For example, the set of composite rules can include a rule requiring each modality result to be positive and that the sensor data that led to the positive results were obtained within one minute of one another.

At 460, the composite result can be provided. The composite result can be provided, for example, as part of an escalation policy to alert the security system operator. The composite result may relate to a classification of the sensor data (according to the task). The composite result can be provided, for example, as an alert to a manager of the security system. For example, the security system manager may have an escalation policy that requires they be alerted regarding the outcome of the task if the task detects a certain condition (e.g., intrusion into the building is occurring). The escalation alert can be in any form, such as MMS, SMS text, email, and the like.

In some implementations, the computational task includes: detecting a pattern in the image, detecting a presence of an object within the image; detecting a presence of a person within the image; detecting intrusion of the object or person within a region of the image; detecting suspicious behavior of the person within the image; detecting an activity of the person within the image; detecting an object carried by the person, detecting a trajectory of the object or the person in the image; a status of the object or person in the image; identifying whether a person who is detected is on a watch list (e.g., part of a gallery of face images); determining whether a person or object has loitered for a certain amount of time; detecting interaction among person or objects; tracking a person or object; determining status of a scene or environment (e.g., cleanliness, feeling of safety, weather conditions); determining the sentiment of one or more people; counting the number of objects or people; determining whether a person appears to be lost (e.g., non-suspicious behavior); determining whether an event is normal or abnormal; and determining whether text (e.g., license plate text) matches that in a database. Other tasks are possible as the current subject matter can apply to a wide range of tasks.

Figure 12:
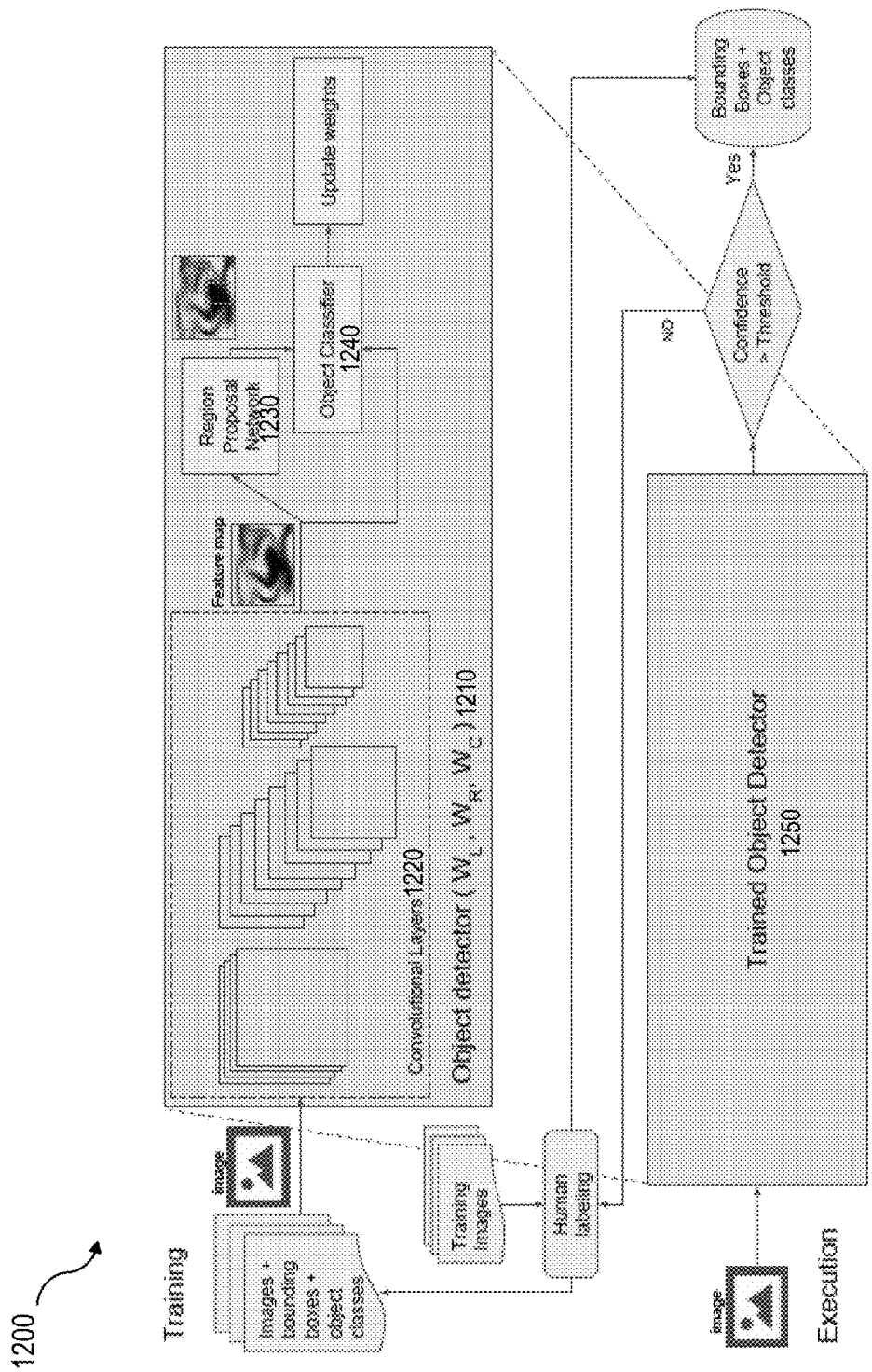
FIG. 12 is a system block diagram of an example machine computation component system that implements a deep learning based object detector.
Figure 13:
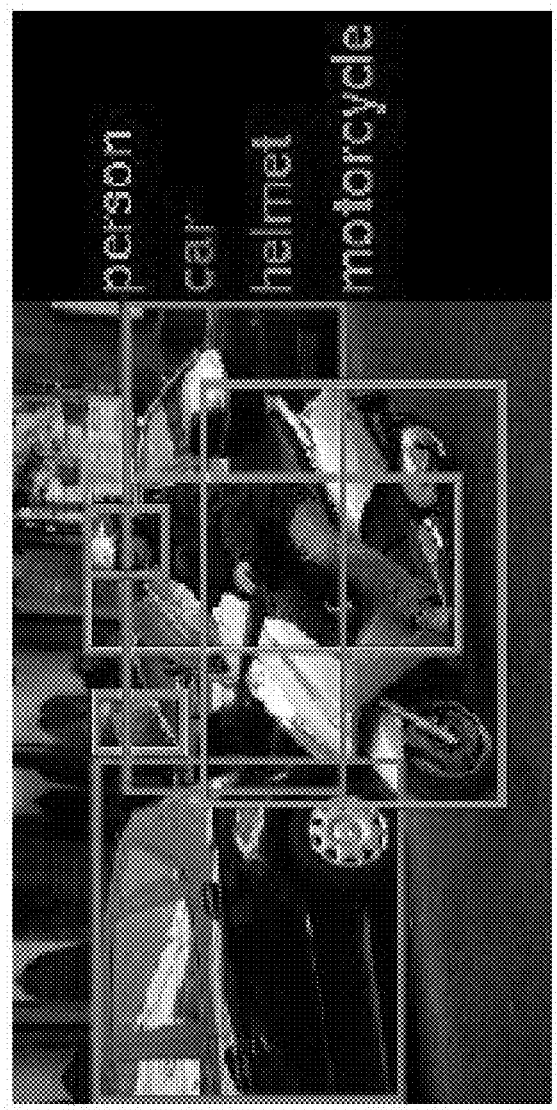
FIG. 13 illustrates an example input image and an example output image to an artificial intelligence system.

As described above, the machine computation component can include an artificial intelligence (e.g., machine learning) system that develops and utilizes a predictive model. The machine computation component can include any number of algorithms. In some implementations, the machine computation component can include an artificial intelligence algorithm, a machine learning algorithm, a deep learning algorithm, a deep neural network, a convolutional neural network (CNN), a Faster Region-based CNN (R-CNN), and the like. For example, FIG. 12 is a system block diagram of an example machine computation component system 1200 that implements a deep learning based object detector 1210. The object detector 1210 includes a CNN for performing image processing including creating a bounding box around objects in an image and detecting or classifying the objects in the image. The input to the object detector is a digital image and the output is an array of bounding boxes and corresponding class labels. An example input image and an example output is illustrated in FIG. 13. The class labels are: person, car, helmet, and motor cycle.

In some implementations, Faster R-CNN incorporates flow information. This approach can reduce false alarms from the AI. A real time tracking method can be used. The real time tracking method uses data association and state estimation techniques to correct the bounding boxes and remove false positives. The tracking method assumes a linear velocity model and computes the location of the object in next frame using a Kalman Filter method.

Before an object detector can be used for detecting objects, it needs to be trained. A training set can include one or more images with bounding boxes around objects the system is interested in detecting and the corresponding class labels. A database of training images can be created or maintained. In some implementations, the database can be updated over time with real world images and labels.

Hard negative mining can better train the convolutional neural network. The example Faster R-CNN uses background patches in the image as negative examples. In some implementations, since the number of background patches is generally much larger than the number of object patches, all background patches cannot be included because doing so biases the object detection model. A specific ratio (20:1) for negative and positive examples can be maintained. Faster R-CNN can pick these negative examples randomly. For hard negative mining those negative examples that result into highest loss can be chosen. But this approach trains the predictive model only for difficult and unusual examples of objects. So half the negative examples can be taken from hard negative (which give highest loss) and half of them taken randomly from rest of the negative examples.

In example implementations, a Faster R-CNN based object detector 1210 is used. The Faster R-CNN 1210 includes a bank of convolution layers 1220, a region proposal network (RPN) 1230, and an object classifier 1240. The bank of convolution layers 1220 finds features that are useful for two purposes: a) finding which rectangular regions in the image potentially contain an object of interest and b) correctly classifying the object inside the proposed rectangular regions. The RPN 1230 looks at the feature maps produced by the convolutional layers 1220 and proposes rectangular regions that may contain an object of interest.

The object classifier 1240 looks at the feature maps and each region proposed by the RPN 1230 and classifies each region as one of the objects of interest or not. The object classifier can generate a score from 0.0 to 1.0 related to the confidence that the object is not present (0.0) or present (1.0). The classification can be binary or multiclass.

Training the object detector requires finding the right weights/parameters associated with each of these three components. Manually labeled bounding boxes and object labels are used to guide the process of finding the correct weights using a backpropagation algorithm. Using an alternate or additional training method, the RPN 1230 is first trained and the region proposals are used to train the object classifier 1240. The network tuned by object classifier can then be used to initialize RPN 1230, and this process is iterated. This way the convolutional layer 1220 is tuned to be effective for both the RPN 1230 and the object classifier 1240.

In the execution phase, a trained object detector 1250 is used to detect objects (e.g., bounding boxes, class labels, and confidence levels) in an image not in the training set. In addition to the class label, the trained object detector 1250 also returns the confidence measure for every bounding box.

Figure 14:
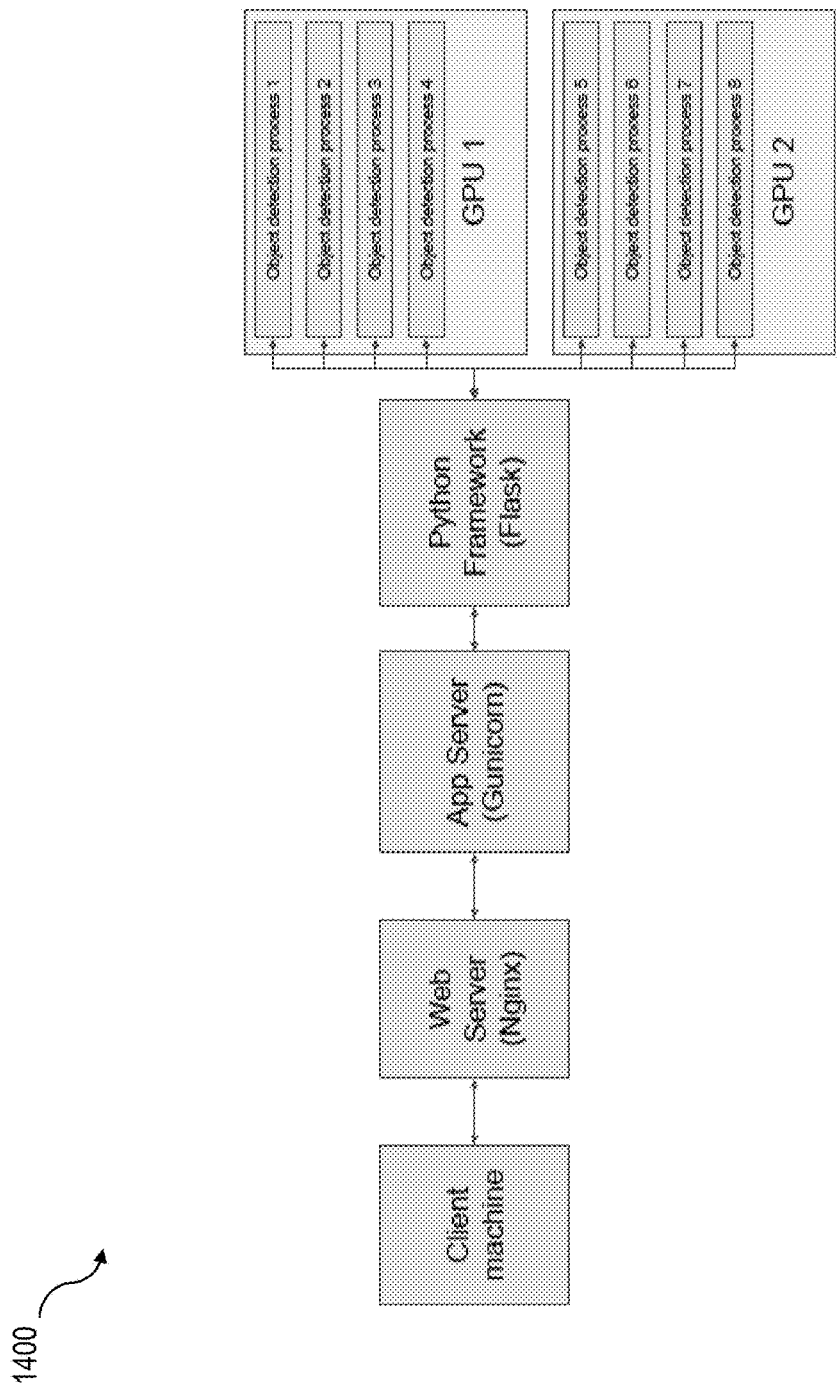
FIG. 14 is a system block diagram illustrating an object detector web application program interface.

FIG. 14 is a system block diagram illustrating an object detector web API. A web server accepts requests from multiple clients and returns the response for the respective request. An application server runs applications in threads, maintaining the correspondence between threads and requests passed from the webserver. An application on the application server runs the object detection algorithms and returns detections in the form of objects to the application server, which passes the detections to the webserver, which passes the response to the client machine.

In some implementations, a high-confidence output from the agent computation component can be used to train one or more artificial intelligence systems forming the machine computation component. When a high-confidence output is received from the agent computation component, the analysis platform can train an artificial intelligence system using the high-confidence agent computation component output as the supervisory signal and the sensor data as the input signal. Thus, the analysis platform can continually improve in performance and require fewer agent computation component queries to perform the same amount of work. When the confidence measure returned by the machine computation component is low, the image can be sent to an agent who can correct any mistakes in bounding boxes or labeling. Images that have incorrect bounding boxes and/or misclassified labels can be fixed and added to the training set. The system is continuously getting better as it is routinely retrained after the addition of these harder examples to the training set.

Figure 5:
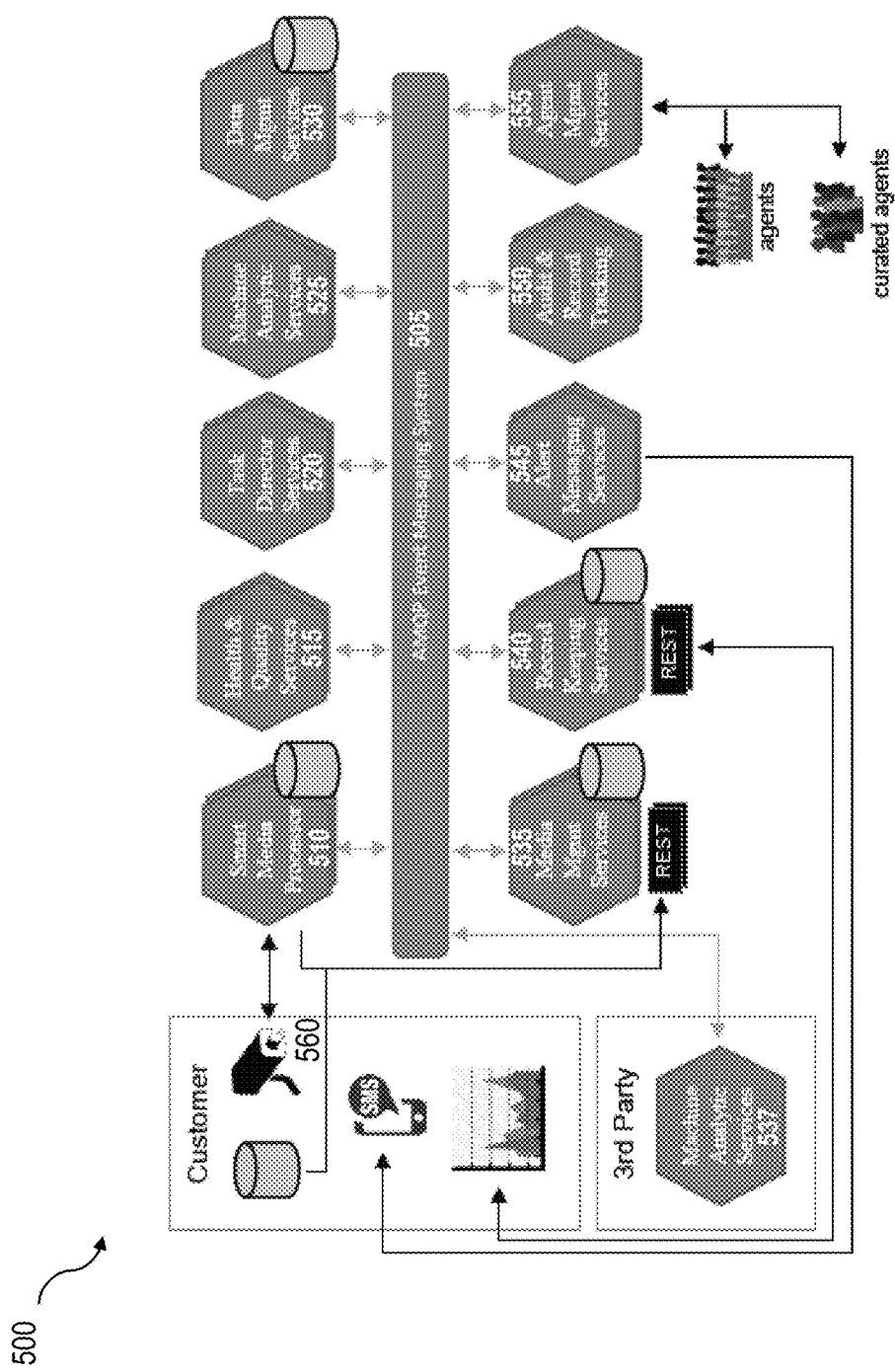
FIG. 5 is a system block diagram of an example analysis platform including software components for combining machine and human intelligence as a solution for responding to questions and problem scenarios.

FIG. 5 is a system block diagram of an example analysis platform 500 that is a system of software components for combining machine and human intelligence as a solution for responding to questions and problem scenarios, for example, relating to security. A customer can provide a problem specification, desired questions or tasks to be performed, and raw inputs (e.g., sensor data such as video). The platform 500 can configure to provide answers or matches (e.g., results) to the customer.

The example platform 500 is a reactive system of cooperating software components and the communication flows between them. Each software component can include a microservice, which can be a fully encapsulated and deployable software component capable of communicating with other platform software components by event-based messaging or directly.

Platform 500 includes an event messaging system 505 and a number of distributed microservices (510, 515, 520, 525, 530, 535, 540, 545, 550, and 555). The distributed microservices are components or modules of the platform 500 and communicate via the event messaging system 505. With regard to the event messaging system 505, a principal communication mechanism for microservices is event-based messaging. Advanced Message Queuing Protocol (AMQP) is an example protocol having distributed queue management and publish/subscribe semantics.

Figure 6:
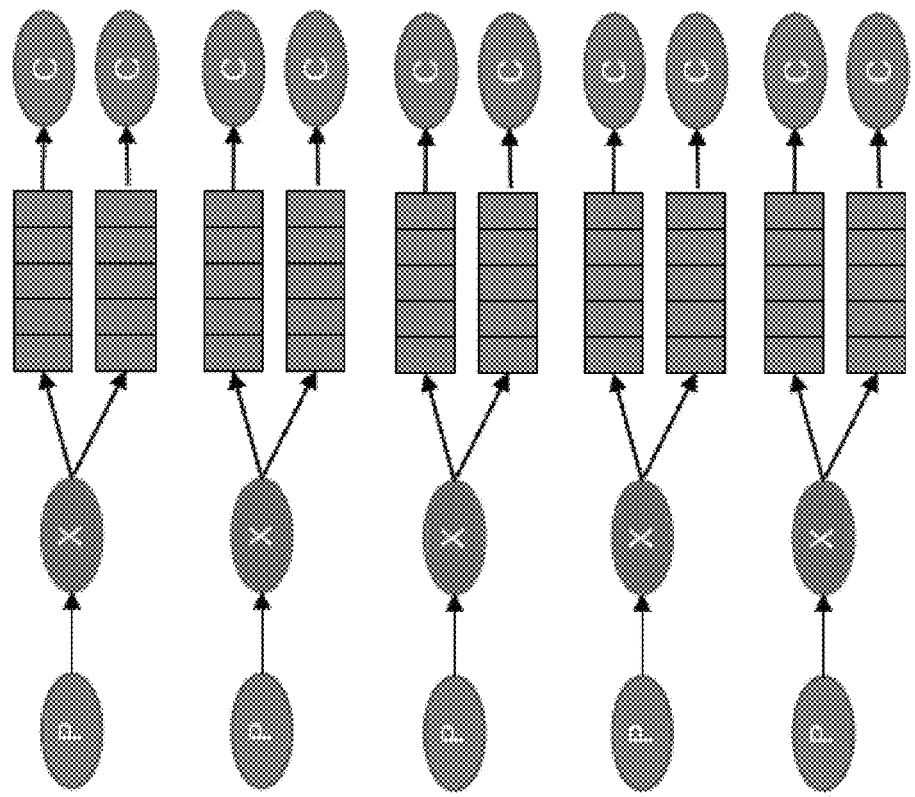
FIG. 6 illustrates an exchange of an event messaging system.

A component of AMQP is the exchange 600, illustrated in FIG. 6. An exchange accepts messages and routes them to queues according to the queue binding type and/or subscription matches. Topic-based exchanges allow for consumer queue subscriptions with a routing key pattern, including both wildcards and explicit matching requirements. Messages that match a routing key are delivered to the consumer's queue. Another component of AMQP is the queue. A message queue may be either specific to a consumer or shared amongst consumers (worker queue). A consumer must acknowledge messages as processed from a queue. Messages that are not acknowledged, by possibly a consumer exiting or crashing, will be re-queued for future delivery.

Referring again to FIG. 5, microservices include the smart media processor (SMP) 510, health and quality services 515, task director services 520, machine analytic services 525, data management services 530, media management services 535, record keeping services 540, alert messaging services 545, audit and record tracking 550, and agent management services 555. Because the event messaging system 505 is flexible and expandable, additional or fewer microservices are possible. The platform 500 includes an interface to a customer 560, which can include a one or more security systems, each having one or more assets providing sensor data to the SMP 510.

Smart media processor 510 can include a software component that can processes one or more video stream sources and route workable multimedia to the platform 500. It can be easily configured and modified via the platform 500 communication to alter its operating behavior. It can also be tasked to obtain additional multimedia on demand (e.g.: x minute clip before/after some time for some asset).

Health and quality services 515 monitors all platform 500 participants for health and quality. Data management services 530 maintains customer account/project level and dynamic state data that all platform 500 participants may need access to or contribute to.

Media management service 535 manages all multimedia resource data obtained from customer assets and persists them in long-term storage. Alert messaging services 545 is responsible for determining the correct escalation procedures and executing them (notification, data collections, and the like) when a task result has been achieved. This can involve personal alarming, machine-to-machine integration or both. Alert messaging services can alert customers via defined mechanism (SMS, MMS, text, email, and the like) when triggered to do so. Record keeping services 540 and audit and record tracking 550 can record all raw data of platform 500 activity to a data warehouse and data lake for offline analysis and presentation.

Machine analytic services 525 integrate artificial intelligence and deep machine learning into platform 500. The machine analytic services 525 can include a machine computation component that includes an artificial intelligence (e.g., machine learning) algorithm that develops and utilizes a predictive model. Third party machine analytics services 527 may also be utilized by platform 500.

Agent management services 555 is for managing all aspects of human interaction and judgment aggregation. The agent management services 555 can include a platform that queries a pool of agents to process a task by, for example, answering a question regarding sensor data.

Task director services 520 is responsible for progressing the state of a task, starting a task upon proper initiation triggers and determines when a task is completed for reporting. The task director services 520 serves as the director of various processing tasks and requests processing of task by, and receiving the results of processing from, the machine analytics services 525 and agent management services 555.

Within the platform 500 a task can be an instance of a modality in progress, which can include a solution state machine object. As the modality is a definition of the problem objective, the solution state machine is the "object" that maintains the state of processing for every trigger event received from the assets. Tasks are the workload of the platform 500. They can drive events and processing, and ultimately will end up as successful (accomplished the modality and satisfied the customer's requirements) or failed (did not accomplish the modality).

Reports are the data results generated by participants against a specific task at a specific state. The task director 520 listens for all reports and uses the data in the report to determine the next state of the task. So, for example, if a task enters a NEED_AI state, there may be multiple machine computation components that may start going to work to solve the current task. When each machine computation component has something report back, it will create a report and publish it to a reports queue. Task director 520 will get these reports and use the measurement data in them to determine next steps for the task.

The role of the alerts messaging service 545 or escalation manager is to look at every successful "match" produced by the platform and determine the appropriate means of distributing that information out to the customer. Depending on how the customer has configured their project, they may wish to receive immediate alerts to one or more cell phones, or they may wish to have their internal system directly updated with the result information, or they may want both. In any of these cases, it is the escalation manager's 545 job to perform the proper routing of results to the customer.

Platform 500 uses escalation policies to help direct what should happen when results for tasks have been accumulated. The escalation manager 545 listens for results and then consults appropriate escalation policies to govern next actions. Escalation policies can fall under 2 types, alert and machine-to-machine. An alert policy governs what should happen upon a result to alert customers or customer representatives to the result. A machine-to-machine policy governs what should happen upon a result with respect to machine integration.

Alerts are push notifications to customers that indicate platform 500 has determined a security scenario has been solved according to the match solution state of the modality.

Figure 7:
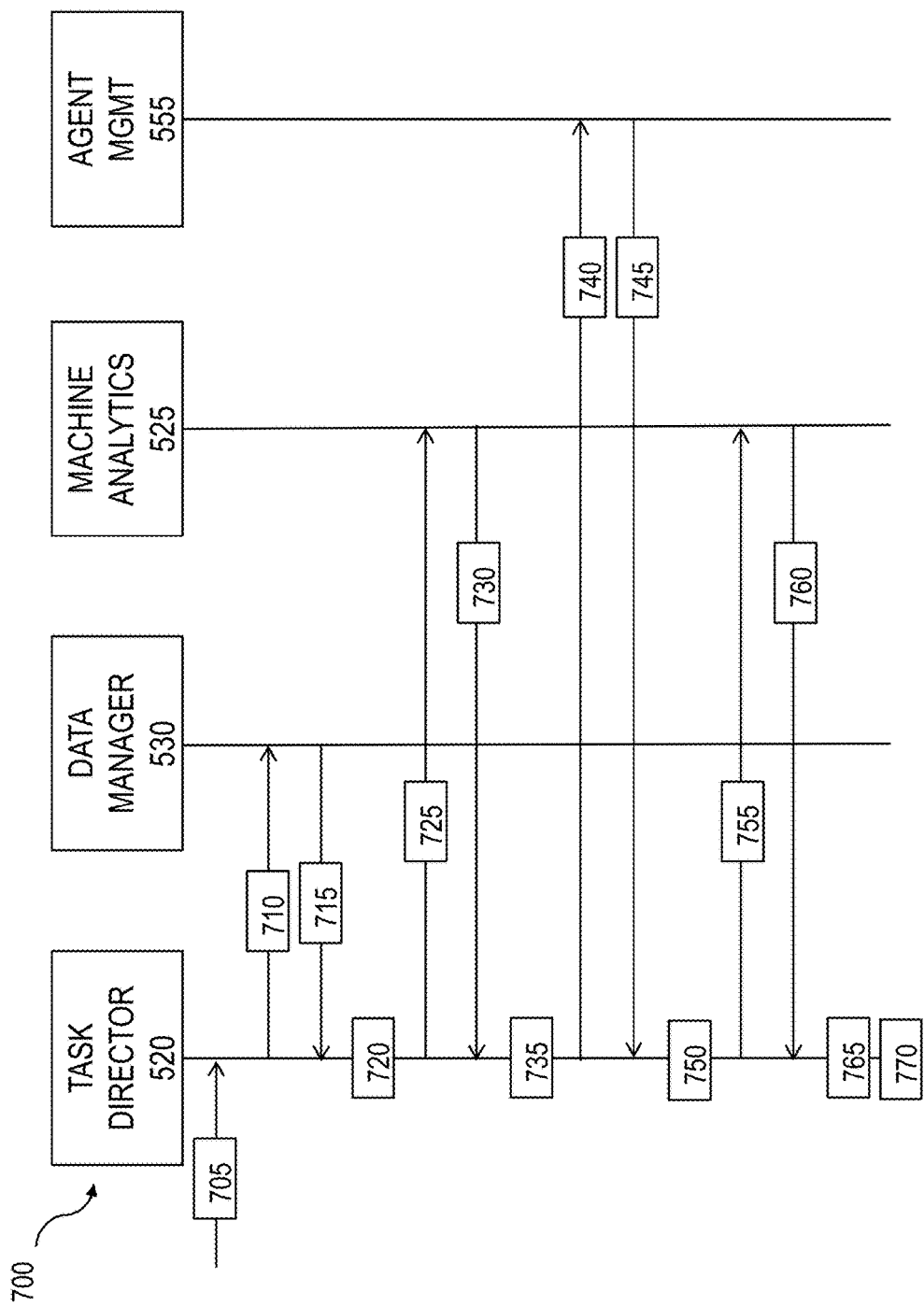
FIG. 7 is a data flow diagram illustrating data flow between components of a platform during a process of augmenting artificial intelligence with human computation.
Figure 8:
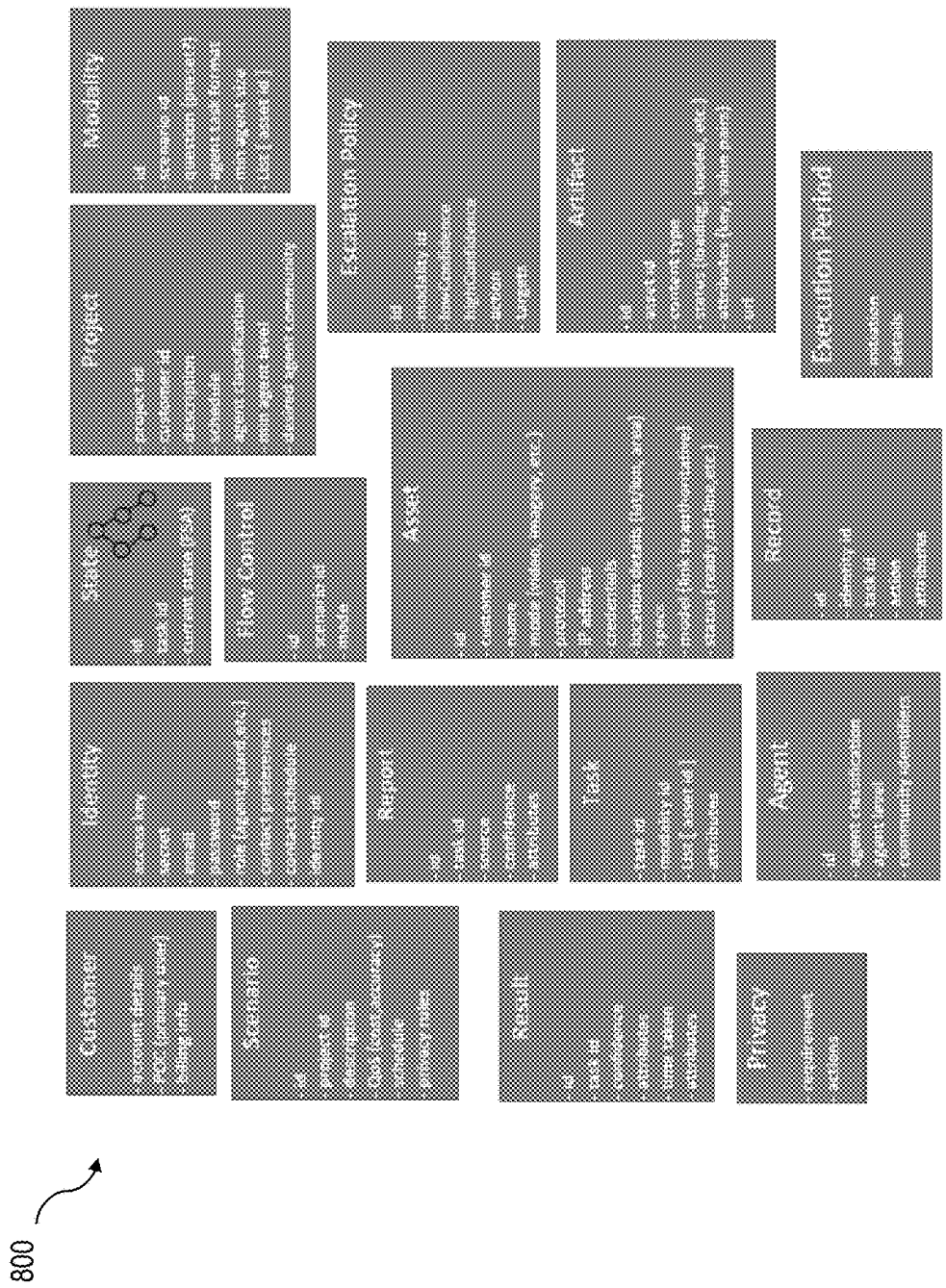
FIG. 8 is a block diagram illustrating example metadata.

FIG. 7 is a data flow diagram illustrating data flow between components of platform 500 during a process of augmenting artificial intelligence with human intelligence tasks, for example, as described with reference to FIG. 1. At 705, the task director 520 receives sensor data. The task director can receive the sensor data using the event messaging system 505. The task director can determine whether a predefined modality exists for the asset from which the sensor data originated. At 710, the task director 520 can send a request for a predefined modality from the data manager 530. Data manger 530 can retrieve the predefined modality from a database and, at 715, provide the task director 520 with the predefined modality.

At 720, task director 520 can instantiate the solution state machine that is specified by the predefined modality. The solution state machine can have a number of states. Task director 520 can effectuate and direct processing flow as specified by the solution state machine. By way of example, the remainder of the description of FIG. 7 assumes the predefined modality specifies the example solution state machine illustrated in FIG. 2. The solution state machine is in the initial state "S", so task director 520 transitions the current state of the solution state machine according to the transition rules, which results in the solution state machine having a current state of "MI". "MI" state is associated with a machine computation component, which in platform 500 can be machine analytics 525. At 725, task director 520 requests processing of the task by machine analytics 525. Machine analytics 525 can process the task, for example, by performing image processing and classifying the image. At 730, machine analytics 525 can send the result of its processing of the task to task director 520, which can receive the results. The results can include a confidence of the machine analytics 525 result.

At 735, task director 520 can transition the state of the solution state machine. For the example solution state machine illustrated in FIG. 2, the current state of the solution state machine can transition to either "MI2" or "HI" states depending on the confidence value returned by machine analytics 525. Assuming the task is one that is challenging for an artificial intelligence algorithm to solve, and the confidence value returned by the machine analytics is low (e.g., 0.2), then task director 520 can apply the transition rules ("C<0.3") and transition the solution state machine to the "HI" state.

At 740, task director can request agent management services 555 to perform processing on the task. Agent management services 555 can receive the prior processing result. Agent management service 555 can query a pool of agents by submitting the sensor data and the agent form contained in the predefined modality to one or more of the agents. Agent management service 555 can receive the completed agent form from the agent (e.g., a client associated with the agent). Agent management service 555 can create a composite agent result where more than one agent is queried and can determine a composite confidence measure. At 745, agent management service 555 can send the query result and confidence measure to task director 520.

At 750, task director 520 can advance the current state of the solution state machine. In the case that the confidence measure received from agent management service 555 is not definitive (e.g., 0.5), task director can apply the transition rules (e.g., 0.9<C<0.4) and transition the solution state machine to state "MI2", which is associated with another machine computation component.

Task director 520 can, at 755, request processing of the task by the machine analytics 525 component. Machine analytics 525 can process the task, for example, by performing image processing and classifying the image. The underlying artificial intelligence system used can be a different system than that used in steps 725 and 730. In some implementations, the underlying artificial intelligence system used can be the same but can use the prior agent management 555 result and/or the prior machine analytics

525 result. In this manner, machine analytics 525 can either try a new approach (e.g., an ensemble) or refine previous results.

At 760, machine analytics 525 can send the result of its processing of the task to task director 520, which can receive the results. The results can include a confidence of the machine analytics 525 result.

At 765, task director 520 can transition the state of the solution state machine. Assuming the machine analytics 525 result was a high confidence (e.g., 0.95), task director 520 can transition the solution state machine to the terminal state "ES", which signifies that the task is completed with high confidence and so the task processing has been successful.

At 770, task director 520 can provide the outcome of the task processing, which can include whether or not platform 500 was able to come to a high-confidence output and the classification, matching, or determination of the sensor data. (For example, task director 520 can provide whether the processing outcome is accurate and whether platform 500 detected the presence of a person in the sensor data image.)

While the data flow illustrated in FIG. 7 is described as having components of platform 500 send and/or receive data directly from each other, it should be understood that the sending and receiving can be via the event messaging system 505. Further, the event messaging system 505 is not the only protocol that can be implemented with the current subject matter.

Although a few variations have been described in detail above, other modifications or additions are possible. For example, platform 500 can be cloud capable, as opposed to, cloud based. The purpose of this can be to leverage cloud technology and infrastructure as much as possible and when possible. When it is not possible, such as deployment within a secure facility or environments without internet accessibility, then all major core components of platform 500 can be executable and can operate normally without cloud access. Running platform 500 within a cloud infrastructure can provide benefits, including: virtually unlimited storage and compute processing, integration with other public services, centralized monitoring, detached resource dependencies and more. Running platform 500 within a non-cloud/local environment can require dedicated resources. One or more components of platform 500 can be internally within a customer facility and reach out to a larger, cloud hosted suite of platform 500 components for processing.

The following describes another example implementation of the current subject matter.

In some implementations, by including the human-in-the-loop the current subject matter is able to accomplish new kinds of tasks entirely (e.g., those that require human intelligence).

The current subject matter relates to utilizing a "human-in-the-loop" (symbiotic human-machine) approach in order to enable new capabilities of automated or non-automated machine decision systems by, for example, reducing false alarms associated with sensors and analytics as well as expand the range of use cases to which a machine decision making system or a given sensor and/or analytic may effectively apply. In some implementations, the current subject matter can provide for injection of a human-computation element into a machine decision-making algorithm, allowing for a human to perform (or solve) specific and narrow decisions that the machine decision making system would otherwise be unable to perform (or would perform poorly). The current subject matter can expand the range of use cases that a machine decision making system or a given sensor and/or analytic may effectively apply. The subject matter can be used with applications that do not current include machine decision-making algorithms, for example a closed circuit television system that currently does not have a machine decision-making algorithm. The current subject matter can enable new capabilities and improve machine decision making, for example, by improving performance of correct classification, which can provide one or more of reducing false alarms, increasing performance of detection (e.g., hit), increasing performance of correctly determining a miss, and increasing performance of determining a correct rejection.

Figure 15:
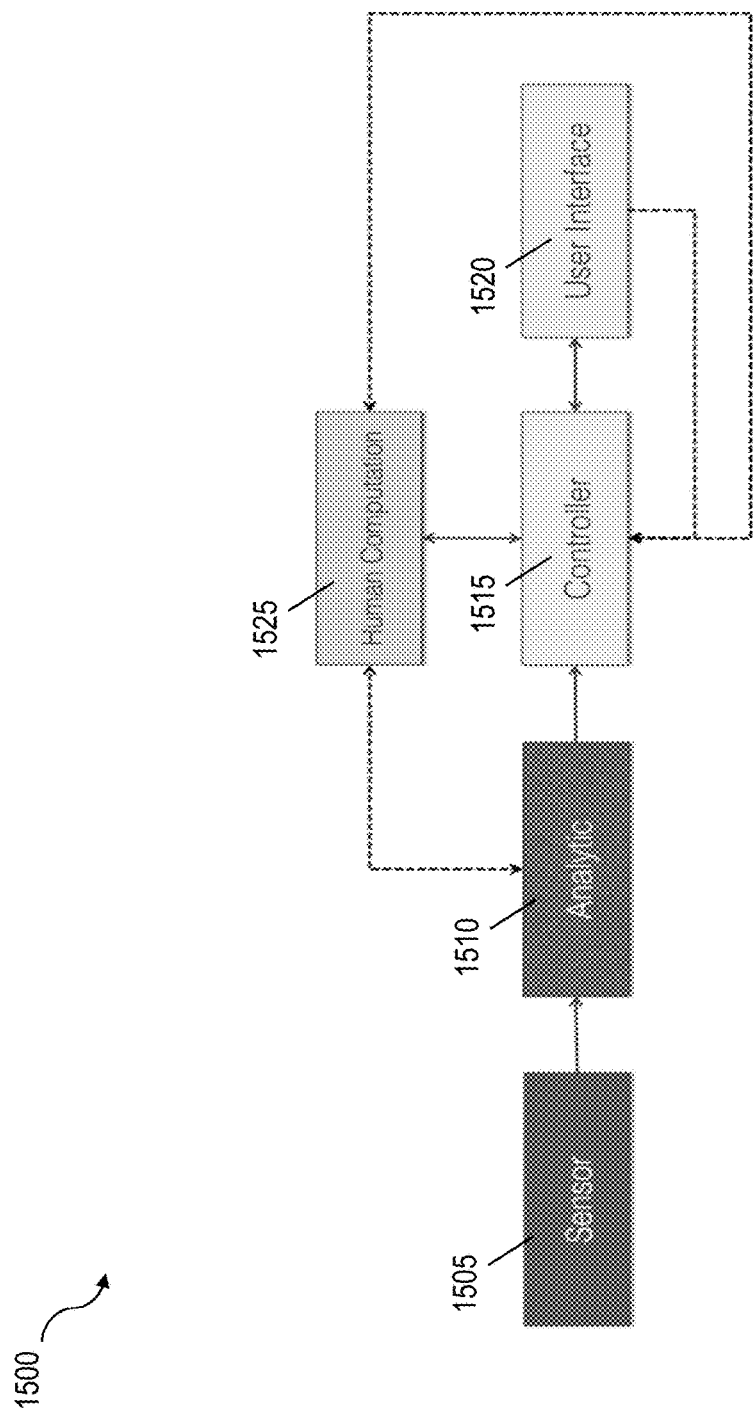
FIG. 15 is a system block diagram illustrating an example system including a human-computation element and a machine decision-making algorithm.

FIG. 15 is a system block diagram illustrating an example system 1500 that provides for injection of a human-computation element into a machine decision-making algorithm. The system 1500 may include a sensor 1505, analytics 1510, controller 1515, user interface 1520, and human computation element 1525.

The sensor 1505 may include a variety of sensor types: imaging, acoustic, chemical, radiation, thermal, pressure, force, proximity, or a number of other sensor types. "Sensor," as used herein may include information that did not originate specifically from physical hardware, such as a computer algorithm.

Analytics 1510 may include a wide range of software analytics and development processes, which are methods and techniques that typically rely on gathering and analyzing information from sensor 1505. Analytics 1510 may include, but are not limited to, face recognition, people counting, object recognition, motion detection, change detection, temperature detection, and proximity sensing. Analytics 1510 may address a user's query of the system 1500 (e.g., a face recognition analytic if the user desires to understand who is entering his or her building). It also may serve to reduce the amount of sensor information sent to the human computation element 1525, or the amount of bandwidth, memory, computation, and/or storage needed by the system 1500. In some configurations, the system output can be obtained at low latency, in real-time or near (e.g., substantially) real-time.

Controller 1515 may include a tool that utilizes the output and characteristics of the sensor 1505 and/or analytics 1510 in conjunction with internal logic and/or in conjunction with a predictive model of human and machine performance to determine whether and how to utilize human computation element 1525. Controller 1515 may determine that information generated by sensor 1505 and/or analytics 1510 is sufficient to answer a given user query or given task, or controller 115 may outsource certain tasks to humans (via human computation element 1525) based on system objectives and controller 1515 internal logic and/or a predictive model of human and machine performance. Controller 1515 may coordinate, via human computation element 1525, use of human intelligence to perform tasks that augment, validate, replace, and/or are performed in lieu of sensor 1505 and/or analytics 1510. Controller 1515 may be capable of collecting, interpreting, and/or integrating the results of human work into the machine decision making process and system. Controller 1515 may be capable of converting a user-defined task, that is either defined via natural language or via a more structured query, into a smaller task or series of smaller tasks, as it deems necessary, and into an output for an end user, using either sensor 1505 and/or analytics 1510 or human computation element 1525, or both.

In addition, controller 1515 may maintain statistics pertaining to the performance of sensor 1505 and/or analytics 1510 as well as human computation element 1525 and/or individual human workers or a subpopulations of workers.

These statistics may be used to improve the means of utilizing machine and human elements of the pipeline. System 1500 may be capable of gathering data that may be useful for improving the performance characteristics of system 1500, sensor 1505 and/or analytics 1510, or the human computation element 1525. Typically these data are selected because they are examples for which the sensor 1505 and/or analytics 1510 have low relative certainty or they are examples that are informative for improving characteristics of sensor 1505 and/or analytics 1510.

Human computation component 1525 utilizes human intelligence. A purpose of human computation element 1525 may be to aid system 1500 in its ability to address AI-hard or AI-complete problems that are difficult or impossible to solve reliably and/or cost effectively with sensor 1505 and/or analytics 1510 (e.g., software analytic technology) alone. Another purpose of incorporating human intelligence may be to perform tasks that augment or validate the sensor 1505 and/or analytics 1510 of system 1500. One example of this is using humans to validate the output of a computer vision analytic via a micro task involving imagery. Human computation element 1525 may also aid in the translation of tasks received by users. Task translation may range from none (e.g., if the task is given directly to humans) to minimal (e.g., if the task is given partly to computers and partly to humans, would benefit from formalization, or is decomposed and then executed by either computers or humans) to substantial (e.g., if the system determines it may be able to improve its effectiveness by translating the task substantially). The system may distribute a task in order to manage and improve characteristics such as throughput, latency, accuracy, and cost. Humans may also contribute innovative solutions into the system 1500, make incremental changes to existing solutions, or perform intelligent recombination. Human computation element 1525 may function as part of an ongoing process, which may be aimed at real-time or near-real time applications as well as at applications that require results at lower frequencies. System 1500 may utilize a task market such as AMAZON® Mechanical Turk, but is built in such a way that it may also incorporate many different kinds of human workers worldwide via other crowd work platforms or via a custom system interface. Examples of other crowd workers may include employees of an enterprise, off-duty or retired law enforcement professionals, subject matter experts, or on-duty personnel. The system may include a process for establishing and verifying credentials of the crowd workers for the purpose of meeting system objectives or improving system efficiency. Incentives to participation may include monetary compensation, volunteerism, curiosity, increasing reputation/recognition, desire to participate in a game-like experience, other motivation sources, and the like.

The end user interface 1520 may include an interface that combines alerts with a human-like means of interaction.

System 1500 is a closed loop system that can use sensor 1505 and/or analytics 1510 performance characteristics as well as human inputs (from the human computation element 1525 or from an end user) to improve its underlying performance characteristics relative to the challenges (e.g., AI-hard or AI-complete problems) the system 1500 confronts. The system 1500 may incorporate a scheme for collecting useful "ground truth" examples that correspond to these challenges. Data collected by system 1500 may be used to improve system characteristics using machine learning or other statistical methods.

Figure 16A:
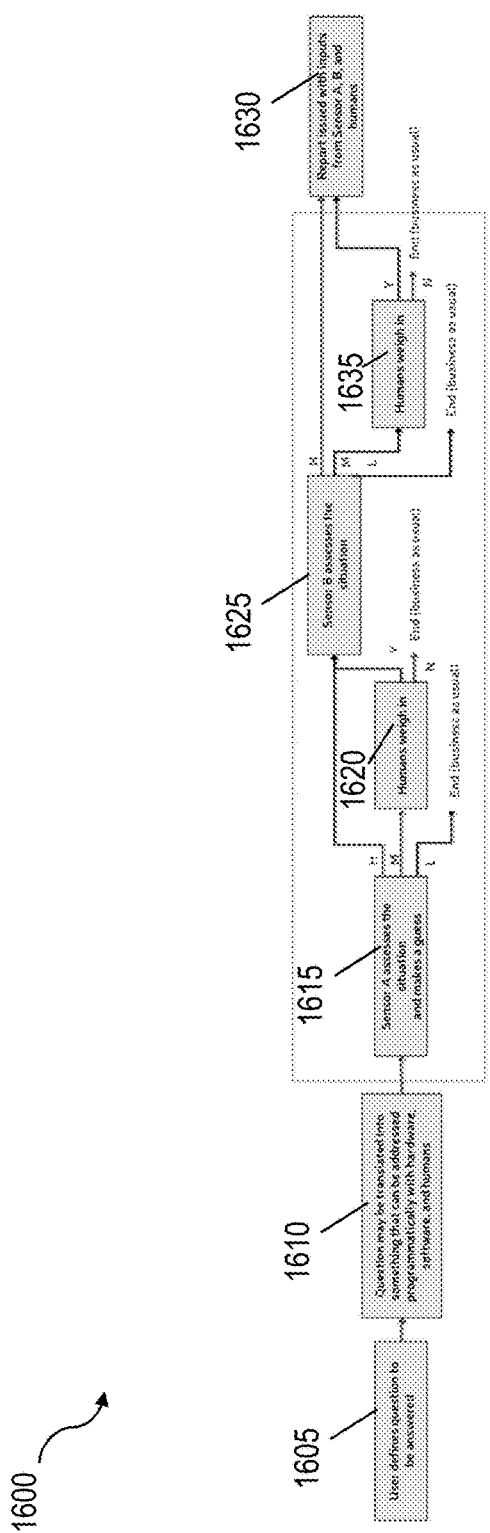
FIG. 16A is a process for injecting human-computation into a machine decision-making algorithm.

FIG. 16A is a process flow diagram illustrating a method 1600 of injecting human-computation into a machine decision-making algorithm, allowing for a human to perform (or solve) specific and narrow decisions that the machine decision making system would otherwise be unable to perform (or would perform poorly). The particular example application of FIG. 16A is to detect graffiti using a vapor sensor and an imaging sensor. At 1605, a user may define a question to be answered by the system. For example, a user may define a question regarding whether graffiti is occurring (or has occurred) and who may be involved in the graffiti.

At 1610, the question may be translated into something that can be addressed programmatically with hardware, software, and humans. For example, the pseudocode at Table 1 may be used, which enables the human in the loop to work alongside one or more sensors to aid in solving more complex tasks. In the example of table 1, if the vapor sensor is confident that there is nothing there, then end (no need to involve a human). If it is confident there is a high vapor condition, send a report (again, no need to involve a human). If there is medium confidence, ask the human in the loop to weigh in on the situation and inform the answer.

TABLE 1

If (vapor_sensor.ppm > 250)
If (vapor_sensor.ppm > 750)
If (camera.person_holding_can)
  sendreport( )
If (camera.person_holding_can)
  sendreport( )
If (vapor_sensor < 50ppm)
  End
If (vapor_sensor > 750ppm)
  sendreport( )
If (vapor_sensor is between 50ppm and 750ppm)
  Get_human_answer_on_whether_graffiti_occurring( )

At 1615, a sensor (e.g., sensor 1505) assess the situation (takes a measurement) and makes a decision (or guess), for example, low, medium, or high levels of vapor. For example, for vapor_sensor.ppm, sensor is making its best guess as to whether a condition (detecting a vapor level associated with spray paint) exists. If the decision is negative (no vapors) then no graffiti is occurring and the assessment may terminate. If the decision is a medium level of vapors, there may or may not be graffiti, and human computation element 1525 may be employed, at 1620, to inject a human decision or review of the sensor assessment. The human may review the sensor data and render a decision regarding whether graffiti is occurring. The high, medium, or low assessment by the sensor may be a function of the receiver operating characteristics (ROC) of the sensor and may vary.

Figure 16B:
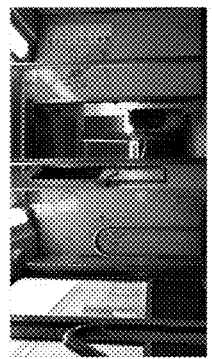
FIG. 16B illustrates an example image.

If the human-decision indicates that graffiti is occurring, or the vapor sensor indicates with high reliability that vapor is present and so graffiti is occurring (so that no human input is required), at 1625 a second sensor, such as an imaging sensor, can assess the situation (e.g., take a measurement). FIG. 16B illustrates an example image containing graffiti. The imaging sensor may also render a decision with low, medium, and/or high likelihood that the imaging sensor has identified who is creating the graffiti. Like with the vapor sensor, if the imaging sensor is confident in its determination, the system may proceed directly to 1630, where a report can be issued or no action taken. However, if the imaging sensor renders a decision with low confidence, at 1625, human-computation element 1525 may be used to allow a human make the determination. The human may also weigh in using data from the vapor sensor and imaging sensor, if the vapor sensor couldn't benefit from human insight by itself or if it is costless to engage the imaging sensor.

Thus, the example method 1600 allows for adaptive behavior based on the confidence of decisions (or assessments) made by sensors. For example, if vapor sensor and imaging sensor both render confident results, the process may involve machine only decision making; if either vapor sensor or imaging sensor renders a not confident result (e.g., increased likelihood of an incorrect decision) then a human computation element may be injected into the machine decision loop to render a decision. The method may close the loop and allow human-generated ground truth to improve the algorithms used to process sensor data, the confidence threshold for each sensor, the weight of each sensor's information in the overall solution, and more.

Figure 17:
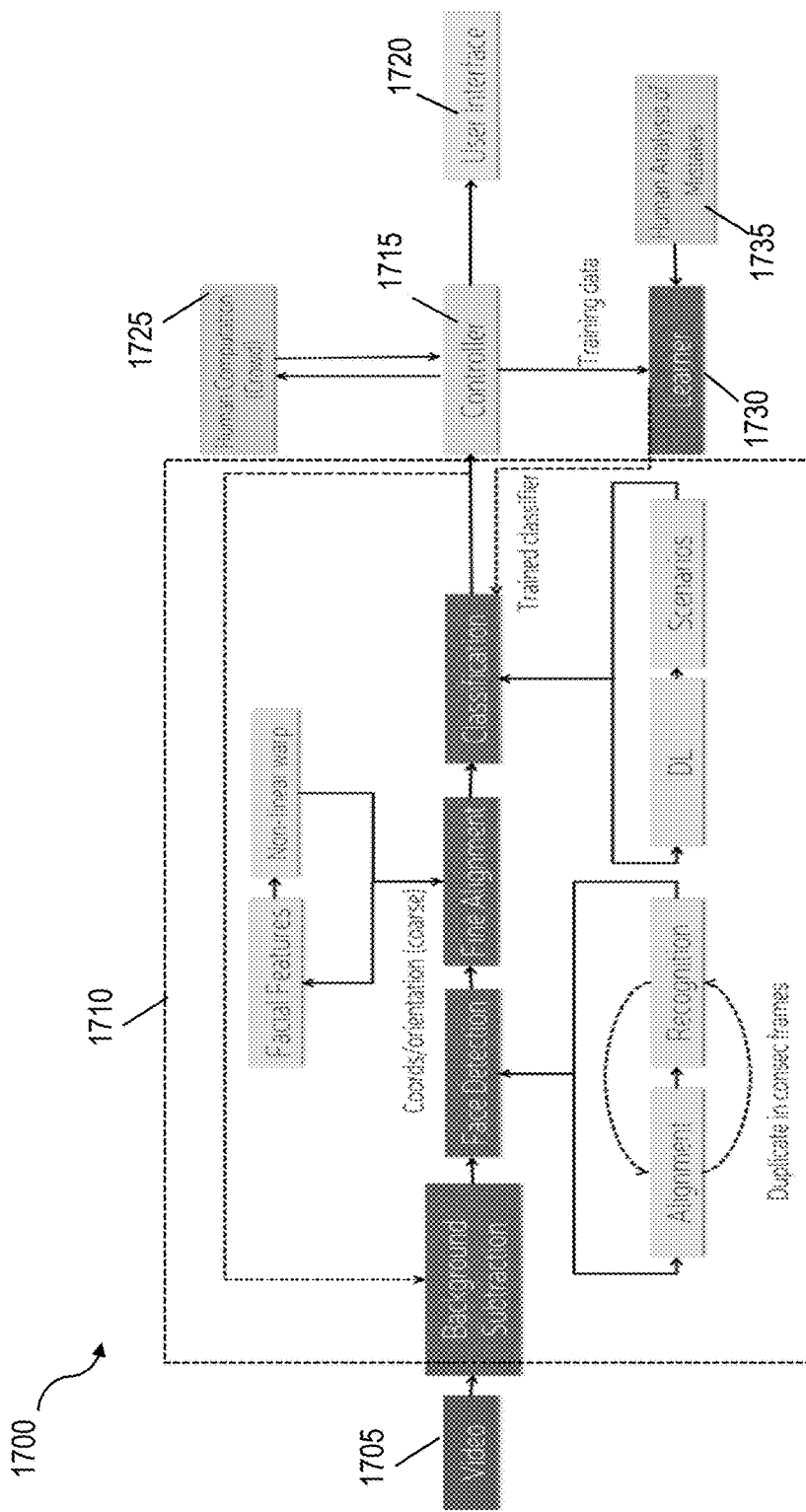
FIG. 17 is a system block diagram illustrating an example implementation of the current subject matter for a video/face recognition system.

FIG. 17 is a system block diagram illustrating an example implementation of the current subject matter for video/face recognition system 1700. The face recognition system 1700 may be able to determine whether people on a "watch list" (or people who belong to any notable subpopulation such a very important persons (VIPs), frequent shoppers, security threats, and the like) are entering a given facility. The face recognition system includes a video sensor 1705, an image analysis analytics 1710, a controller 1715, user interface 1720, human-computation element 1725, and learner 1730.

The video sensor 1705 can acquire images (for example, of a person), which are analyzed by the image analysis analytics 1710, which can generate a determination whether a person in the image is on the watch list. The controller 1715 can receive the decision and, based on a measure of confidence of the decision, determine whether to employ the human computation element 1725 to verify the decision. If the human computation element 1725 is employed, using, for example, Mechanical Turk or similar service, a human will review the image with possible candidates from the watch list to determine if there is a match. When the face recognition analytics 1710 is incorrect (as identified by the human-computation element 1525), the human analysis of the mistake 1735 may input to a learner 1730, which can use the data point to train the face recognition analytics 1710 to further train the face recognition analytics 1710 and improve performance. Thus, the human computation element aids in improving the performance of the machine element over time and provides feedback.

Figure 18:
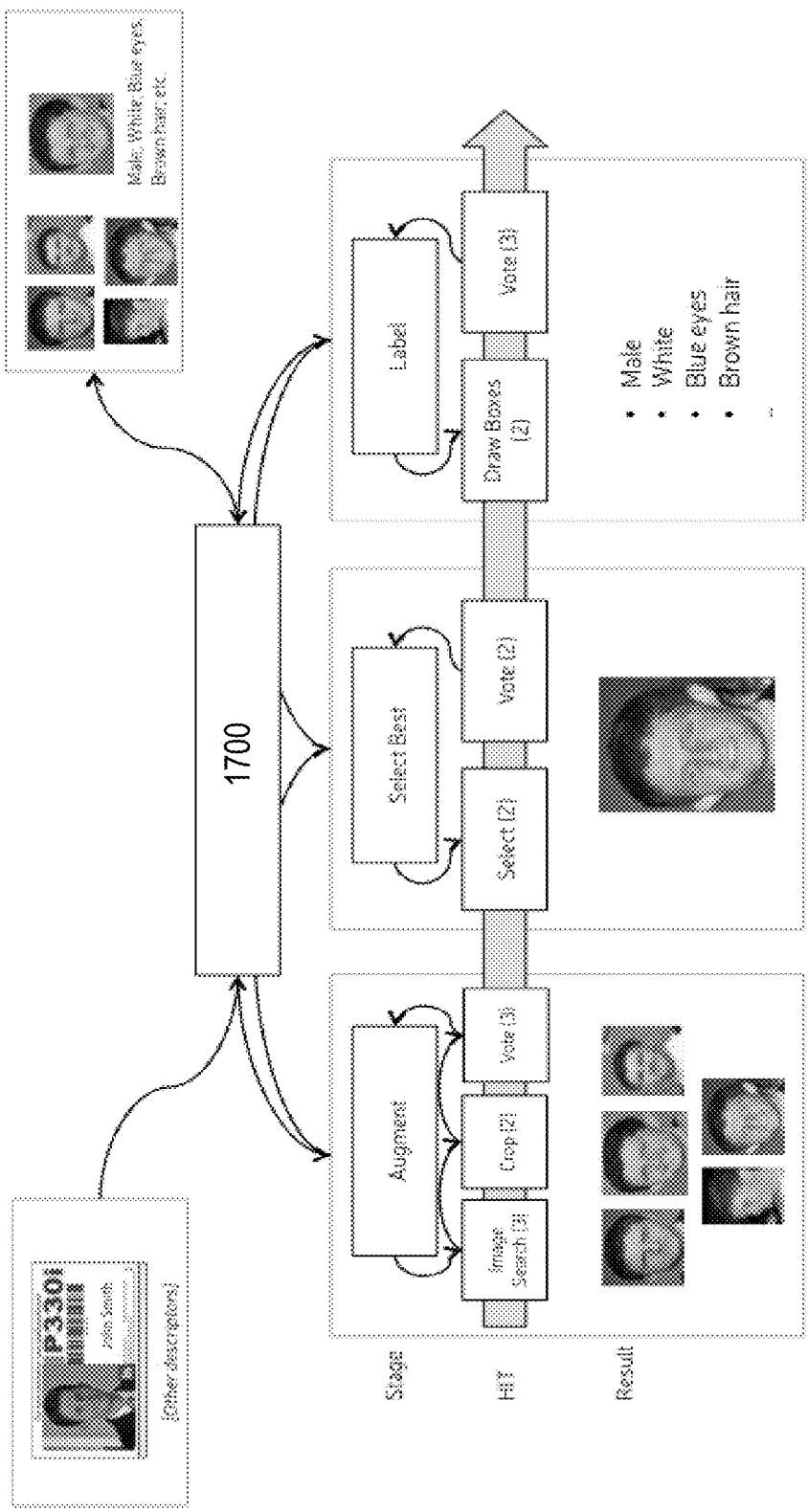
FIGS. 18 and 19 are process flow diagrams illustrating using the current subject matter for face recognition and using the face recognition system.
Figure 19:
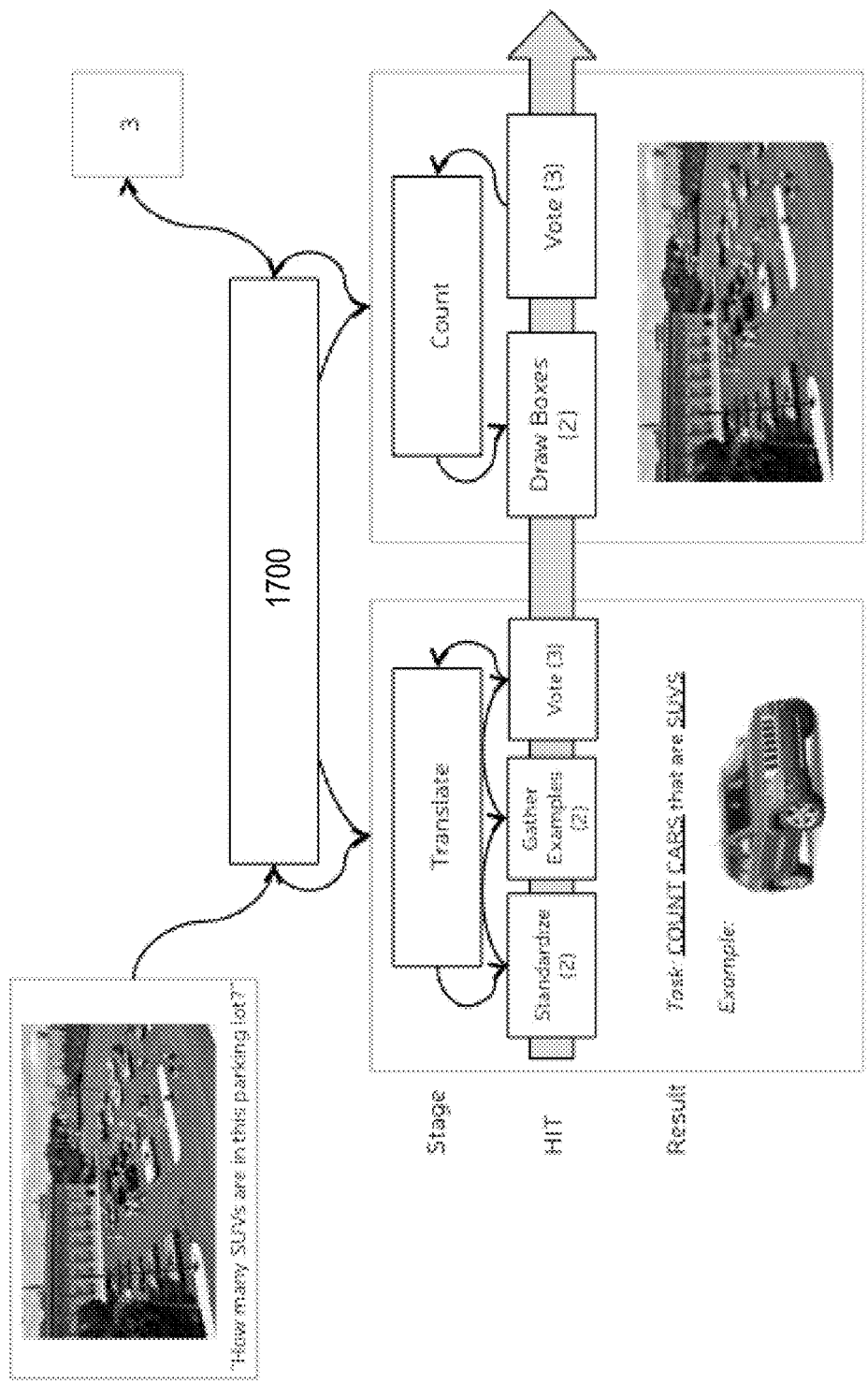

FIGS. 18 and 19 are process flow diagrams illustrating using the current subject matter for face recognition and using the face recognition system 1700.

Figure 20:
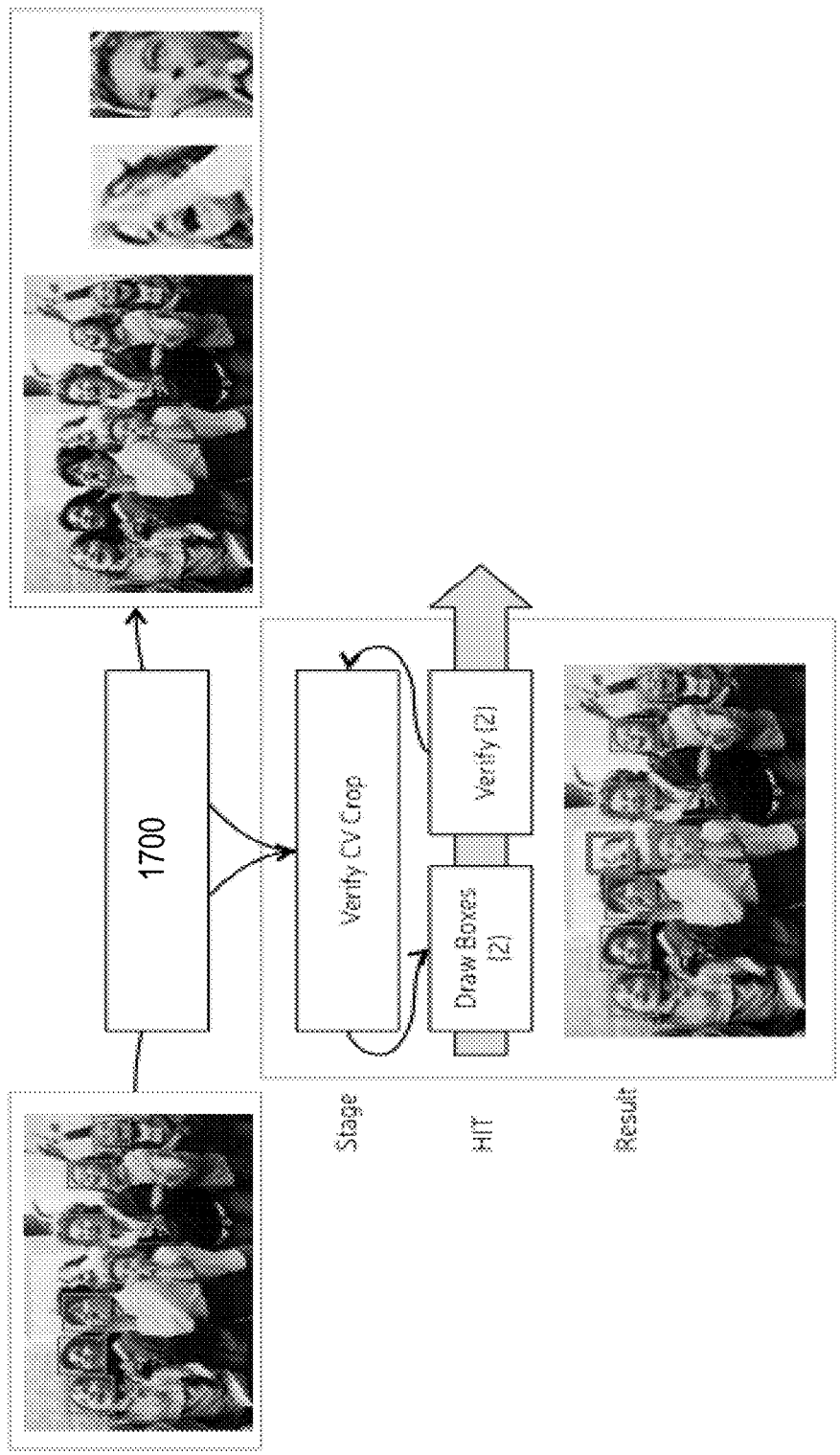
FIGS. 20 and 21 illustrate applying the current subject matter to handle a wide variety of tasks, such as counting sports utility vehicles (SUVs) in a parking lot or validating computer vision analytic performance.
Figure 21:
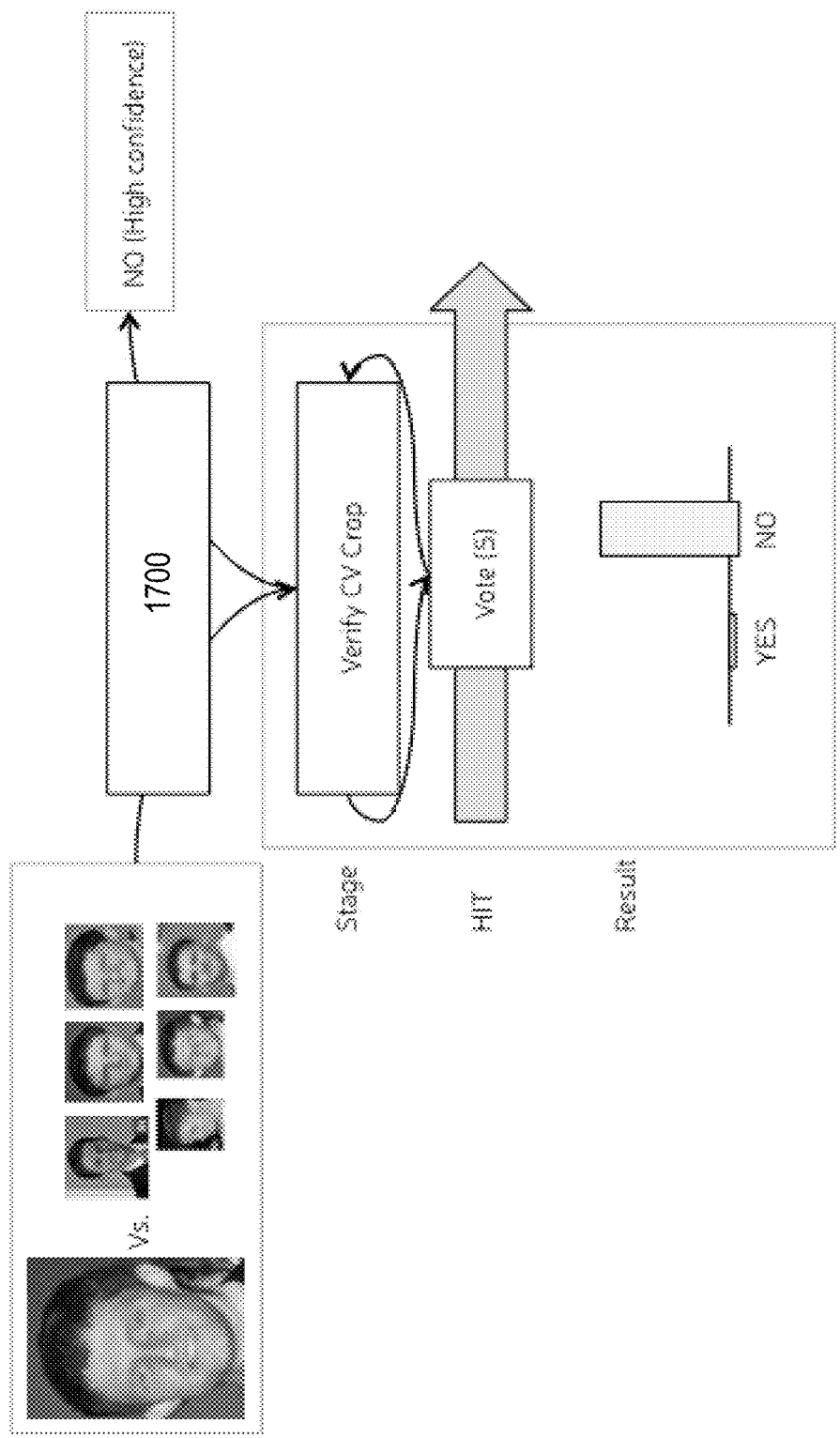

The system describe in FIG. 17 may not be limited to face recognition. For example, the system may be used to handle a wide variety of tasks, such as counting sports utility vehicles (SUVs) in a parking lot or validating computer vision analytic performance as shown in FIGS. 20 and 21.

In some implementations, the current subject matter may incorporate an automatic enrollment process whereby a user may contribute examples of data that are either positive examples, negative examples, or examples that are necessary for effective system operation. The current subject matter may efficiently solicit, gather, and catalogue these data. For instance, in the case of face recognition, users may contribute images of people whom they desire to identify, and the current subject matter may gather and catalogue these face images. These images may be used to train analytics and/or humans as well as to guide system outputs according to the system's internal logic and the need expressed by the user.

Configuration examples may include:
Systems addressing physical security, safety, or asset protection needs.
Systems addressing the improvement and/or monitoring of retail environments.
Systems addressing real-time sensor feeds.
Systems addressing historic sensor feeds.
Systems incorporating multiple sensors.
Systems addressing residential, education, medical, financial, entertainment, industrial, transportation, commercial, law enforcement, military, or governmental applications.

Figure 22:
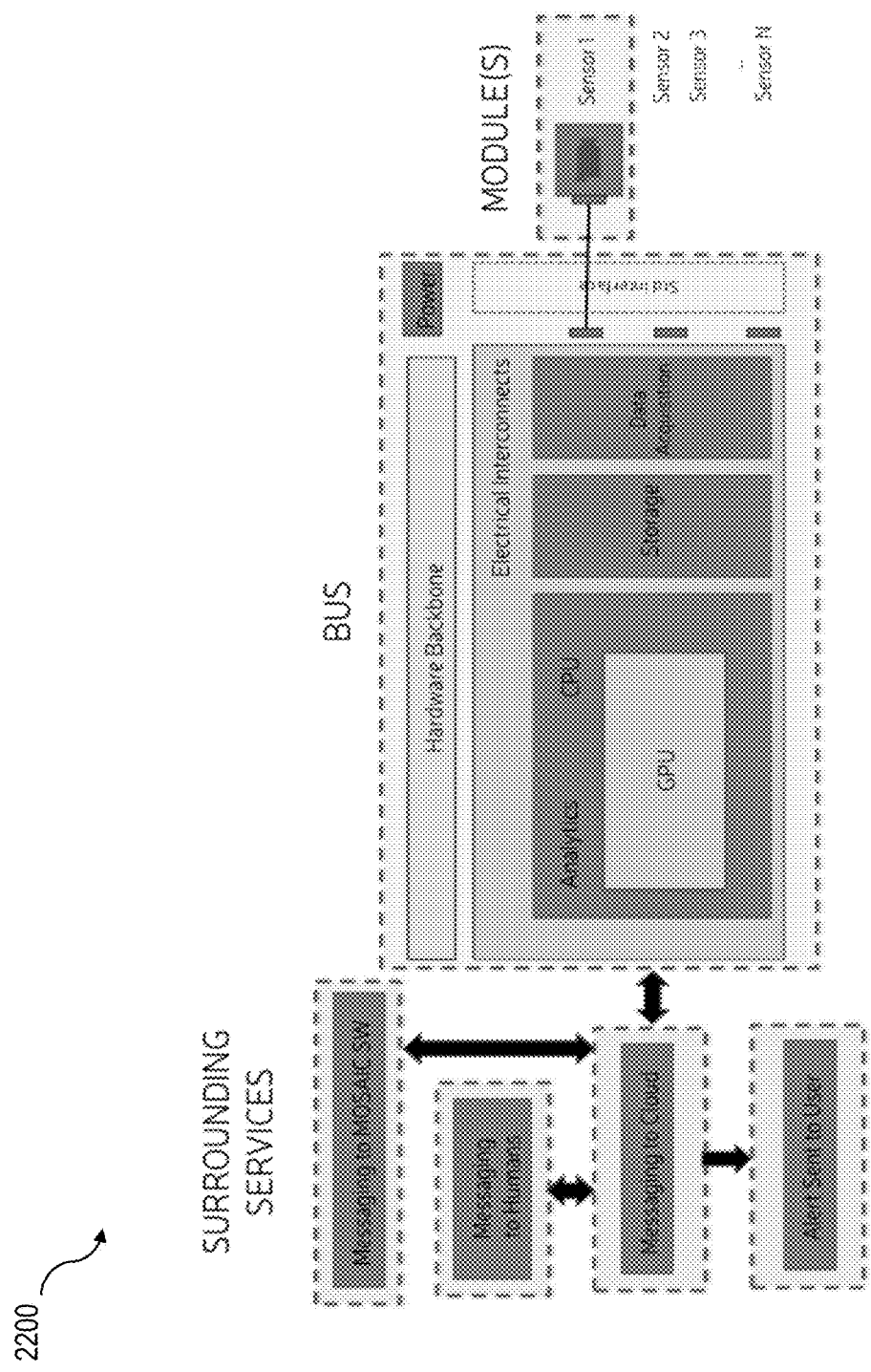
FIG. 22 is a block diagram illustrating an example of hardware used by the current subject matter.

FIG. 22 is a block diagram illustrating an example of hardware 2200 used by the current subject matter, which may include one or more sensors coupled with a CPU and/or GPU. The device may perform a portion of its processing locally (onboard device) and a portion of its processing remotely (e.g., using cloud-based computation). This computational scheme may be in place in order to efficiently utilize bandwidth, storage, and device memory, while facilitating the efficient implementation of the aforementioned human-in-the-loop process. The hardware may be designed in such a way that additional sensors are readily supported via a bus-modular system approach. In addition, the hardware incorporates a means to communicate through a network, such as WiFi or Cellular network.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
receiving data characterizing a request for agent computation of sensor data, the request including a required confidence that a result of the agent computation is correct and a required latency for the agent computation to return the result;
determining agents to query based on the required confidence and the required latency, the determining further based on a predetermined probability that a given agent responds correctly, a number of agents responding to the query, and a predetermined probability that agents disagree in the result, wherein the agents include human agents; and
transmitting data to clients associated with the determined agents to query the determined agents to provide analysis of the sensor data.

2. The method of claim 1, wherein the determining agents is further based on at least one of a measure of quality, a measure of expected agent latency, and proximity to average completion time for a current task.

3. The method of claim 1, further comprising:
receiving data characterizing query results from a plurality of the determined agents; and
transmitting data to query additional agents to achieve the required confidence when two or more of the received query results are inconsistent.

4. The method of claim 3, further comprising:
determining a number of the additional agents to query to achieve the required confidence.

5. The method of claim 3, further comprising:
determining quality of available agents in a pool of agents; and
determining a minimum quality required of a to-be-queried agent to achieve the required confidence.

6. The method of claim 1, further comprising:
determining a measure of quality for agents in a pool of agents.

7. The method of claim 6, wherein the measure of quality is determined as a ratio of a number of query responses deemed correct to a number of total queries.

8. The method of claim 1, further comprising:
determining a measure of expected latency for agents in a pool of agents; the measure of expected latency determined as a Poisson process.

9. The method of claim 1, wherein the expected latency is less than 30 seconds.

10. The method of claim 1, wherein the agent computation is defined by a question with at least two predefined answers.

11. The method of claim 1, wherein at least one of the receiving, determining, and transmitting is performed by at least one data processor forming part of at least one computing system.

12. The method of claim 1, wherein the sensor data of a security system asset that is an imaging device, a video camera, a still camera, a radar imaging device, a microphone, a chemical sensor, an acoustic sensor, a radiation sensor, a thermal sensor, a pressure sensor, a force sensor, or a proximity sensor.

13. The method of claim 1, wherein the sensor data includes an image including a single image, a series of images, or a video; and the computational task includes: detecting a pattern in the image; detecting a presence of an object within the image; detecting a presence of a person within the image; detecting intrusion of the object or person within a region of the image; detecting suspicious behavior of the person within the image; detecting an activity of the person within the image; detecting an object carried by the person, detecting a trajectory of the object or the person in the image; a status of the object or person in the image; identifying whether a person who is detected is on a watch list; determining whether a person or object has loitered for a certain amount of time; detecting interaction among person or objects; tracking a person or object; determining status of a scene or environment; determining the sentiment of one or more people; counting the number of objects or people; determining whether a person appears to be lost; determining whether an event is normal or abnormal; and/or determining whether text matches that in a database.

14. A non-transitory computer program product which, when executed by at least one data processor forming part of at least one computer, result in operations comprising:

receiving data characterizing a request for agent computation of sensor data, the request including a required confidence that a result of the agent computation is correct and a required latency for the agent computation to return the result;

determining agents to query based on the required confidence and the required latency, the determining further based on a predetermined probability that a given agent responds correctly, a number of agents responding to the query, and a predetermined probability that agents disagree in the result, wherein the agents include human agents; and transmitting data to clients associated with the determined agents to query the determined agents to provide analysis of the sensor data.

15. The computer program product of claim 14, wherein determining agents is further based on at least one of a measure of agent quality, a measure of expected agent latency, and proximity to average completion time for a current task.

16. The computer program product of claim 14, further comprising:

receiving data characterizing query results from a plurality of the determined agents; and transmitting data to query additional agents to achieve the required confidence when two or more of the received query results are inconsistent.

17. The computer program product of claim 14, further comprising:

determining the measure of quality for agents in a pool of agents.

18. The computer program product of claim 14, wherein the expected latency is less than 30 seconds.

19. A system comprising:

means for receiving data characterizing a request for agent computation of sensor data, the request including a required confidence that a result of the agent computation is correct and a required latency for the agent computation to return the result;

means for determining agents to query based on the required confidence and the required latency, the determining further based on a predetermined probability that a given agent responds correctly, a number of agents responding to the query, and a predetermined probability that agents disagree in the result, wherein the agents include human agents; and means for transmitting data to clients associated with the determined agents to query the determined agents to provide analysis of the sensor data.

20. The system of claim 19, wherein determining agents is further based on at least one of a measure of agent quality, a measure of expected agent latency, and proximity to average completion time for a current task.

21. The system of claim 19, further comprising:

means for receiving data characterizing query results from a plurality of the determined agents; and means for transmitting data to query additional agents to achieve the required confidence when two or more of the received query results are inconsistent.

22. The system of claim 21, further comprising:

means for determining quality of available agents in a pool of agents; and means for determining a minimum quality required of a to-be-queried agent to achieve the required confidence.

23. The system of claim 19, further comprising:

means for determining the measure of quality for agents in a pool of agents.

* * * * *